(12) United States Patent
Strathmann et al.

(10) Patent No.: US 11,577,111 B2
(45) Date of Patent: Feb. 14, 2023

(54) HYDROTHERMAL TECHNOLOGY FOR DECONTAMINATION AND MINERALIZATION OF PERFLUORO- AND POLYFLUOROALKYL SUBSTANCE (PFAS) IN WASTES, CONCENTRATE SOLUTIONS, AND CHEMICAL STOCKPILES

(71) Applicant: COLORADO SCHOOL OF MINES, Golden, CO (US)

(72) Inventors: Timothy James Strathmann, Golden, CO (US); Christopher P. Higgins, Golden, CO (US); Boran Wu, Golden, CO (US); Shilai Hao, Golden, CO (US)

(73) Assignee: COLORADO SCHOOL OF MINES, Golden, CO (US)

( * ) Notice: Subject to any disclaimer, the term of this patent is extended or adjusted under 35 U.S.C. 154(b) by 358 days.

(21) Appl. No.: 16/689,426

(22) Filed: Nov. 20, 2019

(65) Prior Publication Data
US 2020/0155885 A1    May 21, 2020

Related U.S. Application Data

(60) Provisional application No. 62/769,950, filed on Nov. 20, 2018.

(51) Int. Cl.
| | |
|---|---|
| *A62D 3/35* | (2007.01) |
| *A62D 3/36* | (2007.01) |
| *A62D 3/37* | (2007.01) |
| *A62D 3/38* | (2007.01) |
| *C02F 1/44* | (2006.01) |
| *A62D 101/22* | (2007.01) |
| *C02F 1/02* | (2006.01) |
| *C02F 101/36* | (2006.01) |

(52) U.S. Cl.
CPC ............ *A62D 3/35* (2013.01); *A62D 3/36* (2013.01); *A62D 3/37* (2013.01); *A62D 3/38* (2013.01); *A62D 2101/22* (2013.01); *C02F 1/025* (2013.01); *C02F 1/441* (2013.01); *C02F 2101/36* (2013.01)

(58) Field of Classification Search
CPC ............ A62D 3/35; A62D 3/36; A62D 3/37; A62D 3/38; A62D 2101/22; C02F 1/025; C02F 1/441; C02F 2101/36
USPC .......................................................... 588/317
See application file for complete search history.

(56) References Cited

PUBLICATIONS

Belsky, A.J. et al., "Spectroscopy of Hydrothermal Reactions 13. Kinetics and Mechanisms of Decarboxylation of Acetic Acid Derivatives at 100-260° C. under 275 bar", J. Phys. Chem. A, 1999, pp. 4253-4260.
Hori, Hisao et al., "Efficient Decomposition of Environmentally Persistent Perfluorooctanesulfonate and Related Fluorochemicals Using Zerovalent Iron in Subcritical Water", Environ. Sci. Technol., 2006, pp. 1049-1054.
Lee, Yu-Chi et al., "Efficient decomposition of perfluorocarboxylic acids in aqueous solution using microwave-induced persulfate", Water Research 43, 2009, pp. 2811-2816.
Wang, Fei et al., "Effectiveness and Mechanisms of Defluorination of Perfluorinated Alkyl Substances by Calcium Compounds during Waste Thermal Treatment", Environmental Science and Technology, 2015, pp. 5672-5680.
Wang, Fei et al., "Mineralization Behavior of Fluorine in Perfluorooctanesulfonate (PFOS) during Thermal Treatment of Lime-Conditioned Sludge", Environmental Science and Technology, 2013, pp. 2621-2627.
Yamasaki, Nakamichi et al., "Hydrothermal Decomposition of Polychlorinated Biphenyls", Environmental Science and Technology, vol. 14, No. 5, 1980, ¶. 550-552.
Kucharzkk et al, Novel treatment technologies for PFAS compounds: A critical review, Journal of Environmental Management, pp. 757-764, available online Aug. 14, 2017.†
Merino et al, Degradation and Removal Methods for Perfluoroalkyl and Polyfluoroalkyl Substances in Water, published online on Aug. 22, 2016, Environmental Engineering Science, pp. 615-649, vol. 33, No. 9, 2016.†

† cited by third party

*Primary Examiner* — Edward M Johnson
(74) *Attorney, Agent, or Firm* — Dorsey & Whitney LLP

(57) ABSTRACT

Methods and systems for treating a waste substance containing perfluoro- and polyfluoroalkyl substances (PFAS) and mineralizing the PFAS, at least partially. The method includes combining the PFAS with a first amendment in a reactor to create a combination, heating and pressurizing the combination to hydrothermal conditions, and holding the combination at hydrothermal conditions for a holding time sufficient to at least partially mineralize the PFAS to create a treated combination.

20 Claims, 26 Drawing Sheets

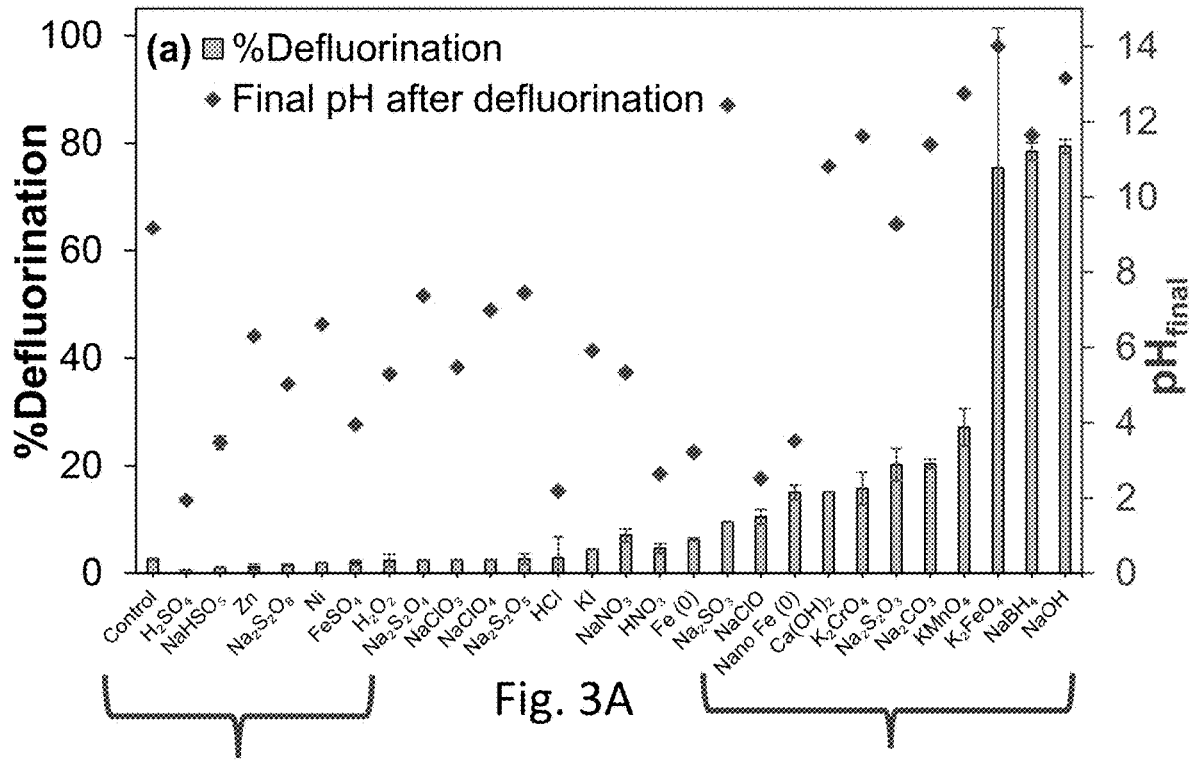
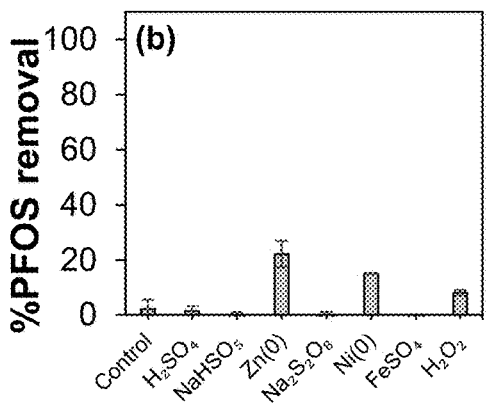
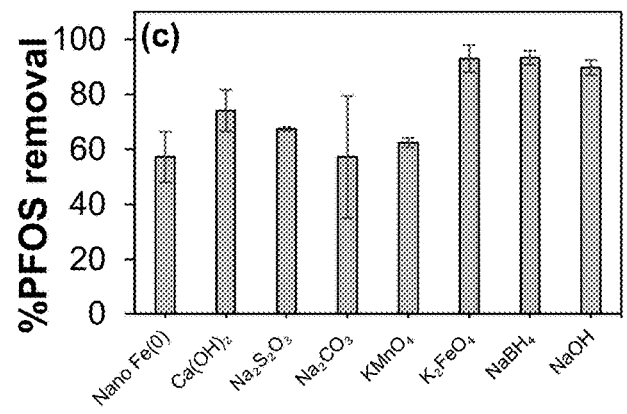
Fig. 3A
Fig. 3B
Fig. 3C

Fig. 5A

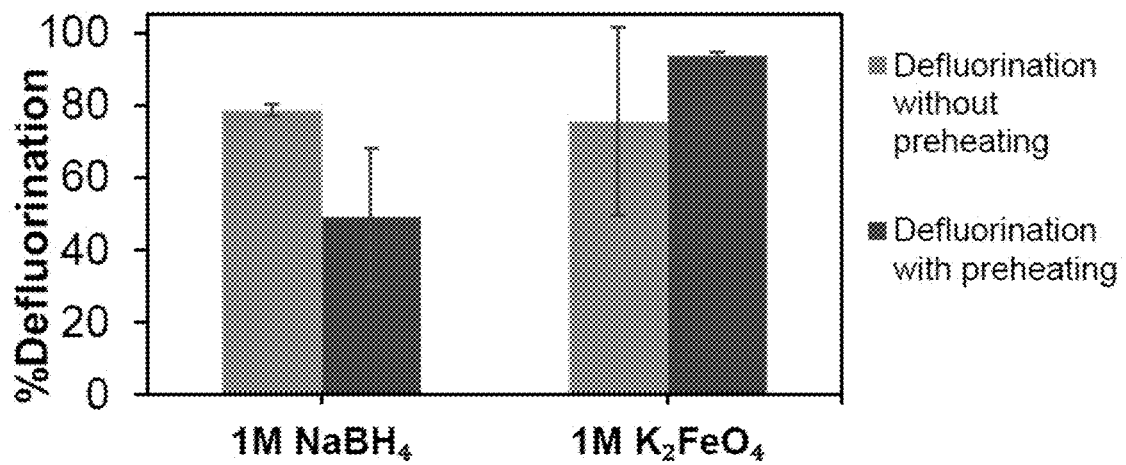

Fig. 5B

Measured Reaction Kinetics[a]

| PFOS (mg/L) | NaOH (mol/L) | $k_{obs}$ (min$^{-1}$) | $R^2$ | $k_{2,350°C}$ (M$^{-1}$·min$^{-1}$) |
|---|---|---|---|---|
| 50 | 1 | 0.015±0.001 | 0.95 | |
| | 2.5 | 0.10±0.01 | 0.95 | 0.052±0.004 |
| | 5 | 0.28±0.02 | 0.96 | |

[a]Reaction conditions: PFOS (50 mg/L) and NaOH amendment (1, 2.5 and 5 mol/L) in deionized water at 350 °C for 0-480 min. Uncertainties in $k_{obs}$ values represent min/max values determined in duplicate experiments. Uncertainties in $k_{2,350°C}$ values represent the min/max values obtained by plotting $k_{obs}$ values and NaOH concentrations.

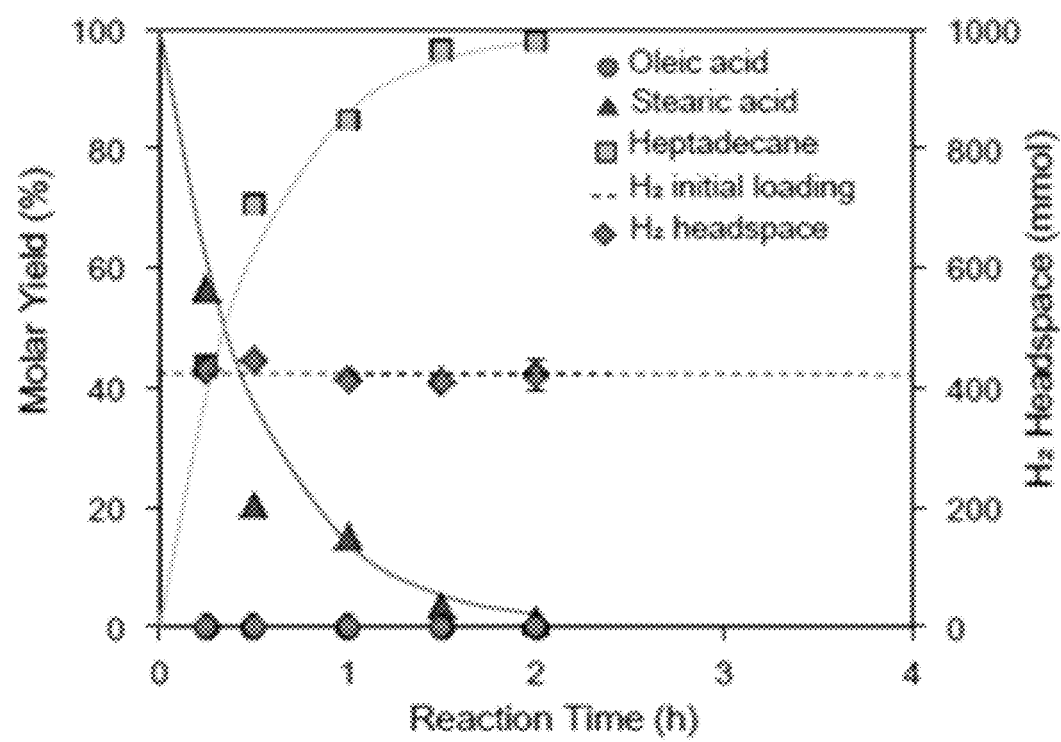
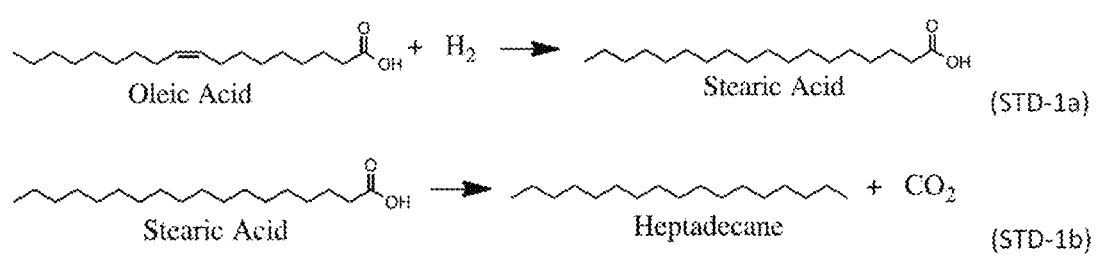
Fig. 18

Table 2. Hydrothermal Conditions and Reactive Amendments that will be Screened

*Hydrothermal Reaction Conditions*
Temp (°C): 150, 250, 350
Reaction Time (min): 5, 15, 30, 60, 120
Initial pH: 7, 3, 11

*Reactive Amendments*
Reducing Agents: sulfite, thiosulfate, dithionite, zerovalent iron, borohydride zerovalent Fe, zerovalent Mg, zerovalent Zn
Oxidizing Agents: persulfate, peroxymonosulfate, permanganate, hydrogen peroxide
Acids: HCl, $H_2SO_4$
Bases: NaOH, $Ca(OH)_2$ Batch screening experiments will be conducted using 4 mL stainless steel tube batch reactors, outfitted

Fig. 21

| Reagent | Purity grade | CAS# | Supplier |
|---|---|---|---|
| PFASs | | | |
| Perfluorooctanesulfonate (PFOS) | 40 wt.% in water | 1763-23-1 | Sigma-Aldrich, USA |
| Perfluorooctanoic acid (PFOA) | 95% | 335-67-1 | Sigma-Aldrich, USA |
| Perfluoroheptanoic acid (PFHpA) | >99% | 375-85-9 | Wellington Laboratories, Canada |
| Perfluorohexanoic acid (PFHxA) | >99% | 307-24-4 | Wellington Laboratories, Canada |
| Perfluoropentanoic acid (PFPeA) | >99% | 2706-90-3 | Wellington Laboratories, Canada |
| Perfluorobutanoic acid (PFBA) | >99% | 375-22-4 | Wellington Laboratories, Canada |
| Isotopically labeled internal standards | | | |
| [$^{13}C_4$]PFOS | >99% | Not available | Wellington Laboratories, Canada |
| [$^{13}C_4$]PFOA | >99% | Not available | Wellington Laboratories, Canada |
| [$^{13}C_4$]PFHpA | >99% | Not available | Wellington Laboratories, Canada |
| [$^{13}C_2$]PFHxA | >99% | Not available | Wellington Laboratories, Canada |
| [$^{13}C_5$]PFPeA | >99% | Not available | Wellington Laboratories, Canada |
| [$^{13}C_4$]PFBA | >99% | Not available | Wellington Laboratories, Canada |
| Bases and Acids | | | |
| NaOH | 97% | 1310-73-2 | Merck, Germany |
| Ca(OH)$_2$ | 95% | 1305-62-0 | Sigma-Aldrich, USA |
| Na$_2$CO$_3$ | 99.5% | 497-19-8 | Sigma-Aldrich, USA |
| HCl | 30 wt.% in water | 7647-01-0 | Sigma-Aldrich, USA |
| H$_2$SO$_4$ | 98% | 7664-93-9 | Sigma-Aldrich, USA |
| HNO$_3$ | 65 wt.% in water | 7697-37-2 | Sigma-Aldrich, USA |
| Oxidants | | | |
| K$_2$FeO$_4$ | 97% | 39469-86-8 | Element 26 Technol, TX, USA |
| KMnO$_4$ | 97% | 7722-64-7 | Sigma-Aldrich, USA |
| K$_2$CrO$_4$ | 99% | 9016-11-9 | Sigma-Aldrich, USA |
| NaClO$_4$ | 98% | 7601-89-0 | Sigma-Aldrich, USA |
| NaClO$_3$ | 97% | 7775-09-9 | Sigma-Aldrich, USA |
| NaClO | Available chlorine: 5 wt. % in water | 7681-52-9 | Sigma-Aldrich, USA |
| H$_2$O$_2$ | 30 wt.% in water | 7722-84-1 | Sigma-Aldrich, USA |
| Reductants | | | |
| NaBH$_4$ | 98% | 16940-66-2 | Sigma-Aldrich, USA |
| Na$_2$SO$_3$ | 98% | 7757-83-7 | Sigma-Aldrich, USA |
| Na$_2$S$_2$O$_3$ | 99.5% | 7772-98-7 | Sigma-Aldrich, USA |
| Na$_2$S$_2$O$_4$ | 82.5% | 7775-14-6 | Sigma-Aldrich, USA |
| Na$_2$S$_2$O$_5$ | 98% | 7681-57-4 | Sigma-Aldrich, USA |
| Na$_2$S$_2$O$_8$ | 98% | 7775-27-1 | Sigma-Aldrich, USA |
| NaHSO$_5$ | 98% | 28831-12-1 | Sigma-Aldrich, USA |
| KI | 99% | 7681-11-0 | Sigma-Aldrich, USA |
| FeSO$_4$ | 99% | 7782-63-0 | Sigma-Aldrich, USA |
| Fe(0) | 97%, 325 mesh | 7439-89-6 | Sigma-Aldrich, USA |
| Other | | | |
| NaNO$_3$ | 99% | 7631-99-4 | Sigma-Aldrich, USA |
| FeCl$_3$ | 97% | 7705-08-0 | Sigma-Aldrich, USA |
| NiCl$_2$ | 98% | 7718-54-9 | Sigma-Aldrich, USA |
| ZnCl$_2$ | 97% | 7646-85-7 | Sigma-Aldrich, USA |
| NaH$_2$PO$_4$ | 99% | 7558-80-7 | Sigma-Aldrich, USA |
| Na$_2$HPO$_4$ | 99% | 7558-79-4 | Sigma-Aldrich, USA |
| NaF | 99% | 7681-49-4 | Sigma-Aldrich, USA |
| D$_2$O | 99.96 atom % D | 7789-20-0 | Sigma-Aldrich, USA |
| Octanoic acid | 99% | 124-07-2 | Sigma-Aldrich, USA |
| Ammonium acetate | Optima LC-MS grade | 631-61-8 | Fisher Scientific, USA |
| Ammonium hydroxide | Optima grade | 1336-21-6 | Fisher Scientific, USA |
| Methanol | Optima LC-MS grade | 67-56-1 | Fisher Scientific, USA |
| Isopropanol | Optima LC-MS grade | 67-63-0 | Fisher Scientific, USA |
| Water (for LC-MS/MS) | Optima LC-MS grade | 7732-18-5 | Fisher Scientific, USA |

Fig. 22

| Name (Acronym) | Precursor > Product ion | DP | EP | CE | CXP | IS |
|---|---|---|---|---|---|---|
| PFBA(1) | 212.83 > 168.9 | -10 | -4.5 | -12 | 0 | MPFBA(1) |
| PFPeA(1) | 262.84 > 218.9 | -10 | -5 | -12 | 0 | M5PFPeA(1) |
| PFHxA(1) | 312.906 > 269 | -10 | -6 | -12 | 0 | M2PFHxA(1) |
| PFHxA(2) | 312.906 > 118.8 | -10 | -6 | -30 | -4 | M2PFHxA(1) |
| PFHpA(1) | 362.9 > 319.1 | -10 | -4 | -12 | -2 | M4PFHpA(1) |
| PFHpA(2) | 362.9 > 168.9 | -10 | -4 | -26 | 0 | M4PFHpA(2) |
| PFOA(1) | 412.912 > 369 | -10 | -4.5 | -14 | -2 | M4PFOA(1) |
| PFOA(2) | 412.912 > 168.9 | -10 | -4.5 | -24 | -4 | M4PFOA(1) |
| PFOS(1) | 498.897 > 79.9 | -70 | -7.5 | -86 | -6 | MPFOS(1) |
| PFOS(2) | 498.897 > 98.9 | -70 | -7.5 | -54 | 0 | MPFOS(1) |
| MPFBA(1) | 216.859 > 171.8 | -10 | -4.5 | -16 | 0 | |
| M5PFPeA(1) | 267.852 > 222.9 | -10 | -4 | -12 | -2 | |
| M2PFHxA(1) | 314.98 > 269.98 | -10 | -6 | -12 | -2 | |
| M2PFHxA(2) | 314.98 > 120 | -10 | -6 | -30 | 0 | |
| M4PFHpA(1) | 366.898 > 322 | -15 | -5.5 | -12 | -2 | |
| M4PFHpA(2) | 366.898 > 171.9 | -15 | -5.5 | -24 | 0 | |
| M4PFOA(1) | 416.929 > 372.1 | -10 | -4 | -14 | 0 | |
| M4PFOA(2) | 416.929 > 171.9 | -10 | -4 | -28 | -4 | |
| MPFOS(1) | 502.968 > 79.9 | -70 | -7 | -74 | -6 | |
| MPFOS(2) | 502.968 > 98.9 | -70 | -7 | -66 | 0 | |

Fig. 24

HYDROTHERMAL TECHNOLOGY FOR DECONTAMINATION AND MINERALIZATION OF PERFLUORO- AND POLYFLUOROALKYL SUBSTANCE (PFAS) IN WASTES, CONCENTRATE SOLUTIONS, AND CHEMICAL STOCKPILES

CROSS-REFERENCE TO RELATED APPLICATIONS

This application claims the benefit of priority pursuant to 35 U.S.C. § 119(e) of U.S. provisional patent application No. 62/769,950, filed 20 Nov. 2018, entitled "HYDROTHERMAL TECHNOLOGY FOR DECONTAMINATION AND MINERALIZATION OF PERFLUORO- AND POLYFLUOROALKYL SUBSTANCE (PFAS) IN WASTES, CONCENTRATE SOLUTIONS, AND CHEMICAL STOCKPILES," which is hereby incorporated by reference herein in its entirety.

GOVERNMENT LICENSE RIGHTS

This invention was made with Government support under ER18-L1-1501 awarded by the United States Department of Defense Strategic Environmental Restoration and Demonstration Program (SERDP). The Government has certain rights in the invention.

FIELD

The disclosed processes, methods, and systems disclosed are directed to hydrothermal treatment of wastes containing perfluoro- and polyfluoroalkyl substances.

BACKGROUND

Per- and poly-fluoroalkyl substances ("PFAS") are man-made chemicals with exceptional stability used in a variety of consumer and industrial products, including use as coatings (e.g., Teflon™), electronics, and as key ingredients in aqueous film forming foams ("AFFF") used to fight fuel fires. Military specifications often require the use of fluorinated chemicals in AFFF used to fight fires. Both civilian and military airports follow the military specification by law and have historically maintained fluorinated AFFF stockpiles at airports. The federal government recently adopted regulations allowing civilian airports to use non-fluorinated foams, possibly leading to upcoming needs to destroy large amounts of fluorinated AFFF when substitutes become available. For several decades, fire training activities at military bases and other facilities have released large volumes of AFFF containing PFAS into soils and water.

Industrial sources of PFAS contamination have also been found throughout the nation at manufacturing sites. In 2016, the United States Environmental Protection Agency ("EPA") issued lifetime health advisory levels for two PFASs in drinking water, perfluorooctane sulfonate ("PFOS") and perfluorooctanoic acid ("PFOA"), at the stringent level of 70 ng/L combined, and the agency is considering adopting regulatory limits on these compounds. This finding has generated a great deal of concern and the need to cleanup contaminated sites at military and industrial sites.

Unlike most organic chemicals, many PFAS are not biodegradable and are also extremely resistant to chemical degradation due to their highly fluorinated structure. Thus, it is commonly thought that PFAS may remain in the environment indefinitely without active efforts to remove or destroy the chemicals. Unfortunately, existing technologies for treatment of other organic chemicals are inadequate for PFAS due to their high chemical stability. PFAS could be managed in a number of different ways, but complete destruction of stockpiles and wastes is most desirable because it would reduce potential liabilities in the future if the managed wastes were to be inadvertently released (e.g., from a leaking landfill). Although there is currently a lack of toxicity data on these other PFASs, their continued presence in waste materials raises concerns about potential future liabilities. Recognizing this, the Department of Defense (DoD) is pro-actively supporting development of more comprehensive strategies aimed at addressing PFASs more broadly, including ionic and neutral structures, branched and linear isomers, and long- and short-chain structures.

Most existing treatment technologies only transfer PFAS from water to a solid phase adsorbent or partially degrade the compounds, where the byproducts are of unknown toxicity. There are reports of dry thermal destruction processes, including with lime, and reports of hydrothermal reactions amended with metallic iron and sometime persulfate (a strong oxidizing agent), but these reagents are expensive. Dry thermal treatment also requires removal of water from all samples and high operating temperatures. Off-site disposal in hazardous waste landfills is costly and does not completely eliminate liabilities. Incineration can lead to complete PFAS destruction, but is costly and requires large energy inputs for water samples and soil samples with high moisture content.

Due to their high chemical stability, treatment of PFAS contaminated water has been limited mostly to physical adsorption processes (e.g., activated carbon, ion exchange) that serve to transfer PFASs to a solid phase, which must be frequently replaced and disposed. As a result, there is considerable interest in technologies that can not only remove PFASs from environmental media but also mineralize the chemicals so that they pose limited future risk or liability. Recent studies have reported on PFAS transformations via electrochemical, UV photochemical and photocatalytic, sonochemical, plasma, and mechanochemical technologies. However, most of these reports indicate incomplete mineralization (defined as conversion to inorganic carbon, fluorine, and other elemental components of the PFAS chemical structures) of PFASs and/or ineffectiveness for some PFASs, e.g., such as PFOS during activated persulfate treatment. Slow or incomplete PFAS transformation is often accompanied by detection of shorter-chain fluorinated compounds that may still pose environmental risks.

Conventional physical-chemical approaches to destroy PFASs in-situ have also met with limited success. In situ chemical oxidation (ISCO) with activated persulfate has received considerable attention, but while results to date show some success destroying PFOA and related perfluoroalkyl carboxylic acids (PFCAs), the more widely detected perfluoroalkyl sulfonic acids (PFSAs) like PFOS remain resistant to treatment. Reactions with zerovalent iron (ZVI) at ambient environmental conditions, an effective option for treating chlorinated hydrocarbon contaminants (e.g., PCE, TCE), is completely ineffective for treating fluorinated chemicals like PFASs due to the much stronger C—F bonds. SERDP- and AFCEC-supported work by the PI and other groups has begun to show that reductive treatment by hydrated electrons ($e_{aq}^-$), a potent reducing agent ($E_H = -2.9$ V) can be broadly effective for degrading and defluorinating PFASs, but these processes are limited to treating aqueous streams (e.g., groundwater, concentrate brine streams) only due to the need to photo-generate the $e_{aq}^-$ with ultraviolet light. Similarly, electrochemical treatment systems that rely on reactions of PFASs at electrode surfaces, can be expected to be of limited utility treating on-site waste samples containing a mixture of solids and water. A technology that can mineralize PFAS would be attractive to site managers who wish to reduce potential future liabilities.

Currently, one option for complete destruction and mineralization of PFAS in chemical stockpiles, wastes, and concentrate streams (e.g., ion exchange regenerant waste stream) would be high temperature thermal decomposition or incineration processes that require drying of the materials. While this may be practical for PFAS-containing solid wastes, incineration of wet wastes and concentrate solutions is inefficient because of the high energy requirements for vaporizing water. Other approaches for treatment cannot ensure complete mineralization of the PFAS chemicals. Other disposal options would include landfilling in hazardous waste landfill, but this may be undesirable for any parties that want to ensure there remains little future liability associated with the wastes.

Cost-effective methods, systems and processes of mineralizing or destroying PFAS on-site are needed.

SUMMARY

Disclosed herein are methods and systems for treating a waste substance containing perfluoro- and polyfluoroalkyl substances (PFAS). The method includes combining the PFAS with a first amendment in a reactor to create a combination, heating the combination in the reactor to a temperature of about 200° C. or more, pressurizing the combination in the reactor to a pressure of about 2 MPa or more, and holding the combination in a heated and pressurized state for a holding time sufficient to at least partially mineralize the PFAS to create a treated combination.

A system for treating a waste substance containing PFAS is disclosed. The system includes a vessel adapted to combine the PFAS with a first amendment in the vessel to create a combination; heat the combination in the vessel to a temperature of about 200° C. or more; pressurize the combination in the vessel to a pressure of about 2 MPa or more; and hold the combination in a heated and pressurized state for a holding time sufficient to at least partially mineralize the PFAS to create a treated combination.

In various embodiments, the amendment is an acid, base, oxidant, or reductant. In various embodiments the amendment is one or more of HCl, $H_2SO_4$, or $HNO_3$, NaOH, $Ca(OH)_2$, KOH, $NH_4OH$, $Mg(OH)_2$, or $Na_2CO_3$, $K_2FeO_4$, $KMnO_4$, $K_2CrO_4$, $NaClO_4$, $NaClO_3$, NaClO, $H_2O_2$, $NaBH_4$, $Na_2SO_3$, $Na_2S_2O_3$, $Na_2S_2O_4$, $Na_2S_2O_5$, $Na_2S_2O_5$, $NaH_2SO_5$, KI, $FeSO_4$, $NaNO_3$, $FeCL_3$, $NiCl_2$, $ZnCl_2$, $NaH_2PO_4$, $Na_2HPO_4$, NaF, $D_2O$, octanoic acid, ammonium acetate, ammonium hydroxide, methanol, isopropanol, sulfite, or water. In preferred embodiments, the amendment is NaOH, $Ca(OH)_2$, $NH_4OH$, KOH, and/or $Mg(OH)_2$.

BRIEF DESCRIPTION OF THE DRAWINGS

FIG. 3A-3C depict results for mineralization of PFAS using a variety of examples of amendments according to the present disclosure, and LC-MS/MS analysis of residual PFOS concentrations in test samples using a variety of examples of amendments according to the present disclosure. Sorting of effective amendments in the hydrothermal destruction of PFOS. Symbols show the measured pH of the solution following reaction. Reaction conditions: PFOS (50 mg/L) and amendment (1 mol/L) in water at 350° C. for 90 min. Control: only PFOS (50 mg/L) in water at 350° C. for 90 min. FIG. 3A shows defluorination performance of all the screened amendments. FIG. 3B shows PFOS removal with the seven most ineffective amendments in defluorination, and FIG. 3C shows PFOS removal with the eight most effective amendments in defluorination. Error bars represent min/max values observed for duplicate experiments (smaller than symbol if not shown).

FIG. 4A shows the extent of PFOS defluorination observed following 90 min reaction (350° C.) in water amended with varying NaOH concentrations. FIG. 4B shows the extent of PFOS defluorination following 90 min reaction in water amended with either a strong reductant ($NaBH_4$) or strong oxidant ($K_2FeO_4$) where solutions are either unbuffered or buffered at pH 9 or 4 using phosphate (PBS, 1 mol/L). Bars indicate the extent of defluorination (left axis) and symbols represent the pH values measured after quenching the reactions. Error bars represent min/max values observed for duplicate experiments (smaller than symbol if not visible).

FIGS. 5A and 5B depict experimental results investigating effects of preheating (and re-cooling) solutions amended with $NaBH_4$ or $K_2FeO_4$ before introducing PFOS and re-heating on the extent of PFOS defluorination. FIG. 5A is a bar graph showing these effects and FIG. 5B shows kinetics for the reaction.

FIG. 8A shows 50 mg/L PFOS with 1 M NaOH at 350° C., and FIGS. 8B and 8C show 50 mg/L PFOA with 0.001 M NaOH at 200° C. Error bars represent min/max values observed for duplicate experiments (smaller than symbol if not visible).

FIG. 18 results from study of the hydrothermal catalytic transformation of long-chain fatty acids (e.g., oleic and stearic acid) into hydrocarbon fuels and in situ $H_2(g)$ production. Graph at top shows the sequential conversion of oleic acid to stearic acid followed by conversion to heptadecane (equation at bottom) at 300° C. in water. Line show pseudo-first-order kinetic rate law model.

FIG. 21 presents Table 2 showing hydrothermal conditions and reactive amendments in accordance with the present disclosure.

FIG. 22 depicts a list of reagents used in experiments in accordance with the present disclosure.

FIG. 24 table showing PFAS analytes names (acronyms), acquisition masses, parameters, internal standard used for LC-MS/MS analysis. Number next to analytes name represents selected for quantification (1) or confirmation (2). DP, declustering potential; CE, collision energy; EP, entrance potential; CXP, collision cell exit potential; IS, used IS the native compound.

DETAILED DESCRIPTION

Figure 1:
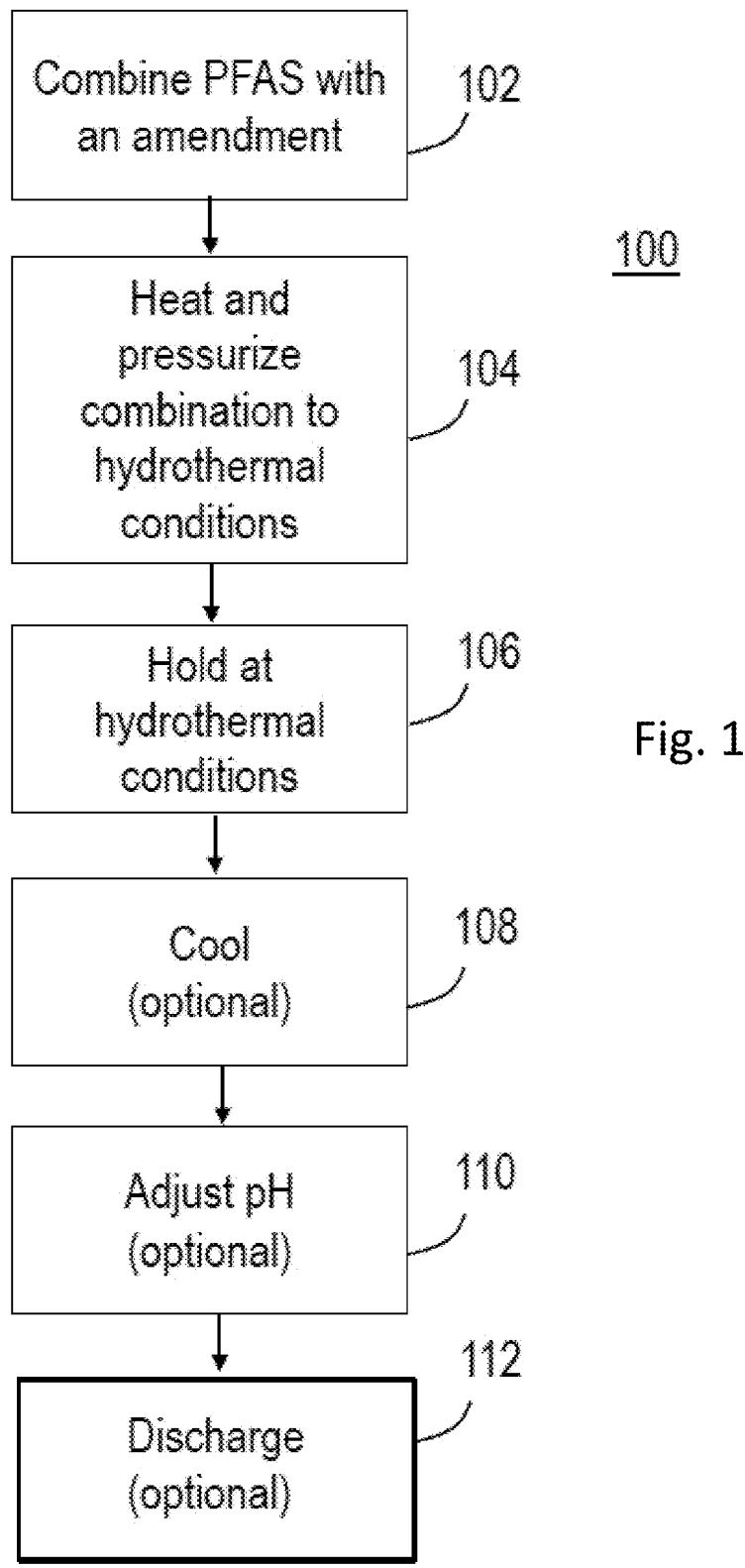
FIG. 1 depicts an example of a method of mineralizing PFAS.

Disclosed herein are methods, systems, and processes for converting PFAS structures into inorganic fluoride ions and inorganic carbon, nitrogen, and sulfur species. We believe that the hydrothermal process we have developed is unique because it has the ability to mineralize diverse PFAS structures, converting the chemicals to inorganic fluoride ions and inorganic carbon, nitrogen, and sulfur species. This can be accomplished in the native wet state of samples, while minimizing or eliminating the need for extraction, recovery or drying of field samples. We envision that the process could be operated as a mobile unit that could be brought to the site where PFAS stockpiles are stored or contamination has occurred, reducing liability issues associated with transporting PFAS off the property site to a separate location. The disclosed hydrothermal processes use much less energy than competing thermal treatment or incineration processes, and the resulting byproducts may be more conducive to on-site disposal than high temperature incineration and thermal treatment operations.

Recent advances in hydrothermal conversion processes and technology development have resulted from heavy interest in the development of second- and third generation biofuels from cellulosic crop residues and emerging bioenergy feedstocks like algae. These advances may also benefit efforts to develop efficient processes for destruction of highly recalcitrant contaminants like PFASs in waste materials. The fluorinated backbone within PFASs imparts extreme recalcitrance and persistence under ambient environmental conditions. As a result, many of the same remedial technologies used for destruction of other legacy contaminants (e.g., bioremediation, in situ chemical oxidation) are largely ineffective for PFASs. There is no published evidence for biodegradation of perfluoroalkyl acids like PFOS or PFOA. While selected fluorotelomer alcohol and sulfonamide derivatives have been shown to be slowly biotransformed to the corresponding perfluoroalkyl acids, no further biotransformation has been documented. In addition, there is no evidence for natural attenuation of PFASs by abiotic reactions like oxidation or reduction by soil minerals. Thus, monitored natural attenuation of PFASs in site waste materials is not a viable strategy for addressing PFAS-contaminated waste materials, and contamination may persist indefinitely without more active interventions.

Subcritical hydrothermal processing is an alternative technology suited to processing wet waste concentrates. It applies elevated temperatures and pressures (e.g., 200-374° C., 2-22 MPa) to water in the sealed environment that prevents vaporization, leading to a reactive environment that has been shown to catalyze many chemical transformations that do not occur at lower temperatures, something that is being heavily exploited for production of biorenewable fuels and chemicals. While somewhat counterintuitive, heating compressed water to the subcritical hydrothermal conditions consumes less energy than evaporating water at lower temperatures. Hori and co-workers reported promising results of experiments showing decomposition and defluorination of PFOS and perfluorohexanesulfonate (PFHxS) in subcritical hydrothermal solutions amended with zerovalent iron. Although the PFASs were transformed, reactions required elevated iron loadings (>50 g/L), and mineralization was incomplete. While these findings support the promise of hydrothermal processing for PFAS destruction, better, lower-cost reagents are needed that are more effective in catalyzing the mineralization of PFASs.

The present disclosure reports on a promising advancement in the hydrothermal treatment of PFASs. We found that NaOH and other reagents that increase pH promote decomposition and defluorination of PFOS. Further experiments were undertaken to examine the kinetics and provide mechanistic insights into the processes controlling PFOS transformation and mineralization in NaOH-amended hydrothermal solutions. Findings from this work supports an alternative technology for treatment of PFAS-contaminated liquid wastes, including AFFF stockpiles, industrial byproduct streams, and a wide range of waste concentrates generated as byproducts of PFAS water treatment (e.g., ion exchange regenerant waste).

FIG. 1 illustrates a method 100 of the present disclosure for converting PFAS structures into inorganic fluoride ion and inorganic carbon, nitrogen, and sulfur species.

The method 100 may begin in operation 102 where the PFAS is combined with an amendment. An amendment is a chemical species that will, when combined with PFAS under hydrothermal conditions at least partially degrade or convert the PFAS into other chemical species. Some examples of amendments that may be used with the disclosed methods include one or more of: acids and bases such as NaOH, $Ca(OH)_2$, $Na_2CO_3$, KOH, $NH_4OH$, $Mg(OH)_2$, HCl, $H_2SO_4$, $HNO_3$; oxidants such as $K_2FeO_4$, $KMnO_4$, $K_2CrO_4$, $NaClO_4$, $NaClO_3$, NaClO, $H_2O_2$; reductants such as $NaBH_4$, $Na_2SO_3$, $Na_2S_2O_3$, $Na_2S_2O_4$, $Na_2S_2O_5$, $Na_2S_2O_5$, $Na_2HSO_5$, KI, $FeSO_4$, Fe(0); or other compounds such as $NaNO_3$, $FeCL_3$, $NiCL_2$, $ZnCl_2$, $NaH_2PO_4$, $Na_2HPO_4$, NaF, $D_2O$, octanoic acid, ammonium acetate, ammonium hydroxide, methanol, isopropanol, sulfite, and water. Operation 102 may optionally include bringing the combination of PFAS and amendment to a moisture content, for instance by adding or removing water. For example, in some embodiments, the moisture content can be adjusted to about 60%, 65%, 70%, 75%, 80%, 85%, 90%, 95% water or more. In other embodiments operation 102 can include adding a co-solvent to the PFAS. This may be useful for extracting PFAS wastes from soil, other matter, or adsorbents like ion exchange resins. In some embodiments, where a solvent is mixed with the PFAS and amendment, the water content may be as low as 10%, 15%, 20%, 25%, 20%, 35%, 40%, 45%, 50%, 55%, 60%, 65%, 70%, 75%, 80%, 85%, 90%, or 95%. For example, in waste brine mixtures where about 50% methanol is used in the regeneration of PFAS-saturated ion exchange resins, water content may be as low as 25%.

The method 100 may proceed to operation 104 and the combined PFAS and amendment are heated and pressurized in a sealed reactor to hydrothermal conditions. Such a reactor is typically sealed such that the combination of PFAS and amendment can increase in both pressure and temperature. The reactor can be a batch reactor or a continuous process reactor. In some embodiments, a continuous process reactor includes a back pressure regulating device that maintains the reactor pressure, and heaters or other devices maintain the reactor temperature, at hydrothermal conditions while allowing reactants to flow into the reactor and products to flow out. Pumps, compressors, valves, stirrers, agitators, turbulators, filters, heat exchangers, temperature and pressure controllers, programmable logic controllers or other processing elements, and other suitable process equipment may be in communication with, or included in, either batch or continuous process reactors. The hydrothermal conditions can be approximately 200-374° C. and a pressure of approximately 2-22 MPa. For example, the temperature may be greater than about 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., 300° C., 310° C., 315° C., 320° C., 325° C., 330° C., 335° C., 340° C., 345° C., 350° C., 355° C., 360° C., 365° C., or 370° C., and less than about 375° C., 370° C., 365° C., 360° C., 355° C., 350° C., 345° C., 340° C., 335° C., 330° C., 325° C., 320° C., 315° C., 310° C., 305° C., 295° C., 290° C., 285° C., 280° C., 275° C., 270° C., 265° C., 260° C., 255° C., 250° C., 245° C., 240° C., 235° C., 230° C., 225° C., 220° C., 215° C., 210° C., or 205° C. The pressure may be greater than about 2.0 MPa, 2.5 MPa, 3.0 MPa, 3.5 MPa, 4.0 MPa, 4.5 MPa, 5.0 MPa, 5.5 MPa, 6.0 MPa, 6.5 MPa, 7.0 MPa, 7.5 MPa, 8.0 MPa, 8.5 MPa, 9.0 MPa, 9.5 MPa, 10.0 MPa, 10.5 MPa, 11.5 MPa, 12.0 MPa, 12.5 MPa, 13.0 MPa, 13.5 MPa, 14.0 MPa, 14.5 MPa, 15.0 MPa, 15.5 MPa, 16.0 MPa, 16.5 MPa, 17.0 MPa, 17.5 MPa, 18.0 MPa, 18.5 MPa, 19.0 MPa, 19.5 MPa, 20.0 MPa, 20.5 MPa, 21.0 MPa, or 21.5 MPa, and less than about 22.0 MPa, 21.5 MPa, 21.0 MPa, 20.5 MPa, 20.0 MPa, 19.5 MPa, 19.0 MPa, 18.5 MPa, 18.0 MPa, 17.5 MPa, 17.0 MPa, 16.5 MPa, 16.0 MPa, 15.5 MPa, 15.0 MPa, 14.5 MPa, 14.0 MPa, 13.5 MPa, 13.0 MPa, 12.5 MPa, 12.0 MPa, 11.5 MPa, 11.0 MPa, 10.5 MPa, 10.0 MPa, 9.5 MPa, 9.0 MPa, 8.5 MPa, 8.0 MPa, 7.5 MPa, 7.0 MPa, 6.5 MPa, 6.0 MPa, 5.5 MPa, 5.0 MPa, 4.5 MPa, 4.0 MPa, 3.5 MPa, 3.0 MPa, and 2.5 MPa. In many embodiments, the pressure can be autogenously generated as a result of heating the combination in the reactor.

In other embodiments, the combined PFAS and amendment are heated and pressurized in a reactor to supercritical hydrothermal conditions with temperatures from about 374° C. to about 700° C. and pressures from about 21.5 MPa to about 50 MPa. Similar or the same amendments and PFAS used in subcritical hydrothermal conditions are applicable to supercritical hydrothermal conditions. Reactors or other pressure vessels for use in supercritical hydrothermal processing conditions may have thicker walls or other design features or be made from stronger, more corrosion resistant materials and materials adapted to withstand such conditions. For example, pressure vessels operating at about 700° C. may be made from high nickel steel alloys such as Inconel®. Mineralizing PFAS under supercritical conditions may allow for shorter processing times (e.g., in operation 106) and/or lower dosing of amendments for a given level of mineralization. Also, supercritical processing may be more effective against highly recalcitrant PFAS that are more difficult to mineralize at subcritical conditions.

The method may proceed to operation 106 and the combination of PFAS and an amendment is held at hydrothermal conditions for a specified time to allow the PFAS to be at least partially mineralized into a treated combination of products of the reaction between the PFAs and amendment. In some embodiments of the method, the combination can be held at hydrothermal conditions for approximately 10 minutes, 15 minutes, 30 minutes, 48 minutes, 90 minutes, 480 minutes, or up to 600 minutes. In many embodiments, the hold/reaction time may be greater than about 10 min, 20 min, 30 min, 40 min, 50 min, 60 min, 70 min, 80 min, 90 min, 100 min, 110 min, 120 min, 130 min, 140 min, 150 min, 160 min, 170 min, 180 min, 190 min, 200 min, 210 min, 220 min, 230 min, 240 min, 250 min, 260 min, 270 min, 280 min, 290 min, 300 min, 310 min, 320 min, 330 min, 340 min, 350 min, 360 min, 370 min, 380 min, 390 min, 400 min, 410 min, 420 min, 430 min, 440 min, 450 min, 460 min, 470 min, 480 min, 490 min, 500 min, 510 min, 520 min, 530 min, 540 min, 550 min, 560 min, 570 min, 580 min, 590 min, or 600 min, and less than about 610 min, 600 min, 590 min, 580 min, 570 min, 560 min, 550 min, 540 min, 530 min, 520 min, 510 min, 500 min, 490 min, 480 min, 470 min, 460 min, 450 min, 440 min, 430 min, 420 min, 410 min, 400 min, 390 min, 380 min, 370 min, 360 min, 350 min, 340 min, 330 min, 320 min, 310 min, 300 min, 290 min, 280 min, 270 min, 260 min, 250 min, 240 min, 230 min, 220 min, 210 min, 200 min, 190 min, 180 min, 170 min, 160 min, 150 min, 140 min, 130 min, 120 min, 110 min, 100 min, 90 min, 80 min, 70 min, 60 min, 50 min, 40 min, 30 min, 20 min, or 15 min.

Longer or shorter hold times are envisioned depending on the particular PFAS to be mineralized, the amendment added, and the temperature and pressure at which the combination is held. Other factors may affect hold times as well, such as the presence of soil or other matter in the PFAS sample to be mineralized.

The method may optionally proceed to operation 108 and the reactor and/or the materials within it, (i.e. the reactor charge) are cooled to conditions that allow the charge to be removed from the reactor and safely disposed of. In one example, the reactor charge can be cooled to ambient temperature and pressure conditions. Heat removed from the reactor can be used to preheat influent into another similar reactor, thereby reducing energy usage.

The method may optionally proceed to operation 110 and a pH of the reactor charge is adjusted such that the charge can be disposed of. The pH may be reduced for instance by adding an acid in liquid form, of an acidizing gas such as carbon dioxide. The pH may be increased such as by adding a base like NaOH. Preferably, the pH is adjusted in operation 110 to a level near a neutral pH of 7, or close enough thereto to allow disposal of the reactor charge.

The method 100 may optionally conclude in operation 112 where the reactor charge is discharged or otherwise removed from the reactor for further processing or disposal. It should be appreciated that the operations 108, 110, and 112 can be performed in an order other than that presented without deviating from the present disclosure.

A series of amendments were tested, for example for their potential to promote PFOS defluorination under near-critical hydrothermal conditions (for example at 350° C., 16.5 MPa autogenous pressure). FIG. 3A shows the extent of F— release measured after 90 min, varying from near 0% (for the unamended control and roughly half the screened amendments) to 80%. The most effective reagents, yielding>70% defluorination, include sodium hydroxide (NaOH), sodium borohydride ($NaBH_4$), and potassium ferrate ($K_2FeO_4$). Potassium permanganate ($KMnO_4$), sodium carbonate ($Na_2CO_3$), and sodium thiosulfate ($Na_2S_2O_3$) also led to >20% defluorination. Sodium persulfate, an oxidizing agent being developed to remediate PFASs, had little effect on PFOS concentration or F— release during hydrothermal reactions. This agrees with a recent report documenting a lack of reactivity for perfluoroalkyl sulfonates like PFOS during heat-activated persulfate treatment, despite previous reports showing reactivity with PFOA and related perfluoroalkyl carboxylates and their precursors. Powdered Fe(0) exhibited much less reactivity, leading to only 6.3% defluorination. Nano Fe(0) (i.e., nZVI) was more effective but still yielded less defluorination (15.1%) than the other amendments.

Lime, (A.K.A. $Ca(OH)_2$) may be a preferred amendment since it is a commonly used bulk chemical for increasing pH at public drinking water utilities, and thus readily available and low cost. The $F^-$ release to solution measured when using lime may be an underestimate since $F^-$ forms insoluble precipitates with $Ca^{2+}$ ions (e.g., $CaF_2(s)$), and the reactor may have excess concentrations of $Ca^{2+}$ for instance when 1 mol/L $Ca(OH)_2$ is added to the reactor. Similarly, the measured $F^-$ release to solution upon adding $KMnO_4$ and $K_2FeO_4$ may be an underestimate because Manganese and Iron precipitate solids formed which can effectively adsorb $F^-$ from solution. Thus, the $F^-$ that reacts with these and other positively-charged ions to form solid precipitates is not detected in solution, but could be detected by further chemical analysis of precipitates formed in the reactor.

LC-MS/MS analysis of residual PFOS concentrations in the test samples confirms the reactivity trends observed from $F^-$ measurements (FIGS. 3B, 3C). Little PFOS degradation was observed for amendments where minimal $F^-$ release was detected (FIG. 3B), whereas >50% PFOS loss was observed for all amendments yielding>15% defluorination, and >80% PFOS degradation was measured in NaOH—, $NaBH_4^-$, and $K_2FeO_4^-$ amended samples. The greater extents to which parent PFOS loss was observed as compared to the $F^-$ released indicate that the initial reaction step converts PFOS into one or more fluorinated organic intermediates.

Without being limited to any mechanism or mode of action the method 100 may operate according to the following principles.

Role of Alkaline pH Conditions. Although the most effective reagents include bases (NaOH, $Na_2CO_3$, $Ca(OH)_2$), oxidants ($K_2FeO_4$, $KMnO_4$), and reductants ($NaBH_4$, $Na_2S_2O_3$), they share the common feature that their addition to a solution causes an increase in pH. Furthermore, amendments that caused the greatest defluorination also tended to increase the final pH the most. This suggests a common OH⁻-catalyzed mechanism, and that the reactivity observed for oxidants and reductants is an indirect result of their effect on solution pH.

Figure 4A:
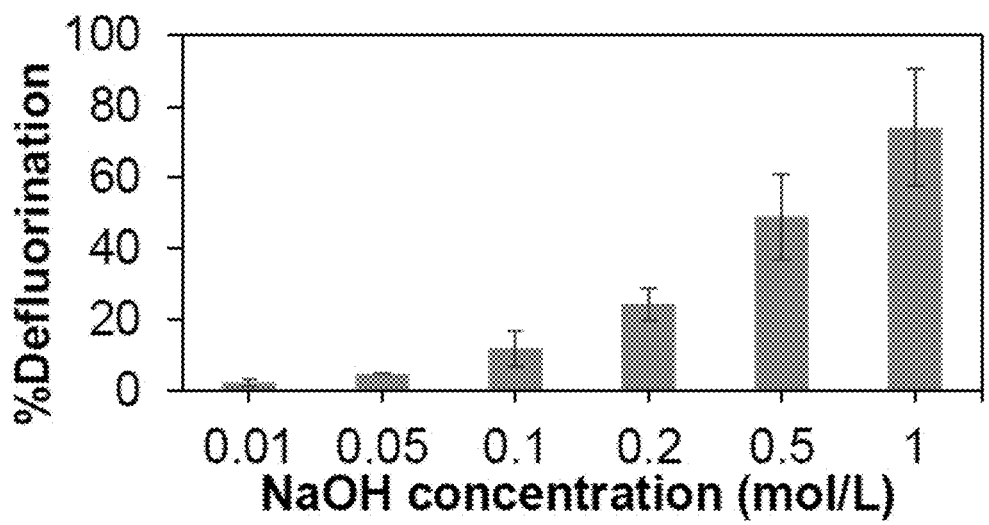
FIGS. 4A and 4B show the effect of NaOH concentration and the pH of solutions amended with other reagents on hydrothermal defluorination of PFOS.
Figure 4B:
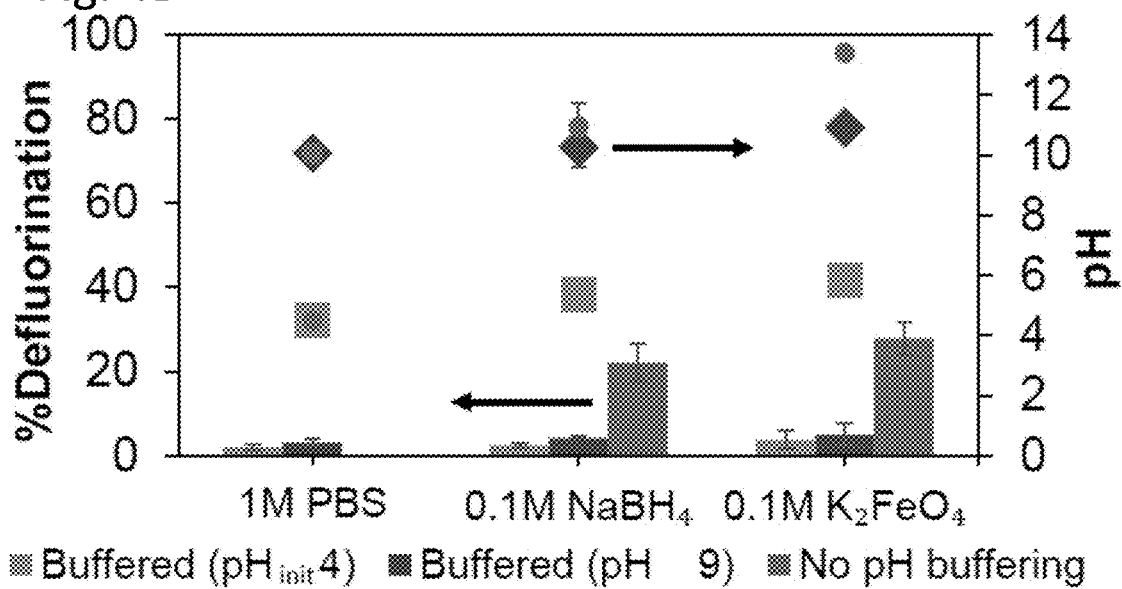

The role of alkaline pH conditions was supported by a series of control experiments. First, the extent of defluorination increased with increasing concentration of NaOH added to solution (FIG. 4A). Second, the extent of PFOS defluorination in $NaBH_4^-$ and $K_2FeO_4^-$ amended solutions decreased dramatically when solutions were buffered at lower pH conditions before hydrothermal reaction (FIG. 4B). Ferrate is a stronger oxidant under acidic conditions ($FeO_4^{2-}/Fe^{3+}$, $E^0$=2.20 V) than alkaline conditions ($FeO_4^{2-}/Fe(OH)_3$, $E^0$=0.72 V), so decreased reactivity at lower pH conditions is counter to expectations if PFOS oxidation was the operative mechanism.

Finally, $NaBH_4$ and $K_2FeO_4$ are both unstable in water and rapidly decay under thermal conditions losing their reactive properties while simultaneously releasing OH⁻ ions that increase pH. Separate tests showed that preheating $NaBH_4$ and $K_2FeO_4$ solutions to drive equations 1 and 2, below, to completion before introducing PFOS had only a small effect on the resulting extent of defluorination (FIGS. 5A and 5B).

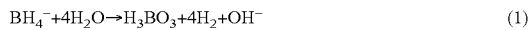

$$BH_4^- + 4H_2O \rightarrow H_3BO_3 + 4H_2 + OH^- \quad (1)$$

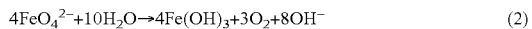

$$4FeO_4^{2-} + 10H_2O \rightarrow 4Fe(OH)_3 + 3O_2 + 8OH^- \quad (2)$$

Figure 6:
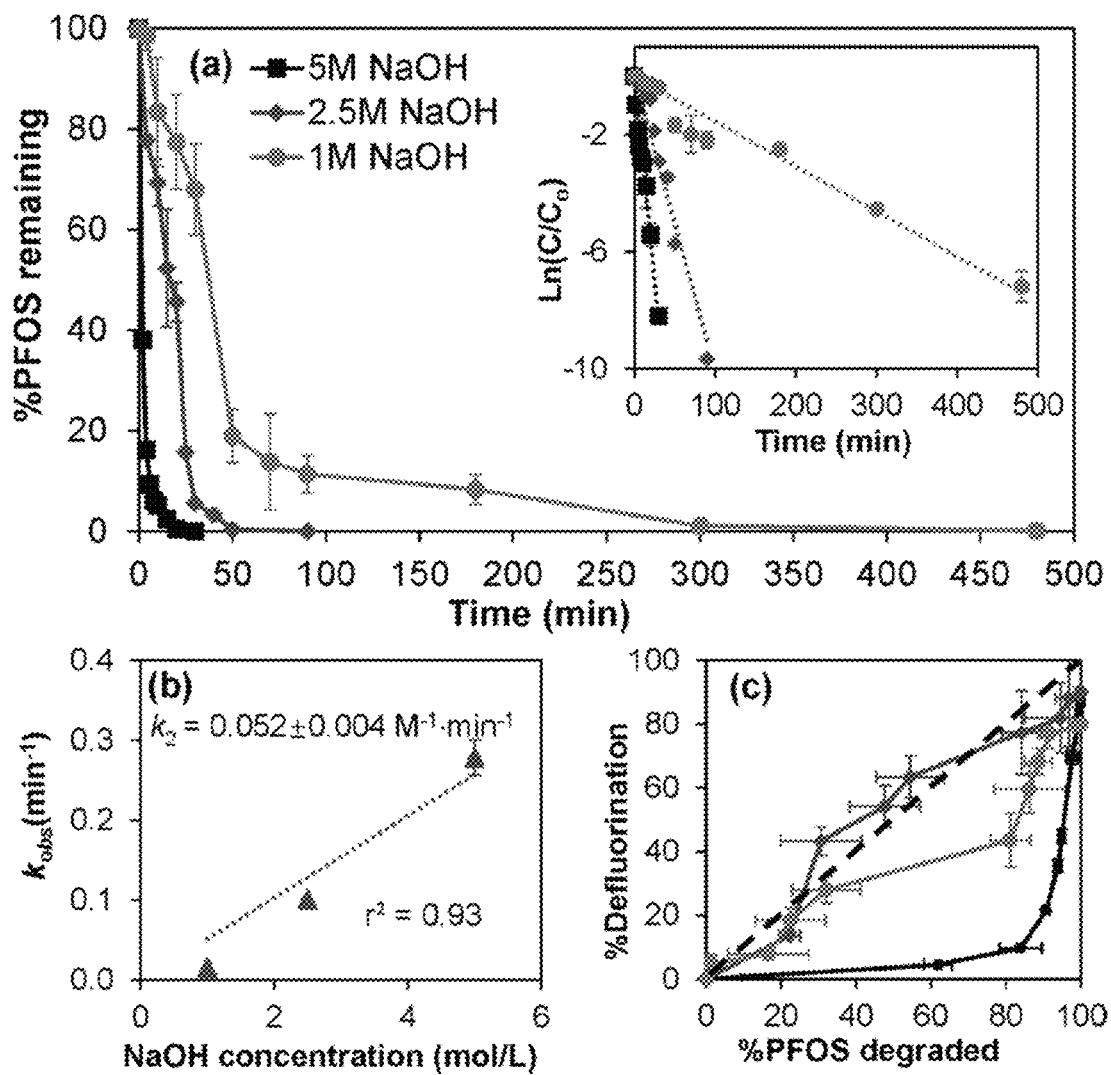
FIG. 6 shows kinetic analysis on alkaline-based hydrothermal destruction of PFOS. Reaction conditions: PFOS (50 mg/L) and NaOH amendment (1, 2.5, and 5 mol/L) in water at 350° C. for 0-480 min: Panel (A) shows PFOS decay, Panel (B) shows linear relationship between $k_{obs}$ vs NaOH concentration, and Panel (C) shows extent of defluorination vs extent of PFOS degraded. Error bars represent min/max values observed for duplicate experiments (smaller than symbol if not shown). The inset in Panel (A) shows linearized first-order model fits.

NaOH-Assisted Destruction of PFOS. Since the hydrothermal defluorination appeared to be linked to the alkaline conditions, a more in-depth examination of reactions in NaOH-amended solutions was undertaken. FIGS. 6A-6C shows the effects of varying NaOH concentration, PFOS degradation, and defluorination kinetics. The degradation of PFOS observed in individual batch reactors followed pseudo-first-order kinetics (FIG. 6 Panel A), and the resulting pseudo-first-order rate constants ($k_{obs}$, min⁻¹) were linearly dependent on NaOH concentration (FIG. 6 Panel B). It follows that PFOS removal can be described by a general second-order law given in equation 3, where [PFOS] and [OH⁻] are the molar concentrations of PFOS and OH⁻, respectively, t is time (min), and $k_2$ is the second-order rate constant ($M^{-1}$ min⁻¹).

$$\frac{d[PFOS]}{dt} = -k_{obs}[PFOS] = -k_2[OH^-][PFOS] \quad (3)$$

Figure 7:
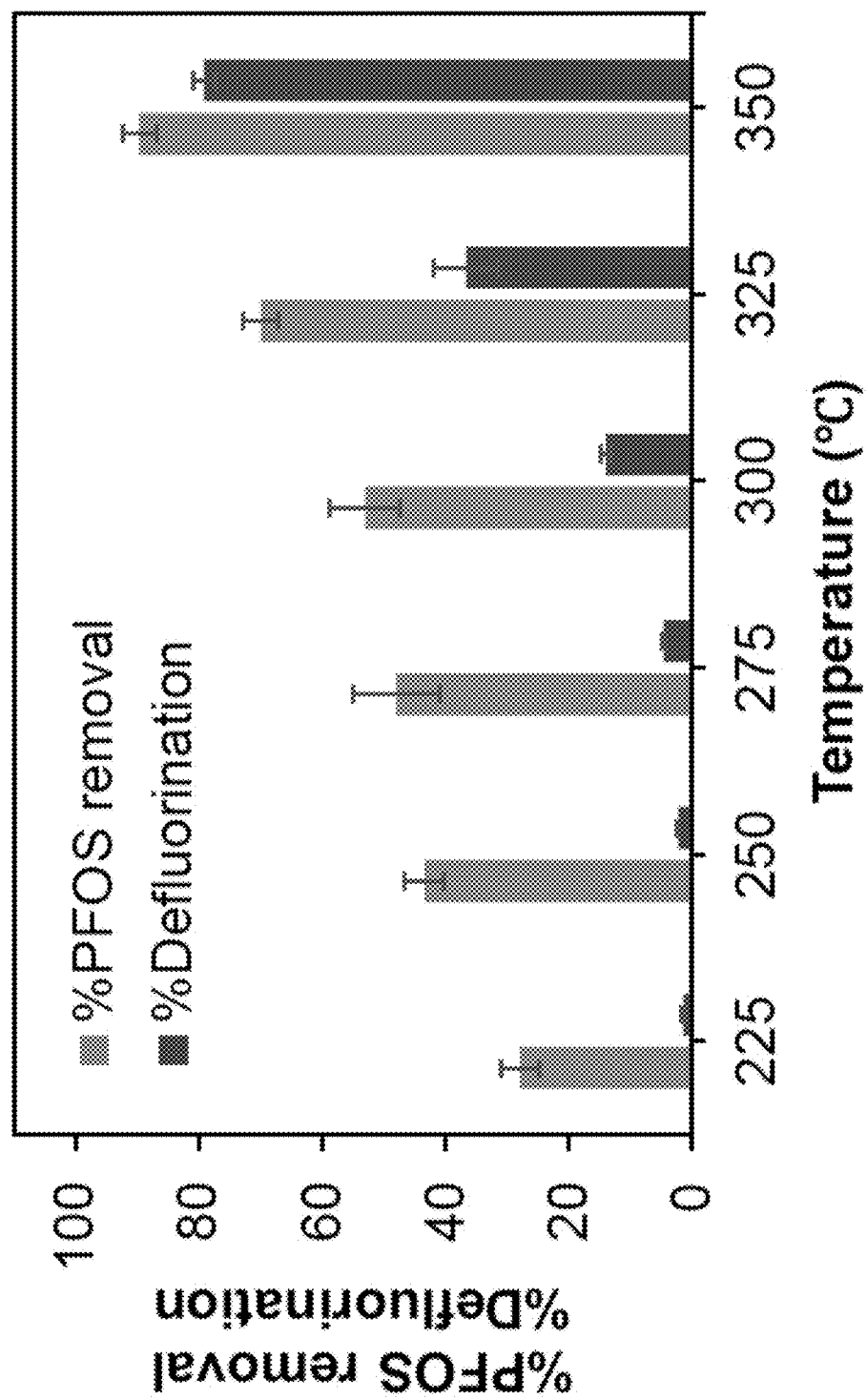
FIG. 7 depicts Effect of reaction temperature on the extent of PFOS degradation and defluorination in solutions amended with NaOH. Reaction conditions: PFOS (50 mg/L), NaOH (1 mol/L), 350° C., 90 min. Error bars represent min/max values observed for duplicate experiments.

A fit of the data yields a $k_2$ value of 0.052±0.004 $M^{-1}$ min⁻¹ for 350° C. (FIG. 5B). Applying this model results in a predicted reaction time of 48 min with 5M NaOH to reduce the PFOS concentration from 50 mg/L down to the USEPA's drinking water health advisory level (70 ng/L). As expected, the rate of PFOS decomposition also varies with reaction temperature (FIG. 7).

FIG. 6 Panel C compares the incremental extent of defluorination with PFOS loss during experiments. While data for the treatment with 2.5 M NaOH showed close agreement between % PFOS degradation and % defluorination, % defluorination initially lags behind % PFOS degradation for the other two concentrations. This finding is consistent with the general observation for the most effective amendments screened, where % defluorination lagged behind the % PFOS degradation. For NaOH, the lag in defluorination becomes less pronounced at higher temperatures (FIG. 7). This is consistent with an initial formation of organic-fluorine intermediates.

Figure 8A:
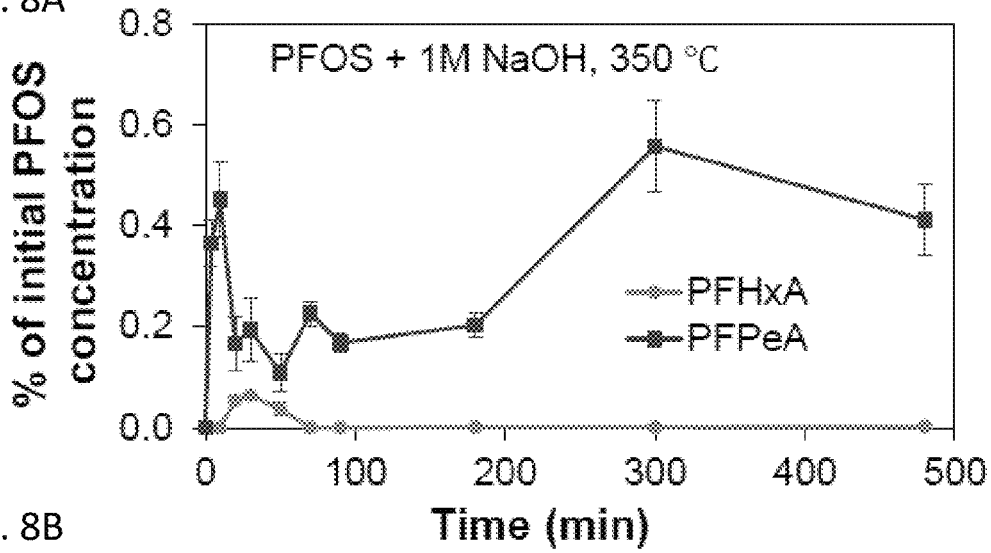
FIGS. 8A, 8B, and 8C depict experimental results investigating intermediate products observed during hydrothermal treatment of PFAS.
Figure 8B:
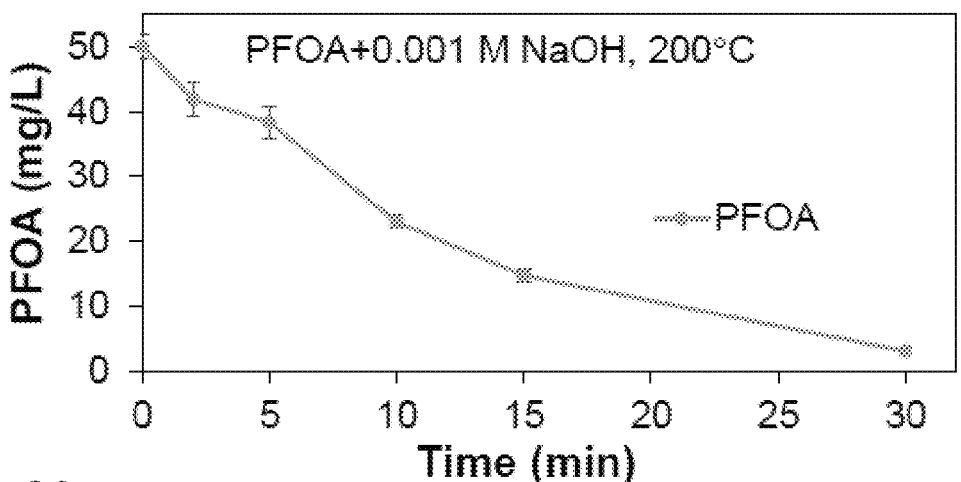
Figure 8C:
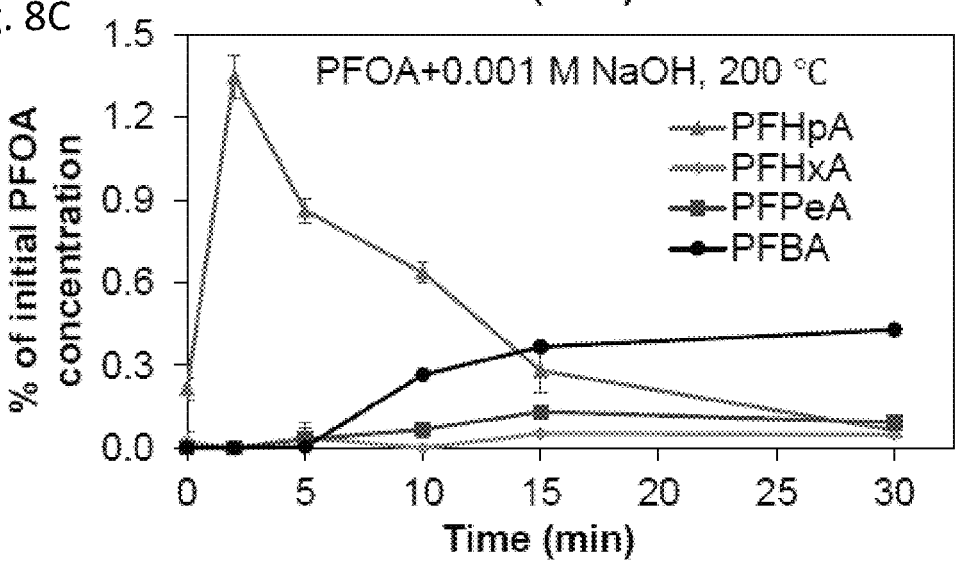

LC-MS/MS analysis confirms formation of fluorinated organic intermediates, albeit at very low concentrations (FIGS. 8A-8C). Analysis of samples from the PFOS reaction in 1 M NaOH revealed formation of perfluorohexanoic acid (PFHxA) and perfluoropentanoic acid (PFPeA), but concentrations only reached 0.10% and 2.1% (mol/mol), respectively, of the initial PFOS concentration. Still, these observations indicate conversion of the sulfonate to shorter-chain perfluoroalkyl carboxylates. Separate tests showed that perfluoroalkyl carboxylates are much less stable in hydrothermal media than PFOS (e.g., >99% PFOA degraded within 30 min at 250° C. without amendments). Further experiments initiated with PFOA at lower temperature (200° C.) and NaOH concentration (0.001 M) showed 94% degradation within 30 min (FIG. 8B), with maximum concentrations of shorter-chain analogues reaching 1.5±0.1% of the initial PFOA concentration (FIG. 8C). Furthermore, temporal trends show that the C7 perfluoroheptanoic acid (PFHpA) peaks in concentration before concentrations of shorter-chain homologues increase, consistent with sequential decarboxylation.

Figure 9:
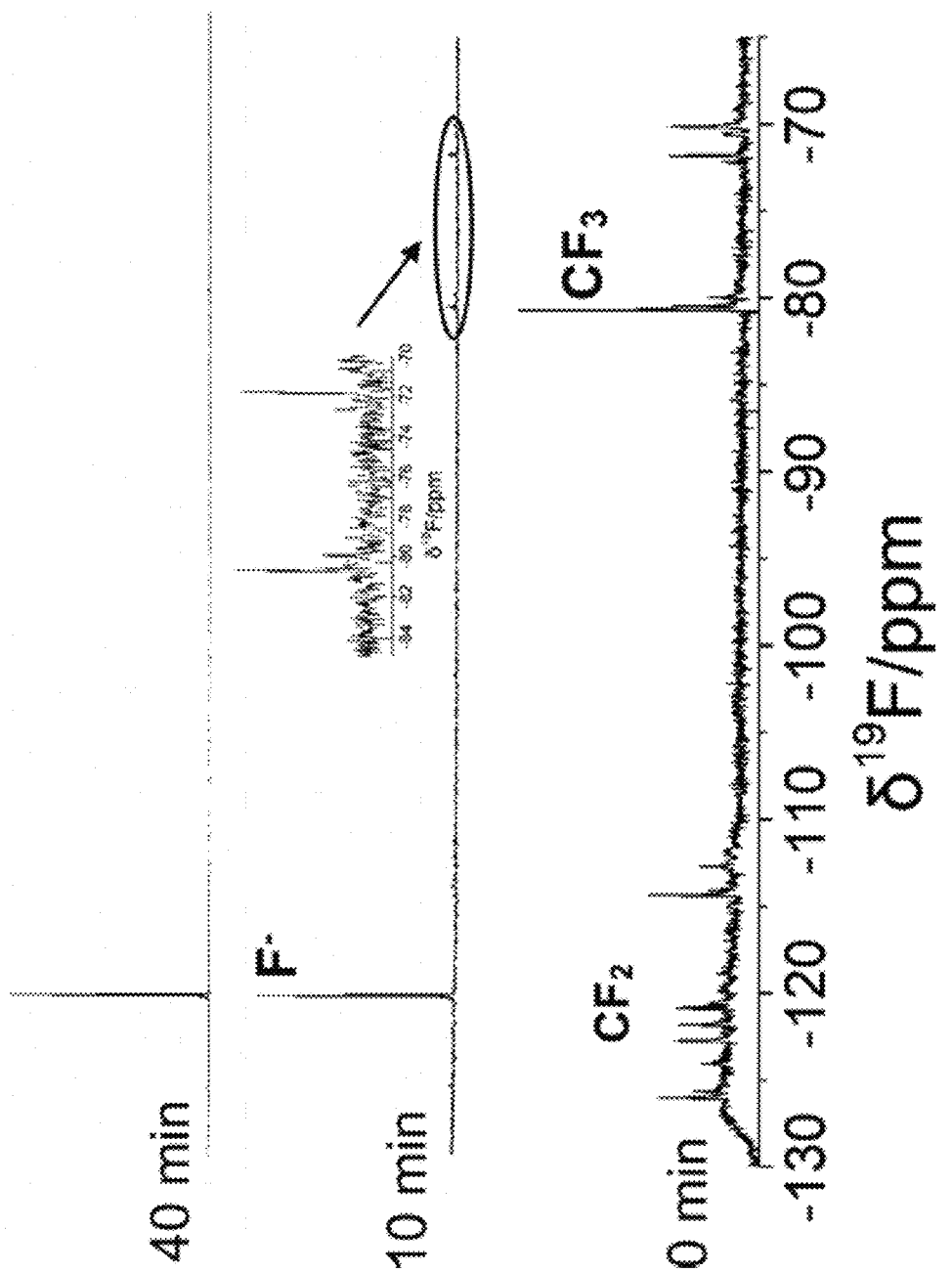
FIG. 9 depicts $^{19}F$-NMR spectra of PFOS solutions collected before and after hydrothermal reactions for different time periods. 19F-NMR spectra of PFOS solutions collected before and after hydrothermal reactions for different time periods. Reaction conditions: PFOS (5 mM, total fluorine=85 mM), NaOH (1 mol/L), 350° C., 0-40 min. The $^{19}F$ chemical shift ranges of $CF_3$ and $CF_2$ are from −86 to −74 ppm and from −127 to −121 ppm, respectively; the chemical shift of $F^-$ is −120.7 ppm.
Figure 10:
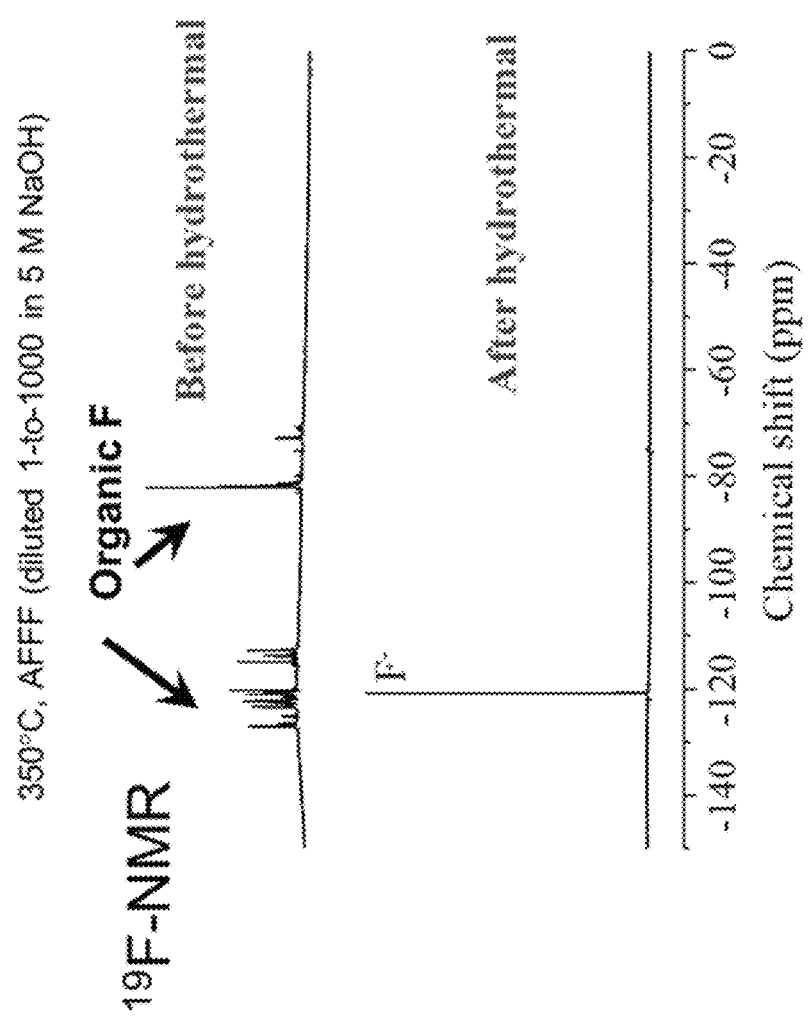
FIG. 10 depicts fluorine NMR data showing mineralization of organic fluorine in AFFF to F-following hydrothermal treatment.

¹⁹F-NMR measurements collected during reactions are consistent with the small difference between the extents of PFOS degradation and defluorination as well as the very small concentration of detected organic intermediates. FIGS. 9 and 10 show that complex spectral features associated with different C—F bonds in PFOS are replaced by a single dominant peak matching F⁻ after only 10 min of reaction, and spectral features associated with organic fluorine are completely absent after 40 min. Additional ¹⁹F-NMR measurements of reactions of AFFF mixture with NaOH, show that organic C—F bonds in the complex mixture of PFAS are replaced by a single species, F⁻, following reaction.

Mechanism. Results are consistent with OH— catalyzing a series of nucleophilic substitution and decarboxylation reactions that defluorinate PFOS and daughter perfluorocarboxylate intermediates. The initial OH— substitution reaction with the sulfonate headgroup forms an unstable perfluorinated alcohol which undergoes rapid HF elimination (to produce a ketone), and then hydration to release a second F— and form PFOA: Further decarboxylation then converts PFOA sequentially to increasingly short-chain perfluorocarboxylates, releasing 2F— ions with each reaction.

Reactions initiated with PFOA (e.g., FIGS. 8B and 8C) show much greater reactivity than PFOS, indicating that the initial cleavage of the sulfonate group is rate limiting, with further decarboxylation steps occurring much more rapidly.

While application of strong alkalis like NaOH to promote decomposition of persistent organic contaminants in near-critical water has not been commonly reported, a small number of studies have reported on dehalogenation of PCBs and chlorinated solvents. Furthermore, the literature on biomass conversion contains reports of strong alkalis catalyzing decomposition and gasification reactions in near critical and supercritical water. The addition of strong bases catalyzes decarboxylation of both short- and long-chain carboxylic acids. Interestingly, findings from the present work indicate that the fully perfluorinated PFOA and shorter chain carboxylate intermediates (i.e., PFHxA and PFPeA) are less stable in hydrothermal water than unfluorinated alkyl carboxylic acids reported previously. Octanoic acid, the unfluorinated analogue of PFOA, was found to be unreactive and remained at the residual concentration of 45.8±0.3 mg/L from the starting concentration of 50.8±1.0 mg/L under conditions where >99% PFOA degradation was observed within 30 min (250° C., no solution amendments). The electron-withdrawing character of fluorine substituents may act to stabilize the pentacoordinate intermediate formed by the initial nucleophilic attack of OH—/$H_2O$ on the carbon adjacent to the carboxylate and sulfonate head groups.

The lag between PFOS degradation and F— release observed at lower temperatures is suggestive of kinetic limitations on intermediate transformations that release F— under these conditions. While LC-MS/MS revealed only minimal formation of shorter-chain carboxylates (FIG. 18), the perfluorinated alcohol and ketone intermediates are not readily observed by the methods used here. Further analysis of intermediates and products derived from a wider range of PFASs is needed to confirm the active mechanisms.

Technology Implications. Results disclosed herein reveal a promising technology for the destruction of PFOS and related PFASs. Currently, the most cost-effective technologies for treating PFAS-impacted water are separation processes that generate PFAS-concentrated reject streams and wet exhausted sorbent phases (e.g., activated carbon adsorbents, nanofiltration) that require further treatment or disposal. The default approach for managing these byproduct streams is off-site incineration, requiring large energy inputs to vaporize water associated with these streams. While larger-scale pilot studies are necessary for a detailed comparison of energy requirements for hydrothermal treatment versus incineration, it is notable that heating liquid water to hydrothermal reaction temperatures (e.g., 350° C.) requires much less heat (~1100 kJ/kg) than vaporizing water (2600 kJ/kg). Furthermore, modern heat recovery technologies allow for a large fraction of input heat to be recovered from hot liquid water after reaction for reuse within the process (e.g., to preheat influent).

From a practical standpoint, the use of alkali amendments like NaOH and $Ca(OH)_2$ is simple and much more economical ($300-400/ton for NaOH, $100-300/ton for $Ca(OH)_2$) in comparison to other reagents being applied for PFAS destruction (e.g., sodium persulfate=$1000-1250/ton; sodium bisulfite=$350-500/ton). Furthermore, chemical use can be minimized when treating PFAS-contaminated soils or wastewater biosolids and other solids residuals if the alkaline brine can be recycled during the treatment of much larger volumes of solid. It is anticipated that the small volumes of treated brine can be neutralized and discharged safely to sanitary sewers for further treatment before discharge, but further concentration and offsite disposal may be required if this is not an option. While the observed extent of fluoride release with $Ca(OH)_2$ was much lower than for NaOH (FIG. 3), the extent of PFOS degradation was comparable, and we attribute the low F— release measured to formation of calcium fluoride precipitates in the reacting solution.

The methods, systems, and processes of the present disclosure may be useful to: chemical manufacturers of PFAS who have industrial waste concentrates that need to be destroyed to reduce potential liabilities; contractors managing PFAS-impacted sites at DoD and other facilities where AFFF have been used in fire training activities; site investigations that may generate waste on site; contractors, operators or owners remediating PFAS-impacted sites at commercial facilities; contractors; operators or owners disposing of AFFF stockpiles; and/or users of existing technology for treating PFAS-impacted groundwater such as ion exchange, which generates PFAS-contaminated concentrate streams when the resins are regenerated.

The processes, systems and methods disclosed herein may be used to treat these concentrate streams and potentially allow for recycling the brine concentrates rather than disposing. As part of efforts described in a Department of Defense-funded project, our team screened a series of reactive amendments, including acids, bases, oxidizing agents, reducing agents, and other chemicals to see if any promote destruction and defluorination of perfluoro- and polyfluoroalkyl substances (PFAS) in subcritical hydrothermal water and water/soil mixtures. These tests revealed that application of bases, including sodium hydroxide and calcium hydroxide, in hydrothermal water at 350 degrees Celsius lead to complete release of fluoride ions and destruction of the parent PFAS, both as individual chemicals and as complex AFFF mixtures.

One goal of the methods, systems and processes of this disclosure is to apply nascent hydrothermal conversion technologies to destroy PFASs and co-contaminants present in PFAS investigation-derived waste (IDW) materials generated at DoD facilities. Specifically, processes and methods have been developed whereby hydrothermal reaction conditions can be coupled with low cost reactive amendments to effectively degrade and defluorinate the full range of PFAS structures identified at AFFF-impacted sites. Data show successful defluorination of an AFFF mixture subjected to hydrothermal reaction with a low-cost reducing agent sulfite, commonly used in wastewater treatment and food preparation industries. Surprisingly, energy input requirements for hydrothermal processing of wet materials is significantly lower than incineration and other technologies that require drying of waste materials before processing. Thus, these findings identify new methods and systems for reducting DoD liabilities associated with AFFF-impacted waste materials.

In one embodiment of the present disclosure, destruction and defluorination of representative PFASs and associated co-contaminants (e.g., jet fuel) in aqueous and soil samples may be subjected to hydrothermal reaction conditions (250-350° C., 5-20 MPa) and amended with a range of low-cost reactive amendments, including reducing and oxidizing agents, and acids and bases. Experiments examined the reactivity of different AFFF formulations (e.g., 3M™, Chemguard™, Ansul™) in addition to more commonly studied PFOS and PFOA. Decomposition of individual PFASs was studied by application of liquid chromatography with quantitative time-of-flight mass spectrometry (LC-QToF-MS) together with an extensive target screening list of PFAS (presently>1500 structures). In many embodiments, hydrothermal destruction may involve actual waste samples under the typical reaction conditions and amendments. Finally, the energy requirements for an on-site hydrothermal reactor system are favorably compared to energy requirements for incineration of the same waste materials.

The present disclosure provides the users (in one example, the DoD) with a technological path forward for managing PFAS-impacted IDW on-site and eliminating potential liabilities associated with these materials when transported off site. In some embodiments, co-contaminant destruction under the hydrothermal conditions expands the applicability of the presently disclosed technology to an even wider range of applications (e.g., fuel hydrocarbons, halogenated solvents).

Figure 2:
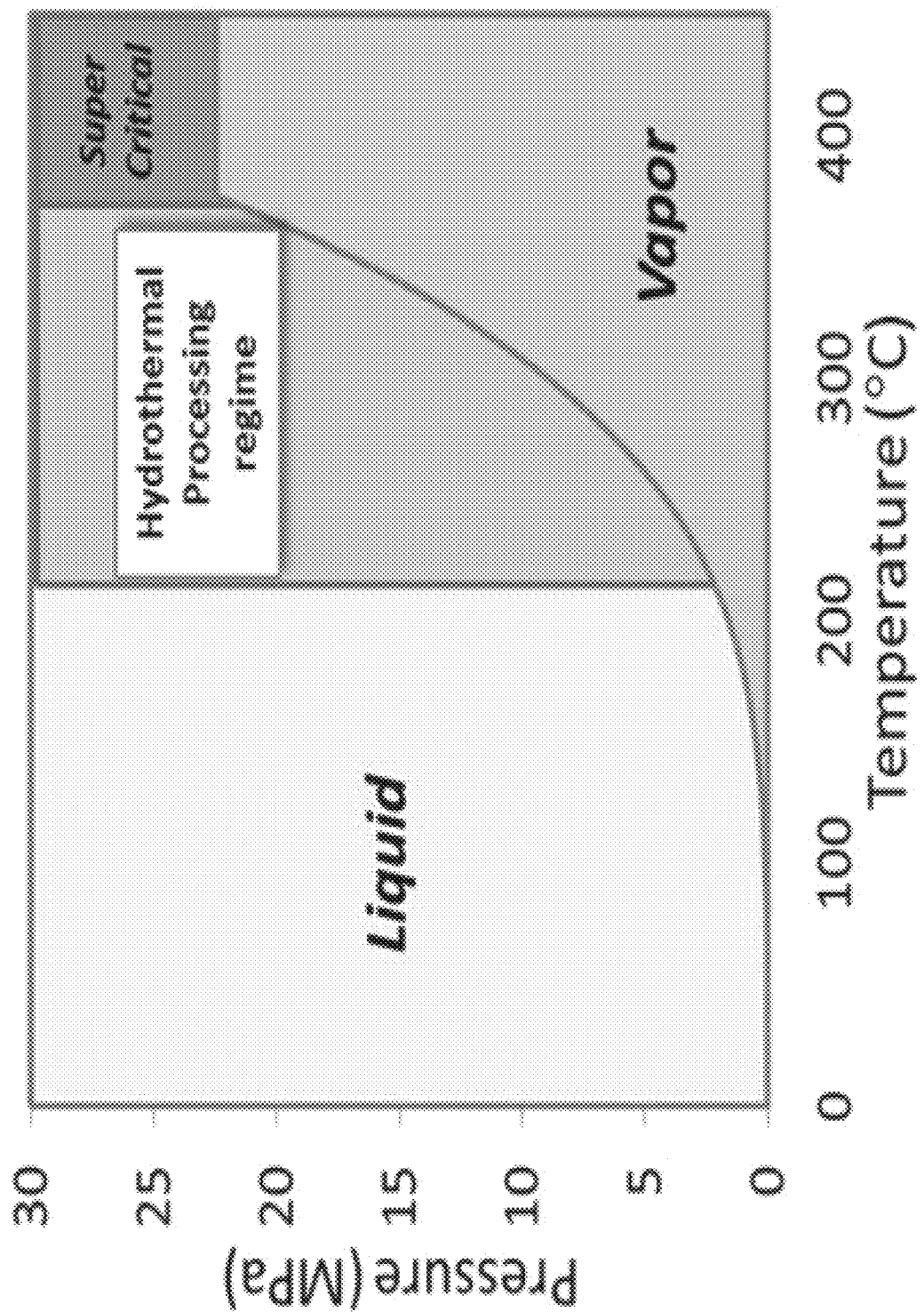
FIG. 2 depicts a phase diagram of water with conditions for a subcritical hydrothermal reaction regime highlighted (200-370° C., 2-22 MPa).

Some embodiments of the present disclosure may provide hydrothermal technologies for destruction of PFASs and co-contaminants within investigation-derived waste ("IDW") materials generated at DoD, and other facilities. The disclosed hydrothermal technologies apply elevated temperatures and pressures to promote a unique highly reactive chemical environment within wet samples (FIG. 2). Under hydrothermal conditions, aqueous properties are altered (increased acidity/basicity, decreased dielectric constant) in a manner that promotes decomposition and reformation of organic substances present. The disclosed technologies may be used for processing a diverse stream of wet organic waste materials (e.g., algal biomass, wastewater solid residuals), generating liquid biocrude products that can be upgraded to transportation-grade fuels, and pilot-scale reactor systems are currently being demonstrated at several locations. Applicants have surprisingly shown that the presently disclosed methods are more cost effective than other methods of mitigating perfluoro- and polyfluoro-alkyls. Specifically, significantly less energy input may be necessary to heat wet materials to elevated temperatures (e.g., 300-350° C.) under elevated pressure than may be needed to dry the same materials (a pre-requisite for incineration processes) under ambient pressure. Thus, while energy requirements for hydrothermal processing may be too high for large-scale treatment of dilute groundwater plumes, they may be ideal for processing effectively smaller quantities of site investigation waste to ensure complete PFAS destruction in samples. This is supported by previous reports as well as the data presented herein, which demonstrate destruction and defluorination of PFASs in hydrothermal reactions amended with reactive species (e.g., zerovalent iron, sulfite).

Applicants show that hydrothermal reactions, as disclosed herein, destroy both PFASs and associated co-contaminants (hydrocarbons, halogenated solvents) in various waste materials. This includes waste materials generated during site investigation activities at DoD, and other sites. Hydrothermal processing may use less input energy than incineration. Experimental work, described herein, has assessed various parameters of the disclosed technology, including: reaction conditions and reactive amendments to degrade and defluorinate PFASs of concern in water; effectiveness of reactions in addressing components in different AFFF formulations (e.g., sulfonic acid—versus fluorotelomer-based formulations); influence of soils and mineral solids on hydrothermal destruction of PFASs; ability of PFAS-containing IDW to be co-processed with wastewater biosolids; reaction conditions suitable for PFAS destruction and the ability of those conditions to destroy common co-contaminants detected at AFFF-impacted sites; and efficiencies of hydrothermal processing strategies versus incineration? According to some embodiments of the methods of the present disclosure, wastes may also be co-treated with wastewater biosolids to destroy the fluorochemicals and produce liquid and gaseous fuel products.

This disclosure addresses an issue of growing importance at various sites, including, for example DoD facilities: how to deal with waste materials, including water and soil samples, generated during site investigation activities targeting PFAS. In some embodiments, the disclosed methods and systems may be configured for small-scale field-deployable technology capable of PFAS destruction in wet samples at specific locations, which may provide for reduction of PFAS-associated liabilities resulting from secondary contamination from site investigation activities. Hydrothermal reactor systems being deployed to process wet wastewater biosolids and other liquid waste streams can potentially be adapted to provide on-site treatment of PFAS-contaminated wastes. The disclosed processes may be effective in reducing the concentrations of perfluoro- and polyfluoro-alkl substances in a variety of wastes. In many embodiments, the degradation, destruction, elimination, and defluorination processes may be more than 70%, 75%, 80%, 85%, 90%, 95%, 96%, 97%, 98%, or 99% effective at reducing the concentration of perfluoro, and polyfluoro-alkyl substances in the waste.

Figure 20:
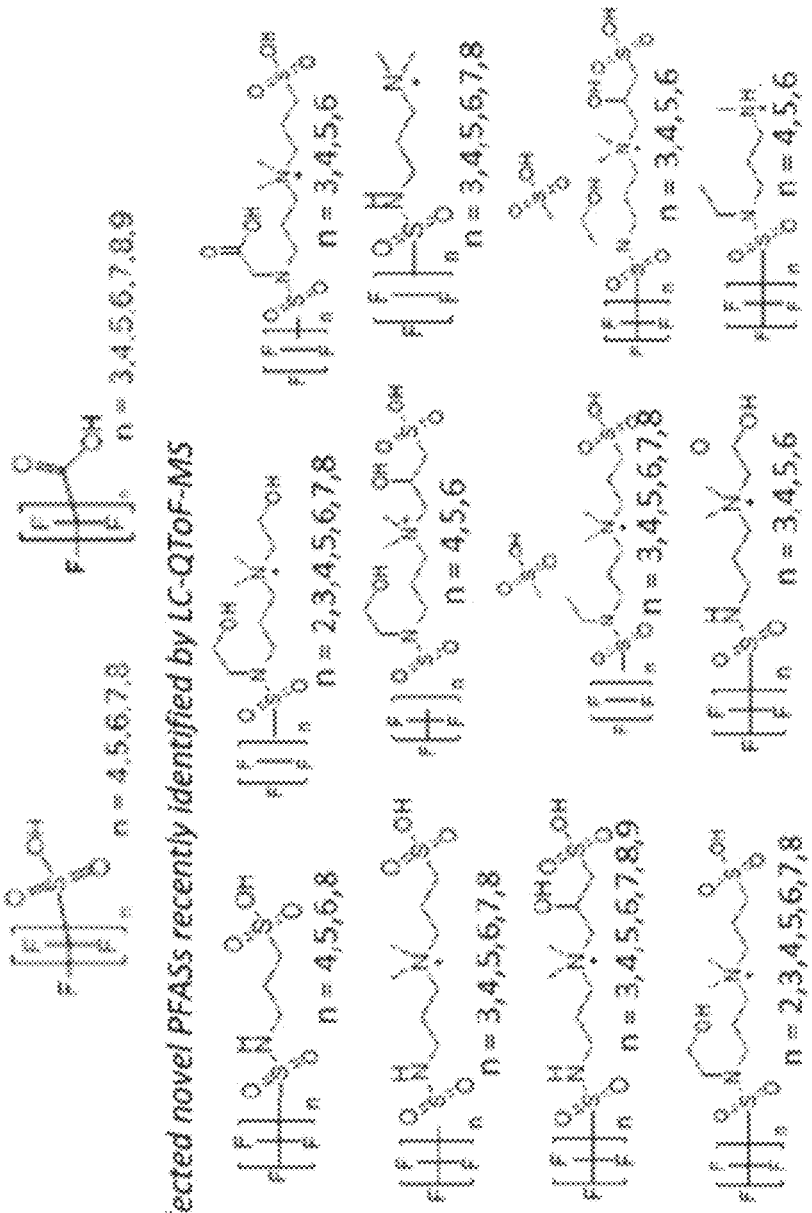
FIG. 20 presents Table 1 depicting representative PFAS structures identified in AFFF-impacted groundwater, including novel structures identified by LC-QToF-MS.

To date, most studies on PFAS occurrence and treatment have focused almost exclusively on a small number of PFAS structures, most notably PFOS and PFOA, with some consideration of related perfluoroalkyl carboxylate and sulfonate structures. However, these analytes represent only a small fraction of PFASs present at AFFF-impacted sites, and application of high-resolution mass spectrometry (e.g., LC-QToF-MS) has led to the identification of a much wider range of PFAS structures (FIG. 20, Table 1). In this disclosure, LC-QToF-MS is applied to an extensive targeted screening list of PFASs that may be used in AFFF or other applications (~1500 PFASs), developed as a result of studies to examine the fate of both the perfluoroalkyl acids of current concern and other PFASs of emerging concern (i.e., polyfluorinated substances and PFOS-like chemicals) during hydrothermal processing of water and soil samples.

In some embodiments, the present disclosure is directed to applying hydrothermal conversion technologies to destroy PFASs and co-contaminants present in waste materials generated during site investigations. Specifically, hydrothermal reaction conditions can be coupled with low cost reactive amendments (e.g., sulfite, zerovalent iron, lime, HCl, NaOH, lime, etc.) to effectively degrade and defluorinate the full range of PFAS structures identified at AFFF-impacted sites.

Application of high-resolution LC-QToF-MS together with an extensive suspect target list (~1500 PFASs) allows examination of the fate and transformation of a wide range of PFAS structures, including the most commonly measured perfluoroalkyl acids and their polyfluorinated precursors (e.g., FIG. 20, Table 1). A series of experimental and modeling tasks track the fate and decomposition of diverse PFASs present in different commercial AFFF formulations during hydrothermal reactions with various reactive species (FIG. 21, Table 2); evaluate fate and degradation of common co-contaminants (e.g., hydrocarbon fuel compounds, chlorinated solvents) under conditions identified for destruction of target PFASs; examine the effects of non-target matrix components (e.g., soils, minerals, dissolved solids) on PFAS transformation reactions under hydrothermal conditions, and assess the co-processing of PFAS-containing wastes with wastewater biosolids; identify critical transformation pathways leading to mineralization of PFASs; compare energy input requirements for hydrothermal processing with requirements for on-site incineration of waste materials.

Figure 11:
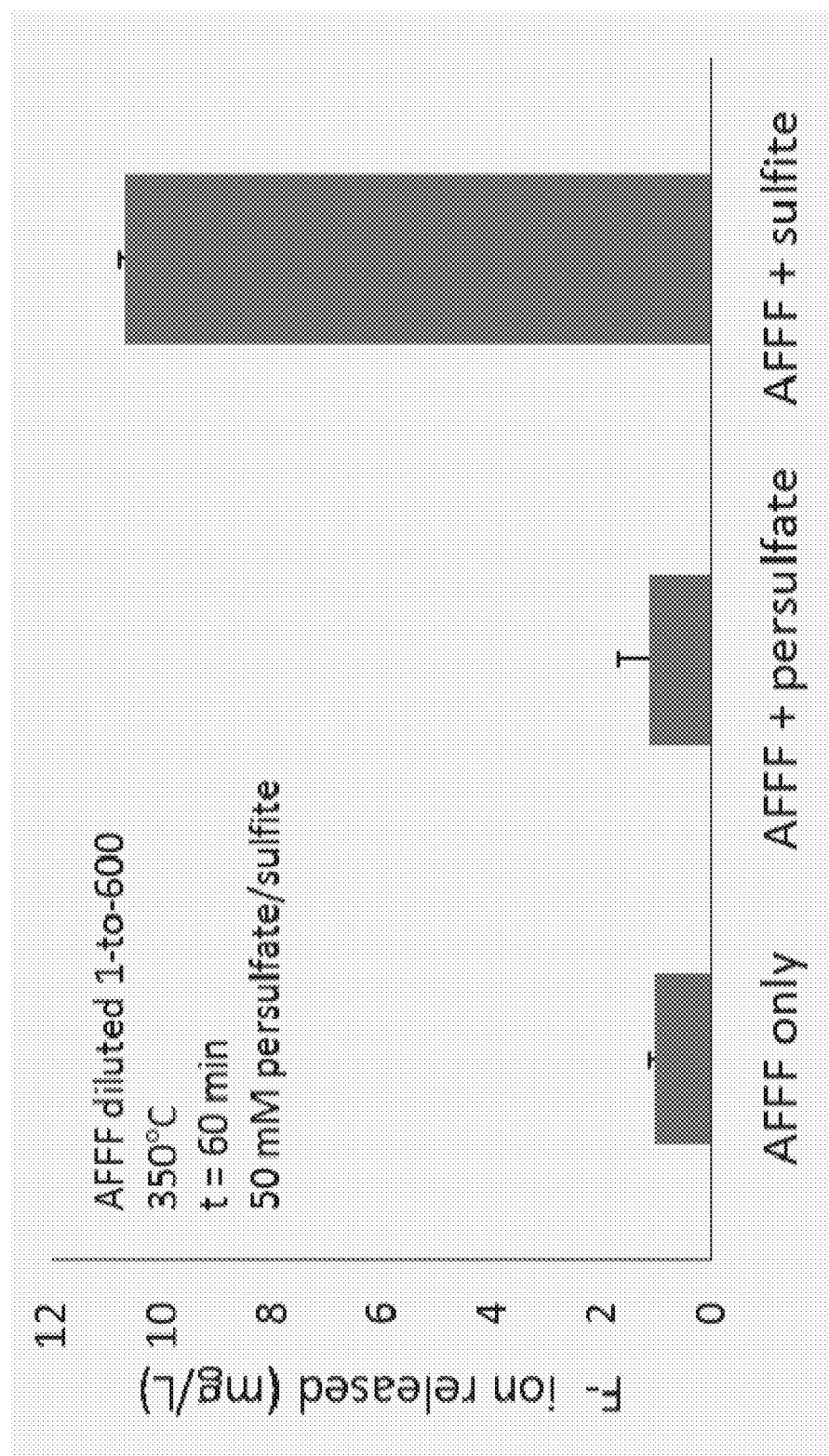
FIG. 11 depicts preliminary data demonstrating defluorination of an AFFF sample obtained from Peterson Air Force Base showing components during hydrothermal reaction with sulfite.

While PFASs are highly recalcitrant chemicals generally unreactive with common chemical reagents (e.g., oxidants, reductants) at ambient temperature, reaction with the same chemicals can occur under hydrothermal conditions with the same reagents. For example, while PFASs are unreactive with ZVI at ambient temperatures, degradation and defluorination has been documented in condensed water at hydrothermal temperatures (e.g., 350° C.). Preliminary data collected for this proposal (FIG. 11) also shows that PFASs present in an AFFF mixture obtained from Peterson Air Force Base are rapidly defluorinated in hydrothermal water amended with sulfite, a low-cost bulk chemical used widely in the water/wastewater and food production industries. LC-QToF-MS analysis of PFASs in this AFFF sample shows that its formulation used in the experiments contains recalcitrant perfluoroalkyl sulfonates, so the finding of defluorination with sulfite suggests a promising strategy for managing on-site waste materials potentially contaminated by a wide range of PFAS structures.

The hydrothermal reaction environment, referring to reactions occurring in water that remains in the liquid state below its critical temperature and pressure (374° C., 221 bar), promotes chemical reactions because water can act as a solvent, a reactant, and even a catalyst as the temperature approaches the critical point. In addition to increasing the kinetics of reactions as predicted by the Arrhenius equation, elevated temperature disrupts the strong hydrogen bonding network in condensed water, and increases the ion product for water ($K_w=\{H^+\}\{OH^-\}$) by nearly three orders-of-magnitude, leading to significant acid- and base-catalyzed pathways for a variety of reactions.

Surprisingly, Applicants show that heating condensed water-rich materials (e.g., soil/water slurries) in a sealed reactor to hydrothermal temperatures (e.g., 1.2 MJ/kg to heat from 20° C. to 300° C.) takes significantly less input heat energy than simply drying the same sample at ambient temperature ($\Delta H_{vap}$=2.5 MJ/kg). This is due to water's high enthalpy of vaporization. Thus, energy inputs for conventional processes that involve water evaporation like incineration or zero liquid discharge (ZLD) and disposal may actually be higher than those for the presently disclosed hydrothermal processing. Hydrothermal reactors may include sealed pressurized vessels, electronic controllers capable of receiving input signals and providing output signals, sensors (such as temperature sensors), valves, monitors, and heat sources.

Furthermore, inclusion of modern heat recovery systems or heat exchangers that recover heat from output fluids and add it to input fluids can further reduce energy input requirements for hydrothermal reactor systems.

This disclosure is enabled by the use of high-resolution LC-QToF-MS analysis methods and an extensive target screening list (~1500 PFASs). A full description of the analytical methods, including LC-QToF-MS, is provided below.

Task 1: Screen the hydrothermal reactivity of PFOS and PFOA with different reactive amendments. In some embodiments, hydrothermal reaction conditions and reactive amendments may be screened for the ability to degrade and defluorinate PFOS and PFOA, and representative members of recalcitrant classes of PFASs present in AFFF formulations (representative conditions and amendments for reaction with the broader spectrum of PFAS are described in Task 2). Table 2 lists a set of reaction conditions and amendments screened that may be used in various experiments. Reaction conditions may include various reaction temperatures (150-350° C.) and times (5-120 min). Reactive amendments may include various compounds, including a variety of low-cost reducing agents (e.g., sulfite, dithionite, zerovalent iron), oxidizing agents (e.g., persulfate, hydrogen peroxide), and acids/alkalis (e.g., lime, HCl). Preliminary data showed that sulfite promotes defluorination of an AFFF mixture under hydrothermal conditions (FIG. 11), and that degradation and defluorination of selected PFAS by zerovalent iron and persulfate occurred under hydrothermal conditions.

Figure 12:
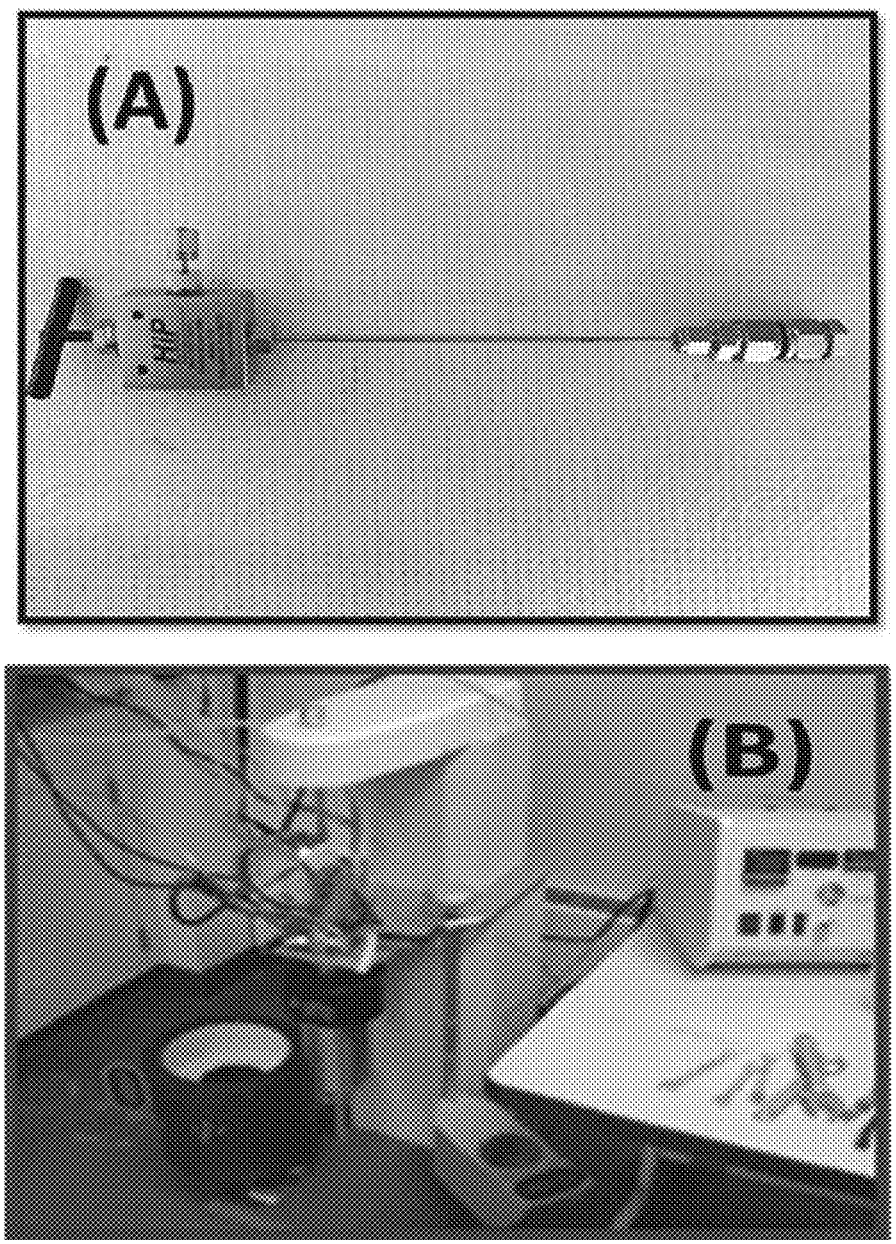
FIG. 12 Panel (A) depicts reactors used in the PI's laboratory to study hydrothermal reactions, a 4-mL stainless steel mini-tube reactors with gas sampling valve. Panel (B) depicts reactors used in the PI's laboratory to study hydrothermal reactions, a Parr 4575 high temperature and pressure reactor with overhead mixing and gas sample port.
Figure 13:
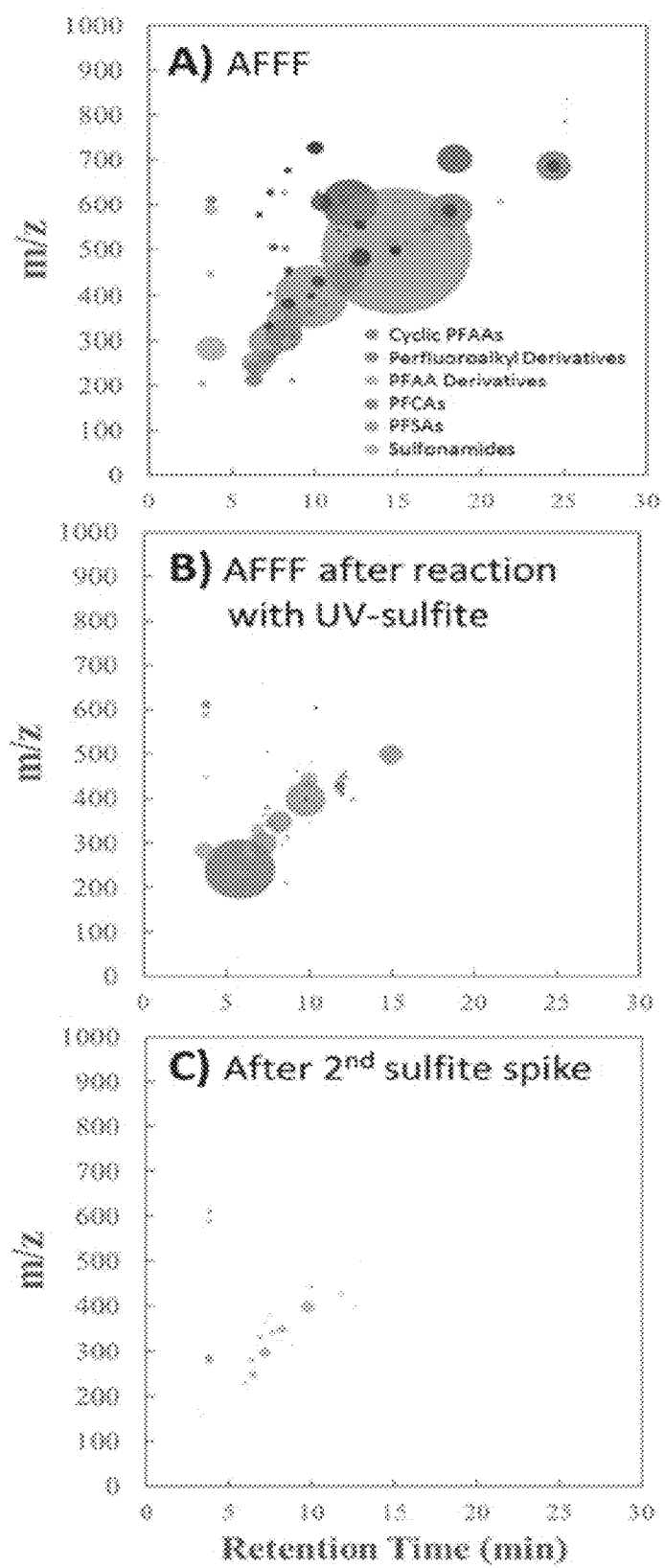
FIG. 13 depicts "bubble plot" analysis. Panel A) depicts bubble plot of LC-QToF-MS data collected on PFAS degradation during UV/sulfite photochemical treatment of AFFF as part of on-going SERDP project ER-2424. Individual bubbles represent different PFAS structures detected during LC-QToF-MS analysis from the target screening list of >1500 PFAS structures. The diameter of individual circles represents chromatographic peak areas. Panels B) and C) depict shrinking of the mass of each class of PFASs following treatment by UV-sulfite photochemical generation of hydrated electrons (e−).
Figure 14:
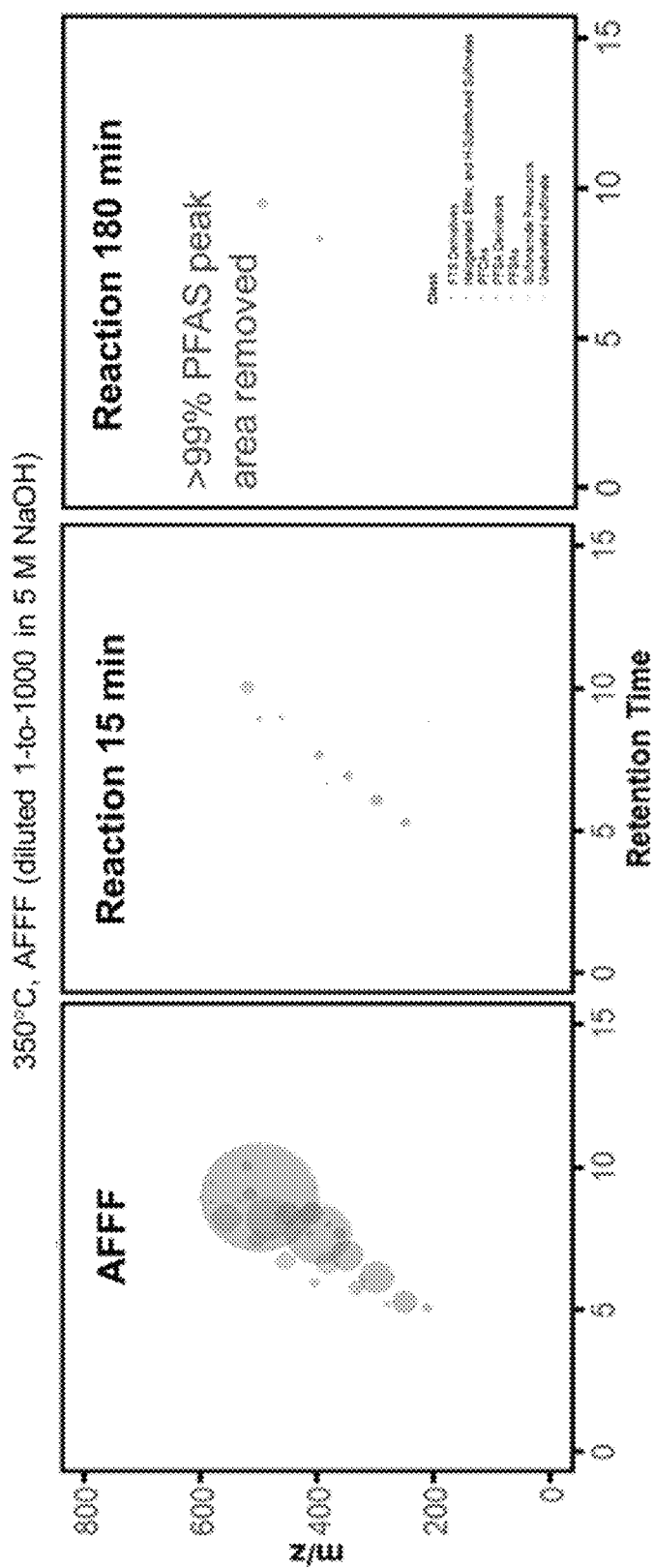
FIG. 14 depicts "bubble" plots showing results from LC-QToF-MS analysis of diluted AFFF before and after hydrothermal reaction. Each bubble represents a single PFAS compound identified in the AFFF by suspect screening analysis, arranged by HPLC retention time (x-axis) and mass-to-charge ration (y-axis). The diameter of each bubble represents the mass spectrometer peak area response. After treatment, >99% of the observed mass spectrum peak area is removed from the solution.
Figure 15:
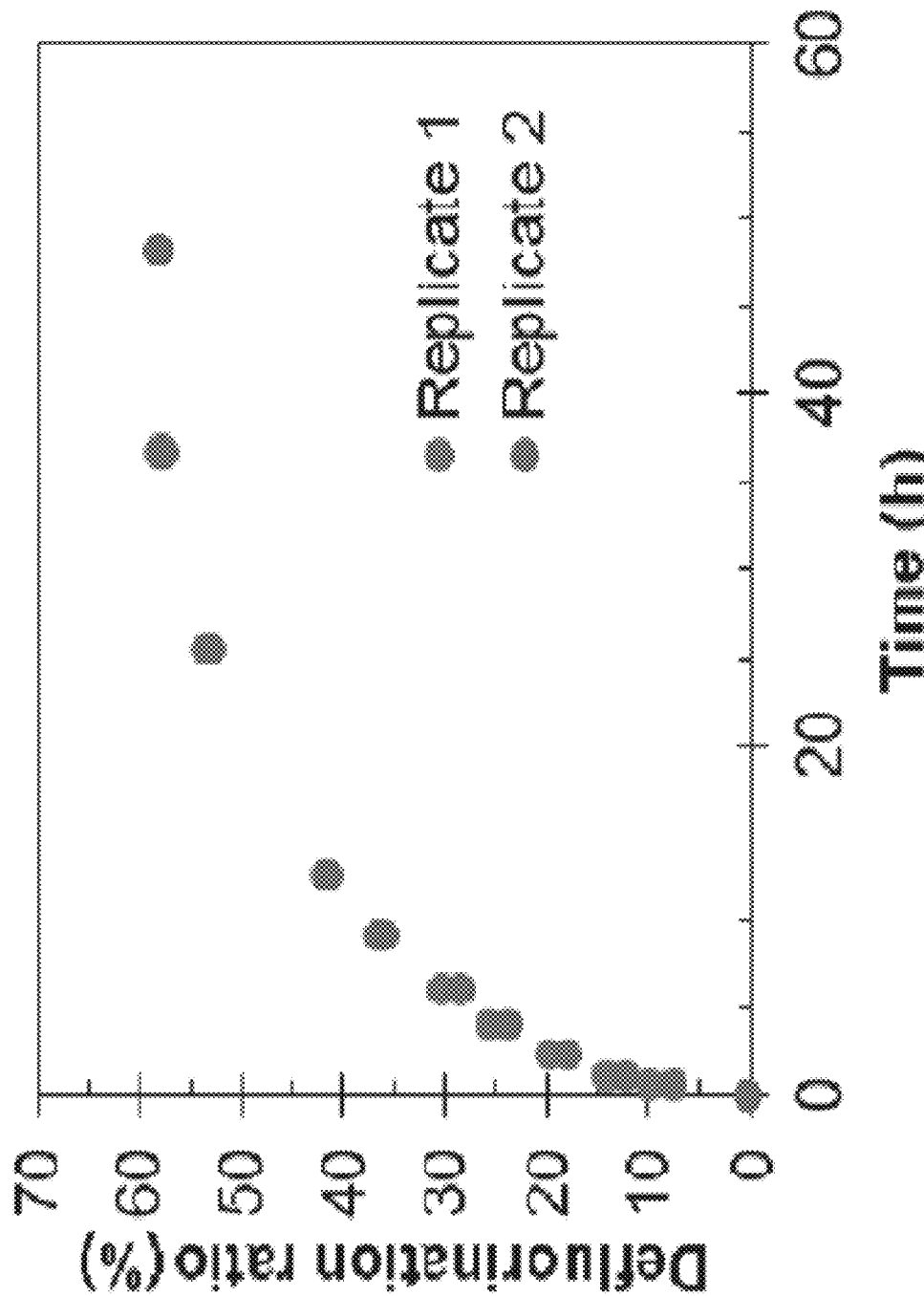
FIG. 15 depicts defluorination data measured during UV-sulfite treatment of AFFF solution corresponding to the data for PFAS degradation bubble plots shown in FIG. 13 (AFFF diluted 600-fold into carbonate-buffered electrolyte; 18 W UV-254 lamp, 10 mM sodium sulfite).
Figure 16:
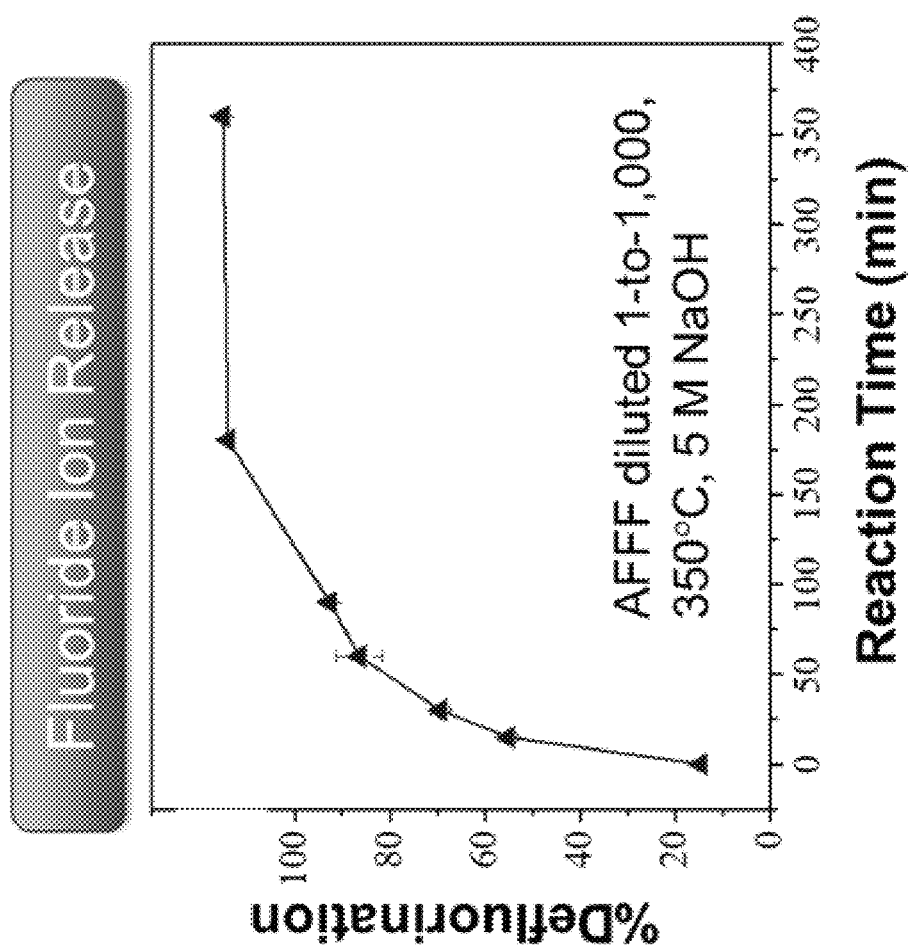
FIG. 16 depicts fluoride ion (F—) release from AFFF mixtures upon hydrothermal treatment in NaOH-amended water, measured by ion-selective electrode analysis.
Figure 17:
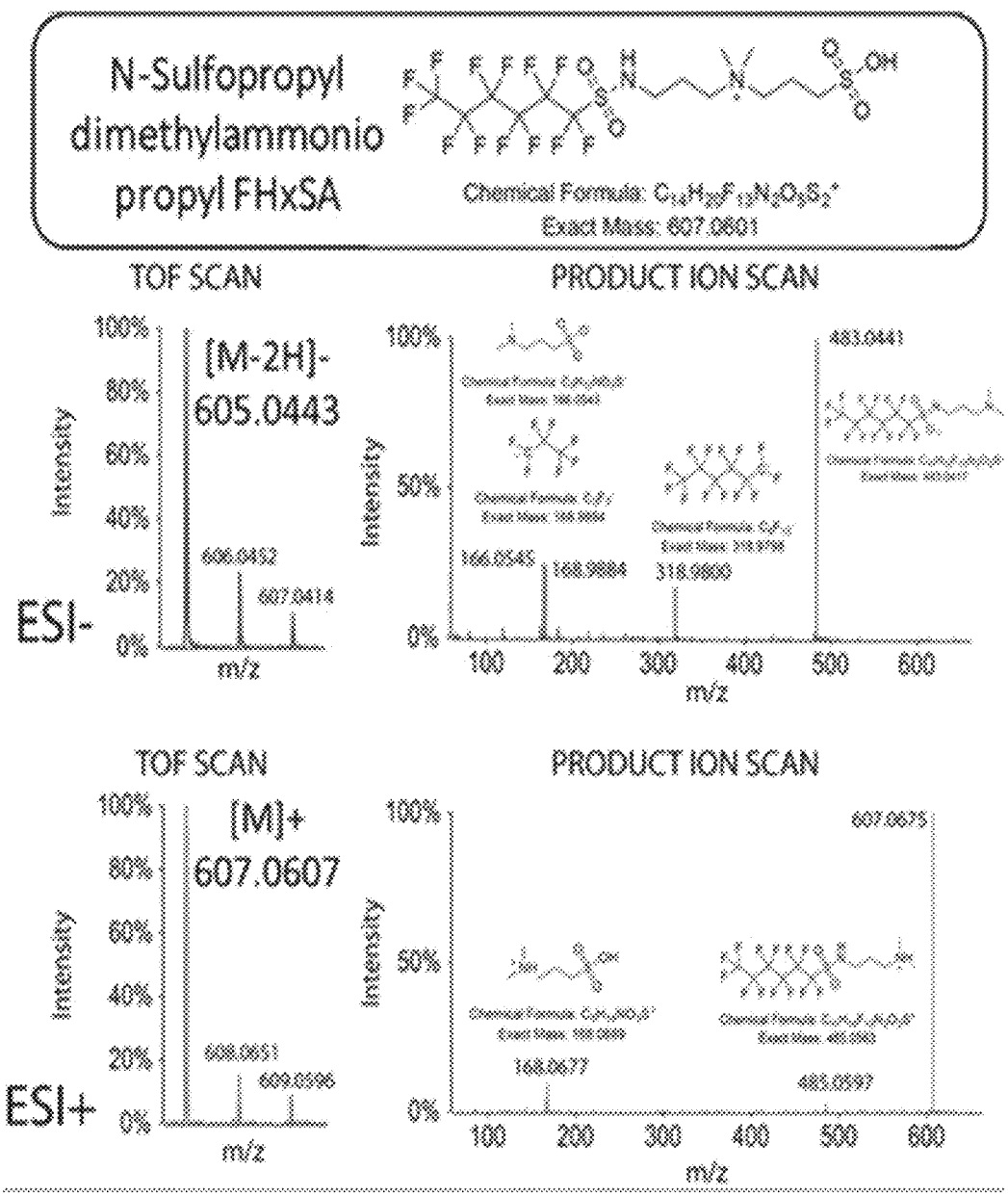
FIG. 17 depicts the use of LC-QToF-MS/MS fragmentation analysis to confirm the structure of a newly discovered PFASs.
Figure 19:
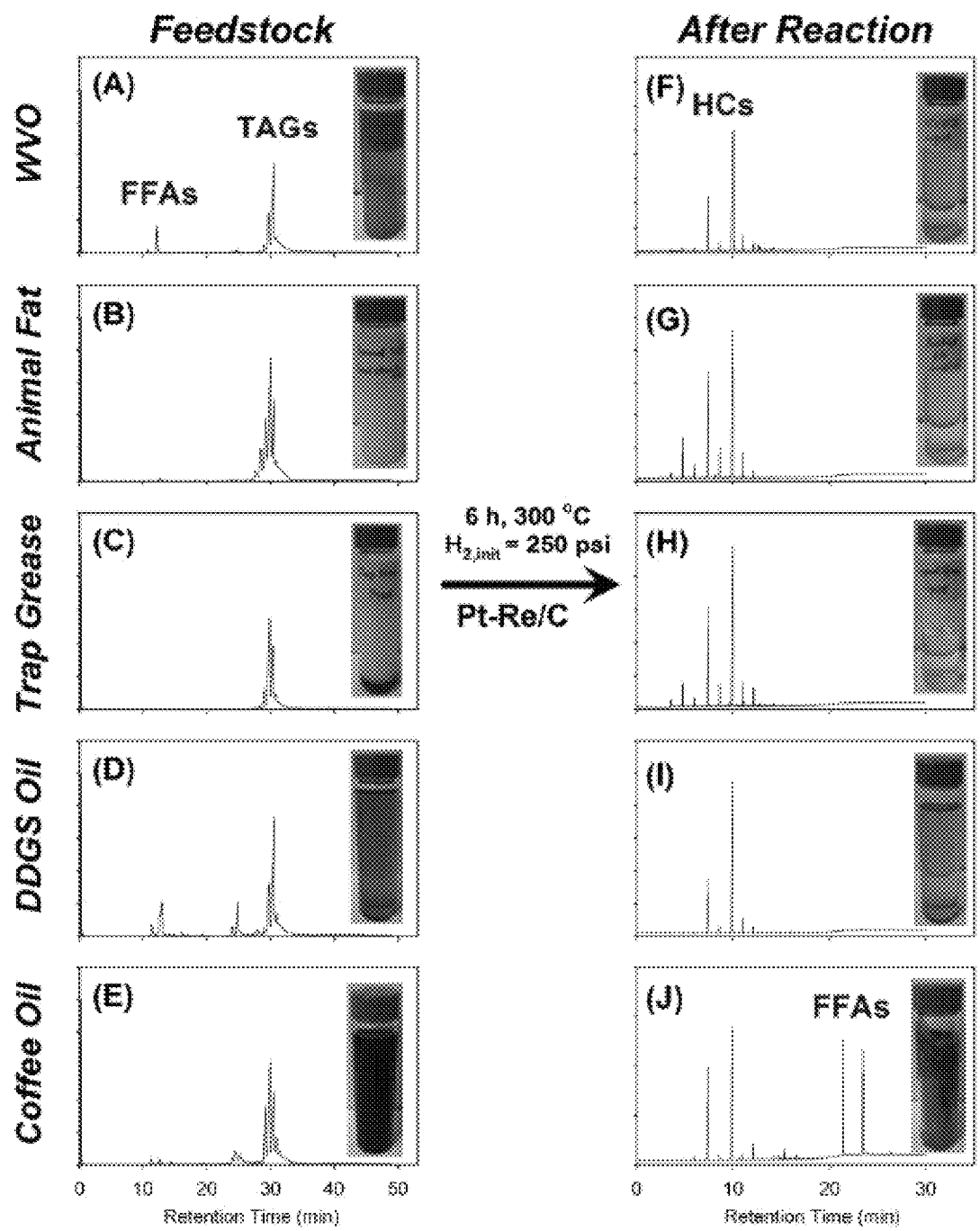
FIG. 19 depicts results from studying hydrothermal reactions of real waste lipid feedstocks with gas chromatograms (with inset photographs) and of waste lipid and oil feedstocks (left panels A-E) and chromatograms (and inset photographs) following hydrothermal catalytic conversion with Pt—Re/C (right panels F-J). Chromatogram regions where TAGs (triacylglycerides), FFAs (free fatty acids), and alkane hydrocarbons (HCs) are identified are indicated. Reaction conditions: 300° C., 20 g waste lipid feedstock, 80 g water, 2 g Pt—Re/C, initial room temperature headspace pressurized to 250 psi $H_2$.

Batch screening experiments may be conducted using 4 mL stainless steel tube batch reactors, outfitted with a Swagelok™ 6N series high-pressure gas relief valve for headspace loading and sampling (FIG. 12 Panel A). Solutions containing 100 μg/L of PFOS and PFOA may be added to the batch reactor together with the reactive amendments. This concentration may be used in various experiments to allow for measurement of fluoride ion release. The sealed tube reactors may be then rapidly heated to the target temperature using a temperature programmable fluidized sand bath. A wrist action shaker may be used to ensure continuous mixing of any solid/water mixtures. Reactors may be quenched in a cold water bath after the desired reaction time, and gas samples may then be collected by venting reactor headspace into Tedlar sample bags. The liquid contents of the reactor may then be collected and analyzed for F— release (ion selective electrode and/or ion chromatography), and residual concentrations of PFOS, PFOA and any organic transformation products analyzed by LC-QToF-MS analysis as described in detail following the description of tasks. Initial screening tests used elevated amendment concentrations (0.1 M dissolved reactants, 1 g/L solid reactants). Further tests at variable amendment concentrations (1 mM-0.5 M dissolved; 0.05-5 g/L solids) may be conducted for any amendments where the initial screening tests lead to >50% degradation of both PFOS and PFOA. Likewise, experiments may be conducted with representative amendments over a representative range of reaction conditions (temperatures, times, initial solution pH), but other ranges of these variables are contemplated. Reacted solutions may be analyzed for pH and residual concentration of the reactive amendments.

Task 2: Measure the degradation and defluorination of a wider range of PFAS structures in AFFF under hydrothermal conditions identified to destroy PFOS and PFOA in Task 1. Based on the recalcitrance of perfluoroalkyl sulfonic and carboxylic acids, the reaction conditions and amendment that fully degrade both PFOS and PFOA may be tested for effectiveness in degrading and defluorinating other PFAS structures present in AFFF formulations (e.g., fluorotelomer sulfonates, perfluoroalkyl sulfonamides). For this task, Applicants acquired several commercial AFFF mixtures. In some cases, AFFF mixtures may be diluted to varying degrees ($1:10^3$ to $1:10^6$) in the same reactors described in Task 1 together with amendments, found in Task 1 to degrade PFOS and PFOA. Following reaction, $F^-$ release and LC-QToF-MS analysis of aqueous phase may be conducted, and GC-MS/MS analysis of headspace gases may be measured. In addition, selected samples may be analyzed by total organic carbon (TOC) analysis before and after reaction to assess organic mineralization.

Task 3: Measure the transformation of model co-contaminants under hydrothermal conditions identified to destroy PFOS and PFOA in Task 1. Similar to task 2, Applicants evaluated the degradation and mineralization of commonly detected organic co-contaminants under hydrothermal conditions found in Tasks 1-2 to degrade and defluorinate PFASs. For these experiments, Applicants examined reactions of heptane and m-xylene as representative aliphatic and aromatic hydrocarbon components, respectively, of jet fuel used in fire training activities, and hexachloroethane and tetrachloroethene as model chlorinated solvents. Experiments may be conducted using the same procedure outlined in Task 1, except that 1-10 mg/L of the individual model co-contaminants may be added to the reactor with the reactive amendments. Following reaction, headspace gas samples may be collected and analyzed for volatile constituents by GC-MS/MS (identification of unknown volatiles), GC-FID (quantification of hydrocarbons), or GC-ECD (quantification of chlorinated compounds). Aqueous solutions may be then collected and analyzed for TOC and chloride release from the chlorinated solvents (ion chromatography).

Task 4: Quantify the effect of soil solids and other non-target matrix components on the effectiveness of hydrothermal reactions of PFOS and PFOA. Task 4 is directed to examining hydrothermal reactions of aqueous solutions mixed with soil solids of varying composition and water contents. First, a series of soils and aquifer materials were collected and mixed with varying amounts of water amended with PFOS, PFOA or AFFF and selected co-contaminants. Slurries of varying solid:water ratio (0, 0.1, 1, and 5 g:mL) were examined. Solid/water slurries were loaded into a 500 mL stirred autoclave reactor (FIG. 12 Panel B) and amended with reactive species that showed promise from Tasks 1-3. The reactor was heated to the target temperature with mixing. After the desired reaction time, reactions were quenched using an internal heat exchanger. The reactor was then opened to remove the solid and liquid contents. The liquid contents analyzed for PFAS, $F^-/Cl^-$ release, and TOC as described above. In addition, the solids were extracted, diluted in deionized water and analyzed in the same manner. In some cases, aqueous samples and extracts were subjected to solid phase extraction cleanup procedures, including passing through Envirocarb resins, prior to analysis.

In addition to soil/water systems, it is contemplated within the present disclosure that the effects of various common, non-target water constituents, including dissolved organic matter (DOM), inorganic cations ($Ca^{2+}$, $Mg^{2+}$, $K^+$, $Na^+$, $Fe^{2+/3+}$) and anions ($Cl^-$, $F^-$, $SO_4^{2-}$, $HCO_3^-$, and $NO_3^-$) may affect the effectiveness of hydrothermal reactions with PFOS and PFOA. The effects of elevated concentrations of these amendments (50 mg/L DOM, 10 mM ion concentrations) may be relevant to the methods disclosed.

Disclosed here is the transformation of various PFASs in groundwater and soil samples collected from various DoD sites, such as Peterson Air Force Base in Colorado Springs, Colo. In some cases, these samples from sites on the base may have been contaminated by historical use of AFFF in fire training activities.

Task 5: Identify major pathways and mechanisms for PFAS decomposition during hydrothermal reactions. Results from LC-QToF-MS and ISE analysis in experiments in Tasks 1-3 was examined to identify potential mechanisms by which hydrothermal conditions and reactive amendments are acting to transform and defluorinate PFASs. While identification of the reaction mechanisms is not required for the hydrothermal processes to be of practical use, their identification does provide a supporting foundation for the process and a path forward for further design and optimization of the disclosed hydrothermal reactor systems. Follow-up experiments may be conducted individually with PFOS, PFOA, and related structural analogues to isolate transient intermediates and stable end-products of the reactions using LC-QToF-MS (experiments conducted in Tasks 1-3 used mixtures of PFASs, complicating assignment of identified intermediates to specific parent PFAS structures). Time-dependent measurements may, in some case, be used to construct a preliminary reaction network model for the decomposition and defluorination processes occurring in the reactor.

Task 6: Compare energy input requirements for hydrothermal destruction of PFAS versus incineration of wet waste materials. Results from experiments in Tasks 1-5 were used to determine the energy requirements for operating a mobile hydrothermal treatment reactor system scaled to treat up to 500 gallons per day of liquid slurry (groundwater+soil/aquifer solids). In some embodiments, to improve efficiency, a 2-stage reactor system may be scaled up with integrated heat recovery. In various embodiments, heat recovered from the second higher temperature stage following processing may be directly used to heat the first preheating stage of the reactor system. Inputs for energy requirements may include at least: setpoint temperature, reaction time, and mixing energy.

There may be other inputs. The results may be compared to energy requirements of incineration of the materials offsite.

Methods of Analysis. LC-QToF-MS Analysis of PFASs. Aqueous samples for PFAS analysis are separated on a C18 column prior to analysis by both ESI+ and ESI-LC-QToF-MS using chromatographic conditions previously established for characterizing PFASs in AFFF formulations and AFFF-impacted groundwater. For the subset of PFASs for which authentic analytical standards are available, quantitative analysis is enabled through the use of isotope-labeled internal standards. For the novel PFASs, HRMS spectra and LC-retention time data was compared against AFFF-spiked samples and MS libraries developed previously: only features matching both retention time and MS/MS fragmentation spectra to known PFASs was confirmed as present. For these PFASs, semi-quantitative analysis was performed using relative peak intensities and/or equimolar MS response factor assumptions for the most closely related structural analog. While accurate and robust quantitation of PFASs without analytical standards may not be possible, a relative semi-quantitative approach is a feasible and effective way to evaluate the potential for the treatment technologies to remove PFASs. Solids-containing samples were first extracted with methanol, or other appropriate solvents, and subjected to cleanup with solid phase extractions (Envirocarb) prior to LC-QToF-MS analysis.

Other Methods. Untreated and treated samples may be analyzed for a variety of other parameters, including co-contaminants and relevant geochemical characteristics. The presence of volatile organic co-contaminants may be assessed by gas chromatography analysis with tandem mass spectrometry (GC-MS/MS) detection, and treatment of identified contaminants may be evaluated by either GC-MS/MS analysis or by GC with flame ionization detection (GC-FID, for hydrocarbon co-contaminants) or electron capture detection (GC-ECD, for halogenated solvent co-contaminants) where appropriate. Fluoride release from PFASs may be determined by ion selective electrode analysis with matrix-matched reference standards.

Anion composition of water and extracted soils may be analyzed by ion chromatography (IC) with conductivity detection (for anions) and ICP-AES for metal ions (analysis of 21 elements including Na, Ca, Mg, Fe, Mn), dissolved organic carbon and total nitrogen (DOC/TN analysis, Shimadzu instrument). Procedures described in *Standard Methods* may be used to analyze for total dissolved solids (TDS), chemical oxygen demand (COD), alkalinity, ammonia, and pH of groundwater samples before and after treatment.

Findings from the experimental work of the present disclosure provide initial data on the effectiveness of applying hydrothermal reaction conditions to degrade and mineralize both a wide diversity of PFAS structures as well as organic co-contaminants associated with AFFF use and fire training activities. Some embodiments of the disclosure include: (1) evaluating treatment of waste materials from a range of sites to assess the importance of site-specific conditions, (2) scale-up of the process and pilot demonstration of a continuous hydrothermal processing reactor, and (3) hybrid technologies that further reduce the energy inputs and/or lower the cost of processing site waste materials (e.g., aqueous soil washing followed by hydrothermal reaction of concentrate wash residuals).

The experimental results of the present disclosure pertain to PFOS reactions in alkali-mended homogeneous solutions, but it is contemplated that the operative reaction mechanisms remain active in heterogeneous aqueous systems. Further, it is shown that alkaline hydrothermal treatment may prove to be a viable approach for ex situ remediation of source zone soils and PFAS-contaminated wastewater sludge. Preliminary results showed that PFOA and other carboxylate analogues sorbed to wastewater sludge were effectively degraded during hydrothermal liquefaction (HTL) of the sludge to produce bio-oil, but PFOS and other sulfonated analogues are recalcitrant during the process. It is contemplated that adding alkali amendments to the sludge prior to applying HTL would promote degradation of these more recalcitrant PFAS.

Finally, although the experimental results of the present disclosure focus on hydrothermal decomposition of PFOS and PFOA, it is contemplated that the methods disclosed herein extend to other classes of PFASs, PFOS has been found to be one of the most recalcitrant PFASs in studies evaluating other technologies. Many destructive approaches reported to be effective for the destruction of PFOA (and related perfluorocarboxylates and their precursors) prove to be ineffective for PFOS and related perfluoroalkyl sulfonates. Thus, it is a promising development that alkaline hydrothermal treatment effectively degrades and defluorinates PFOS. Work is underway to examine hydrothermal reactions of the wider range of PFASs identified in AFFF. It is contemplated that the methods and systems of the present disclosure will be effective in mineralizing other PFAS structures.

EXAMPLES

Example 1

According to one embodiment of the disclosure, a system of hydrothermal reactors may be built for continuous processing of wastes or processing as batch operations for treating small volumes of material. For example, many airports and military bases where fire training activities are conducted need to dispose of AFFF stockpiles and treat wastes derived from site investigations of subsurface contamination (e.g., groundwater samples, soil cuttings from drill rigs, rinse solutions). Pressure rated reactors would be filled with wastes, brought to a moisture content, and after adding lime or other amendments heated to 250 degrees Celsius or higher, maintained for a holding time. Lime is a bulk chemical widely used by drinking water utilities for softening and coagulation actions. Thus, the system of the present disclosure is simpler and potentially much cheaper than the alternatives. The system may accelerate the processes with increasing temperature and heat-up rate. After reaction, the contents may be neutralized with an appropriate acid or carbon dioxide gas to a pH condition that may be allowed for discharge disposal. The process includes (water+heat+base), but to our knowledge there are no similar reports of the process. Such a system could be used to destroy mixed waste materials, chemical stockpiles of fluorochemicals, industrial waste concentrates. Wastes could also be co-treated with wastewater biosolids to destroy the fluorochemicals and produce liquid and gaseous fuel products.

Example 2

According to another embodiment of the disclosure, a method is disclosed to process wastes continuously, or as batch operations for treating small volumes of material. Wastes may first be adjusted to a pre-determined moisture content. Lime or other base materials may be added to the wastes. The mixture may be heated to 250° C. or higher, and maintained for a holding time. The method may be accelerated with increasing temperature and heat-up rate.

After reaction, the contents may be neutralized with an appropriate acid or carbon dioxide gas to a pH condition that may be allowed for discharge disposal. Methods could be used to destroy mixed waste materials, chemical stockpiles of fluorochemicals, industrial waste concentrates.

Example 3

Hydrothermal reactions were conducted in 5.3 mL stainless steel reactors (10 cm long, ½ in. outer diameter, 0.049 in. wall thickness). Typically, a 50 mg/L PFOS aqueous solution was added to the reactor with NaOH or other amendments (typically 1 mol/L) before sealing. A list of example chemical reagents is provided in FIG. 22. The reactor was then heated to the desired temperature (200-350° C.) by submersing in a temperature-controlled fluidized sand bath. After the specified reaction time, the reaction was quenched by submerging the reactor in water. The reactor was then opened, and liquid contents were collected for the analysis of $F^-$ release (ion selective electrode) as well as PFOS degradation and formation of transient PFAS intermediates (LC-MS/MS). $^{19}F$-NMR was also applied to characterize fluorine changes. All experiments were conducted in duplicate.

Example 4—Preparation of Nanoscale Fe, Ni and Zn Particles

Nanoscale Fe(0), Ni(0) and Zn(0) particles used in the amendment screening experiment were prepared following procedures previously reported. Briefly, a 1.6 mol·L$^{-1}$ NaBH4 aqueous solution was added dropwise to a continuously stirred solution containing either 1 mol·L$^{-1}$ FeCl$_3$, NiCl$_2$ or ZnCl$_2$ under a reducing atmosphere (glovebox filled with 98% N$_2$ and 2% H$_2$). The dissolved metal ions were reduced according to the following reactions:

$$2Fe^{3+}+6BH_4^-+18H_2O=2Fe(0)(s)+6B(OH)_3+21H_2 \quad (4)$$

$$Ni^{2+}+2BH_4^-+6H_2O=Ni(0)(s)+2B(OH)_3+7H_2 \quad (5)$$

$$Zn^{2+}+2BH_4^-+6H_2O=Zn(0)(s)+2B(OH)_3+7H_2 \quad (6)$$

The resulting metal precipitates were allowed to settle out of solution before washing and drying with acetone inside a glovebox.

Example 5—Reaction Procedure

Stock solutions of PFOS and PFOA (500 mg/L) as well as aqueous reactive amendments (typically 1.11 mol/L) were prepared in deionized water (Milli-Q system). Using the amendment stock solution to dilute PFOS stock solution by 10 times could lead to a typical reaction system containing 50 mg·L$^{-1}$ PFOS and 1 mol·L$^{-1}$ amendment. Hydrothermal conversion experiments focused on identifying amendments that promote degradation of PFOS because initial tests showed that it was much more recalcitrant than perfluorooctanoic acid (PFOA). Whereas test reactions without any added amendments showed>99% degradation of 50 mg/L PFOA (250° C., 30 min), <1% of PFOS degraded under the same conditions.

Batch hydrothermal reactions were conducted in duplicate using stainless steel mini-tube reactors plugged with Swagelok® stainless steel-316 port connectors on both ends (10 cm long, ½ in. outer diameter, 0.049 in. wall thickness, and 5.33 mL working volume). Amendment screening experiments were first conducted to examine PFOS degradation and defluorination in the presence of a wide range of acids, bases, oxidants, and reductants. An aqueous solution of PFOS (typically 50 mg/L; 0.001 mol/L) was added to the reactor together with the desired amendment (typically 1 mol/L) before sealing. The reactor was then placed into a temperature-controlled fluidized sand bath (TIPTEMP company, N.J., USA) that was preheated to the desired reaction temperature (200-350° C.). Separate tests with thermocouples inserted into the same reactors filled with water showed that the reactor temperature reached the target value within 4 min. After the specified reaction time passed, the reactor was removed from the sand bath and quickly cooled to room temperature by submerging in a container of water. Thermocouple readings also showed that reactor contents were cooled within 2 min). The reactor was then opened, and liquid contents were collected for analysis.

Example 6—Analysis

A. Fluoride Ion Analysis

Figure 23:
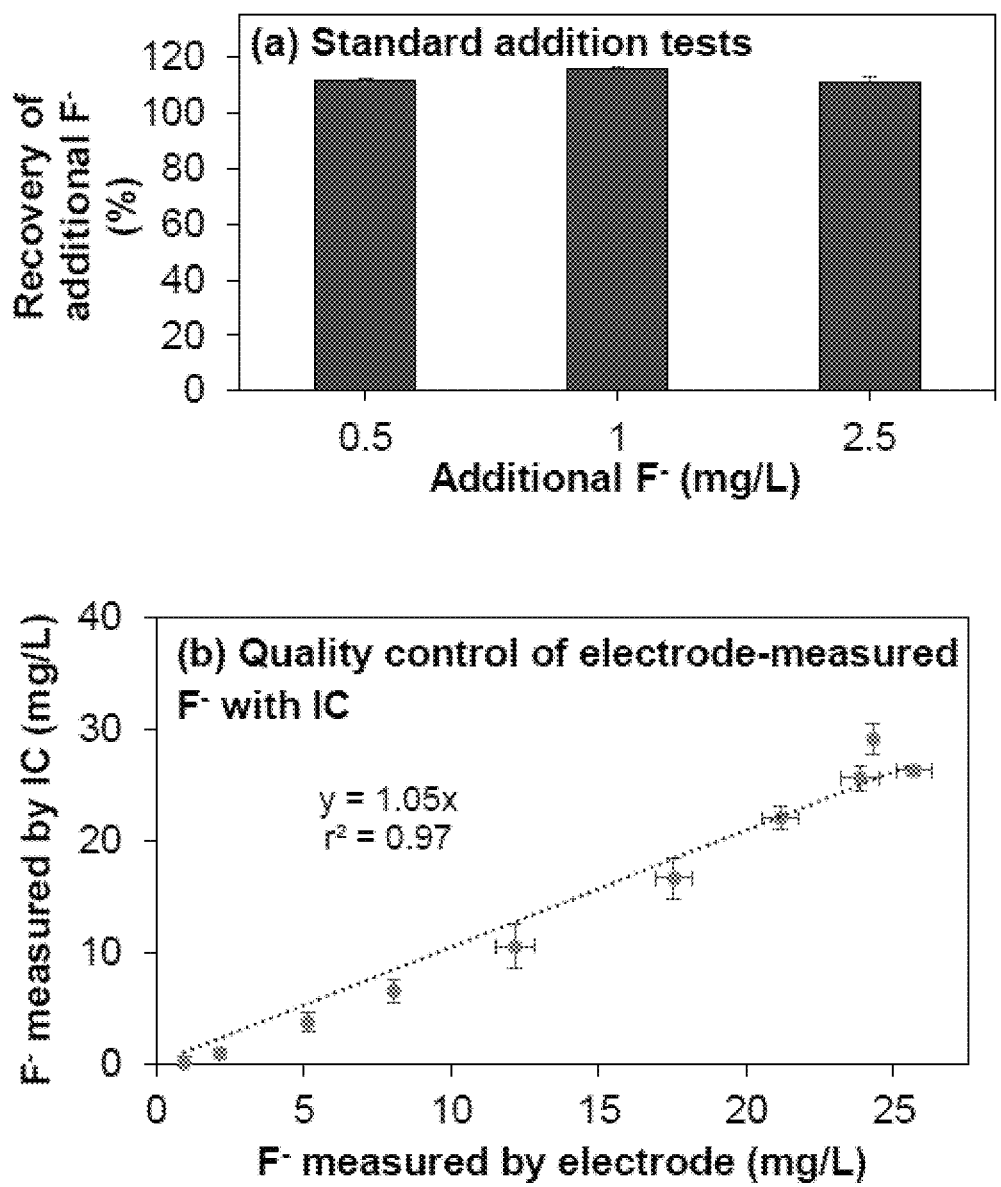
FIG. 23 shows results from an accuracy evaluation of electrode measurement of fluoride ion concentration. Pane (a) shows electrode-measured recovery rates of additional fluoride ions added to the reacted samples (50 mg·L-1 PFOS, 1 mol·L$^{-1}$ NaOH; 350° C., 90 min). Panel (b) is a comparison of IC- and electrode-measured fluoride ion concentrations of reacted PFOS samples for different reaction time periods. Each symbol represents one sample collected at a certain reaction time. The higher yield of fluoride ion was due to the longer reaction time. Reaction conditions: PFOS (50 mg/L), NaOH (1 mol/L), 350° C. 0-480 min. Error bars represent min/max values observed for duplicate experiments (smaller than symbol if not visible).

Fluoride ion concentrations were measured by fluorine ion selective electrode (Thermo Fisher, Mass. USA) after pH buffering of the samples to pH 5.0-5.5. The standard addition tests and ion chromatography (IC) analysis were conducted to verify the accuracy of fluoride ion measurement by electrode method. Fluoride was added into the reacted samples (50 mg·L$^{-1}$ PFOS, 1 mol·L$^{-1}$ NaOH; 350° C., 90 min) as NaF, and the electrode-measured recovery rates of additional F$^-$ ions were 110-115% as shown in FIG. 23 Panel A. The electrode-measured fluoride ion concentration of time-course samples (50 mg·L$^{-1}$ PFOS, 1 mol·L$^{-1}$ NaOH; 350° C., 0-480 min) was also in accordance with that of IC analysis (FIG. 23 Panel B).

B. LC-MS/MS Analysis

Concentrations of PFOS and selective perfluoroalkyl acid intermediate products were determined by liquid chromatography coupled with triple quadrupole mass spectrometry (LC-MS/MS; Agilent 1100 LC coupled to an Applied Biosystem API 3200 triple-quad mass spectrometer). Prior to analysis, samples were diluted 100,000-fold with a solution containing isotopically labeled internal standards (Table S1), methanol, isopropanol, and dilute ammonium hydroxide. Chromatographic separations of the injected samples (1 mL) were performed using a Phenomenex (Torrance, Calif, USA) Gemini C18 (100×3 mm, 5 μm) analytical column, which was preceded by a Phenomenex Gemini C18 guard column (4×2 mm) and two Agilent (Santa Clara, Calif., USA) Zorbax Diol guard columns (4.6×12.5 mm, 6 μm). Analytical and guard columns were maintained at 40° C. during analysis. Flow rate was 0.6 mL/min, and the gradient mobile phase consisted of 20 mM of Ammonium acetate in water (A) and in methanol (B) starting at 10% B, increased to 50% B in the first 0.5 min, increased to 99% B at 8 min, and maintained for 5 min, decreased to 10% B in 0.5 min, and maintained at 10% B to 20 min. Samples were introduced into the mass spectrometer via electrospray ionization (negative mode) with an applied voltage of −4500 V. Source temperature was 550° C., spectra accumulation time was 0.2 s, and scan time was 0.842 s. Detailed MS/MS analysis condition is described in FIG. 24.

C. Nuclear Magnetic Resonance (NMR) Analysis $^{19}$F NMR analysis of reacted PFOS solutions was used to verify the defluorination performance and to identify the chemical form of possible residual organic fluorine. In order to enhance the signal intensity, NMR analysis was performed on PFOS with an elevated concentration before and after hydrothermal reaction for different time periods. Reaction conditions were as follows: PFOS (5 mM, total fluorine=85 mM), NaOH (1 mol/L), 350 C, 0-600 min. All the samples were diluted 50:50 in $D_2O$ before collecting spectra. $^{19}$F spectra were recorded at 500 MHz on a JEOL ECA-500 spectrometer. 128 scans were obtained in 13107 data points over a spectral window from −200 ppm to 200 ppm (0.544 s acquisition time) using a 30° flip-angle pulse with $^1$H decoupling. The $^{19}$F 90° pulse width was 8.5 μs. A 10 s relaxation delay was employed. The free induction decays (FIDs) were processed using exponential multiplication (line-broadening 1 Hz) before Fourier transformation.

D. HPLC Analysis

Concentrations of octanoic acid, the un-fluorinated analogue of PFOA were determined by high performance liquid chromatography (HPLC; Agilent 1200 HPLC coupled to differential refraction index (RID) detector). The chromatographic separations of the injected samples (50 μL) were performed using a Spherisorb ODS2 Column (80 Å, 5 μm, 4.6 mm×250 mm, 1/pkg). The flow rate was 1 mL/min, and the mobile phase consisted of $H_2SO_4$ in HPLC water (pH 2.4, 2 mL 1N $H_2SO_4$ in 500 mL HPLC water) (A, 40%) and acetonitrile (B, 60%). The elution time for octanoic acid was 20 min.

Example 7—Destruction of PFAS Concentrates

Figure 25:
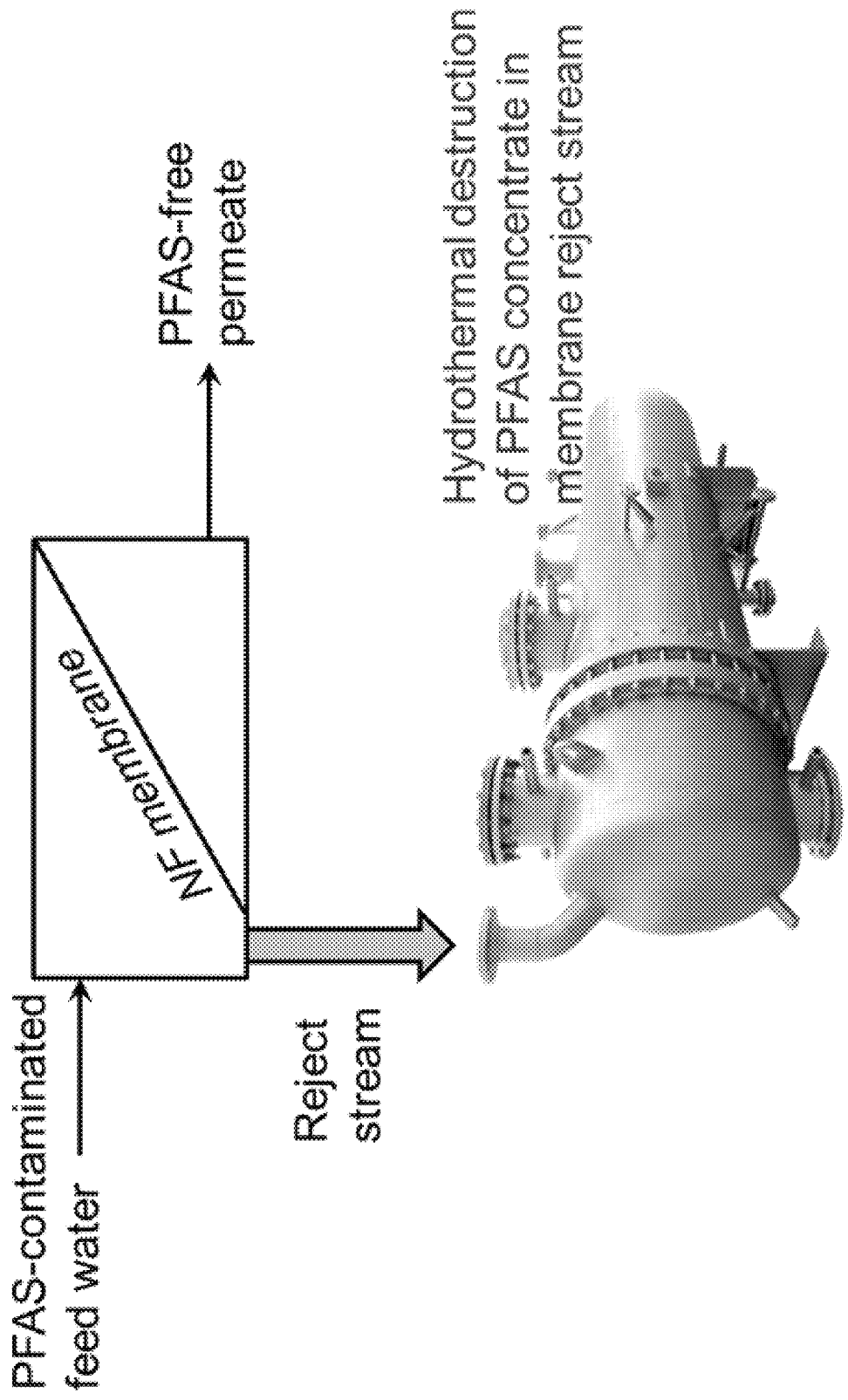
FIG. 25 depicts an example of an application of the hydrothermal destruction technology for mineralizing PFAS concentrate streams generated from membrane separations processes wherein nanofiltration or reverse osmosis membranes are used to remove the PFAS from contaminated water with a high degree of rejection, and the resulting reject stream that concentrates the PFAS is then sent to a hydrothermal destruction reactor before discharging.

FIG. 25 shows an example of a practical application of the present disclosure. Membrane separators may be used to remove PFAS from contaminated water or other aqueous streams. Such membrane systems reject concentrated PFAS. The PFAS-rich reject stream can be fed into a hydrothermal reactor capable of performing the methods of the present disclosure, for mineralization and destruction before being discharged. For example, a reactor such as a pressure vessel is shown that is capable of receiving PFAS and an amendment, heating and pressurizing the contents to hydrothermal conditions, holding the contents at hydrothermal conditions, optionally cooling the contents (e.g. using an internal heat exchanger), adjusting the pH of the contents (e.g., by adding acid to lower the pH), and discharging the contents including the destroyed PFAS. Such a reactor could be either a batch reactor, or a continuous process reactor.

Example 8—Other Applications

Figure 26:
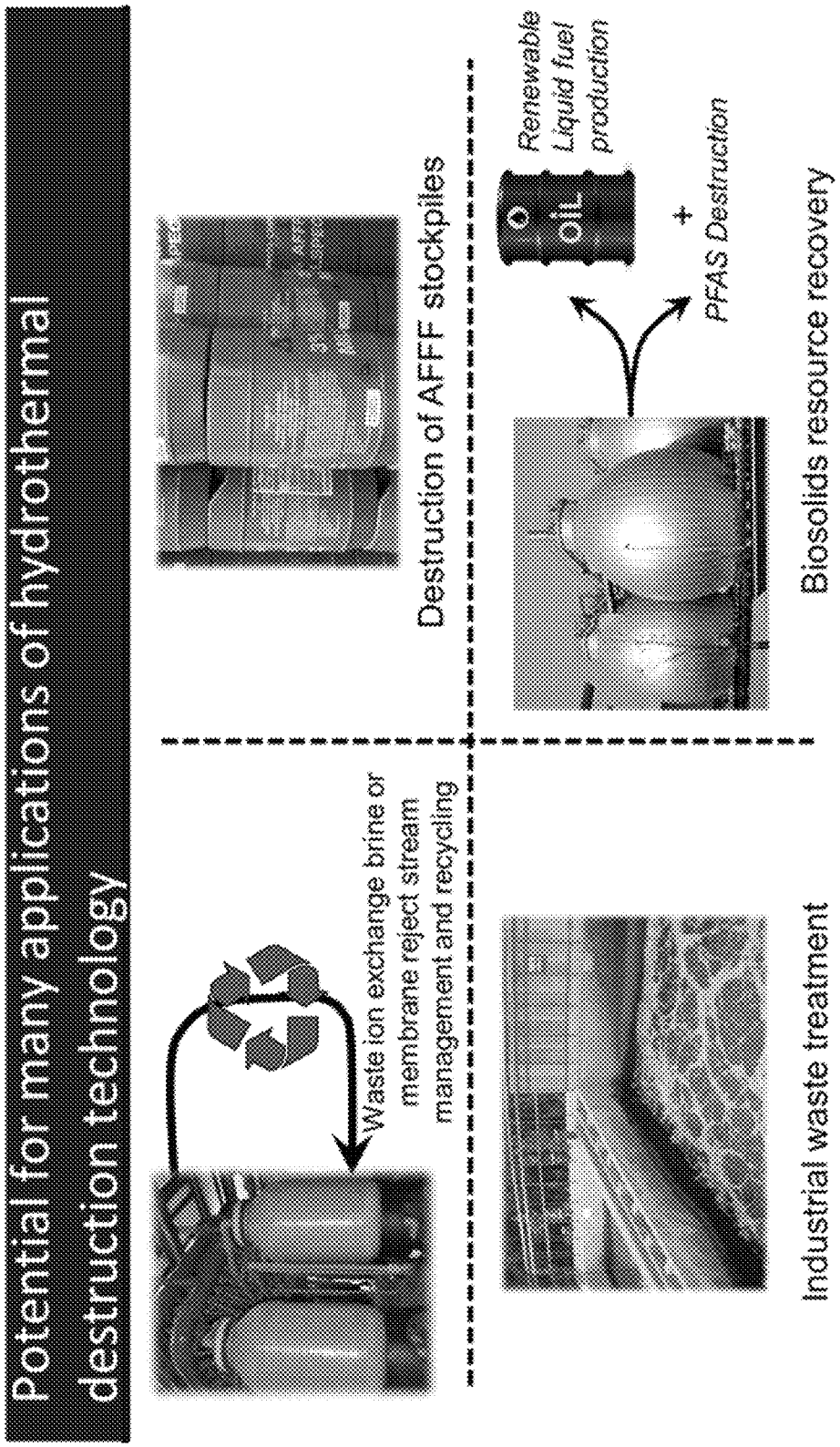
FIG. 26 depicts some additional examples of applications of the disclosure, including concentrate management, stockpile destruction, treatment of concentrated industrial wastes, and simultaneous destruction of PFAS that are adsorbed onto biosolids and other wastewater solid residuals when applying hydrothermal processing technologies for the purpose of producing liquid and gaseous fuel products.

FIG. 26 shows other examples of practical applications of the present disclosure. In some embodiments, the methods of the present disclosure can be used to manage PFAS concentrates. In some embodiments, the methods of the present disclosure can be used to destroy excess stockpiles of PFAS. In some embodiments, the methods of the present disclosure can be used to manage and treat industrial waste. In still other embodiments, the methods of the present disclosure can simultaneously destroy PFAS that are adsorbed onto biosolids and other wastewater solid residuals and produce liquid and gaseous fuel products.

While multiple embodiments are disclosed, still other embodiments of the present invention will become apparent to those skilled in the art from the detailed description. As will be apparent, the invention is capable of modifications in various aspects, all without departing from the spirit and scope of the present invention. Accordingly, the detailed description is to be regarded as illustrative in nature and not restrictive.

All references disclosed herein, whether patent or non-patent, are hereby incorporated by reference as if each was included at its citation, in its entirety. In case of conflict between reference and specification, the present specification, including definitions, will control.

Although the present disclosure has been described with a certain degree of particularity, it is understood the disclosure has been made by way of example, and changes in detail or structure may be made without departing from the spirit of the disclosure as defined in the appended claims.

ACRONYMS $^{19}$F NMR—Fluorine Nuclear Magnetic Resonance spectroscopy
AFCEC—Air Force Civil Engineering Center
AFFF—aqueous film-forming foam
BTEX—benzene, toluene, ethylbenzene, and xylenes
CSM—Colorado School of Mines
COD—chemical oxygen demand
CHG—catalytic hydrothermal gasification DOC—dissolved organic carbon
DOM—dissolved organic matter DoD—Department of Defense eaq$^-$—hydrated electron
EPA—Environmental Protection Agency
ERSON—Environmental Restoration Statement of Need
ESTCP—Environmental Security Technology Certification Program
FTSA—fluorotelomer sulfonate FTOH—fluorotelomer alcohol GAC—granular activated carbon
GC-ECD—gas chromatography with electron capture detection
GC-FID—gas chromatography with flame ionization detection
GC-MS/MS—gas chromatography with tandem mass spectrometry detection
HPLC—high performance liquid chromatography HRMS—high resolution mass spectrometry HTC—hydrothermal carbonization
HTL—hydrothermal liquefaction IDW—investigation-derived waste IPR—In-Progress Review
IPrOH—isopropyl alcohol
ISCO—in situ chemical oxidation
ISO—International Organization for Standardization
ICP-AES—inductively coupled plasma-atomic emissions spectrophotometry LC-QToF-MS—liquid chromatography with quantitative time-of-flight mass spectrometry detection
PFAAs—perfluoroalkyl acids
PFASs—per- and polyfluoroalkyl substances
PFBA—perfluorobutanoic acid PFBS—perfluorobutane sulfonate PFCAs—perfluorocarboxylic acids PFDoA—perfluorododecanoic acid PFDS—perfluorodecane sulfonate PFHpA—perfluoroheptanoic acid PFHxA—perfluorohexanoic acid PFHxS—perfluorohexane sulfonate PFNA—perfluorononanoic acid PFOA—perfluorooctanoic acid PFOS—perfluorooctane sulfonate
PFOSA—perfluorooctane sulfonamide PFPeA—perfluoropentanoic acid PFSAs—perfluoroalkyl sulfonic acids PFTeA—perfluorotetradecanoic acid PFTrA—perfluorotridecanoic acid
PFUnA—perfluoroundecanoic acid
RPM—Remedial Project Manager

REFERENCES

Peterson, A. A.; Vogel, F.; Lachance, R. P.; Froeling, M.; Antal, M. J.; Tester, J.

W. Thermochemical biofuel production in hydrothermal media: A review of sub- and supercritical water technologies. Energy Environ. Sci. 2008, 1 (1), 32-65.

Savage, P. E. A perspective on catalysis in sub- and supercritical water. J Supercrit. Fluids 2009, 47, 407-414.

Li, Y.; Leow, S.; Fedders, A. C.; Sharma, B. K.; Guest, J. S.; Strathmann, T. J. Quantitative multiphase model for hydrothermal liquefaction of algal biomass. Green Chem. 2017, 19 (4), 1163-1174.

Biller, P.; Sharma, B. K.; Kunwar, B.; Ross, A. B. Hydroprocessing of bio-crude from continuous hydrothermal liquefaction of microalgae. Fuel 2015, 159, 197-205.

Elliott, D. C.; Baker, E. G.; Beckman, D.; Solantausta, Y.; Tolenhiemo, V.; Gevert, S. B.; Hörnell, C.; Östman, A.; Kjellström, B. Technoeconomic assessment of direct biomass liquefaction to transportation fuels. Biomass 1990, 22 (1-4), 251-269.

Elliott, D. C.; Hart, T. R.; Neuenschwander, G. G.; Rotness, L. J.; Roesijadi, G.; Zacher, A. H.; Magnuson, J. K. Hydrothermal Processing of Macroalgal Feedstocks in Continuous-Flow Reactors. ACS Sustain. Chem. Eng. 2014, 2 (2), 207-215.

Genifuel—Welcome http://www.genifuel.com/ (accessed Oct. 9, 2017).

Lide, D. R. CRC Handbook of Chemistry and Physics; Taylor & Francis: Boca Raton, 2008.

Hori, H.; Nagaoka, Y.; Tanaka, M.; Tsuruho, K.; Sano, T.; Yamashita, N.; Taniyasu, S.; Kutsuna, S. Efficient Decomposition of Environmental Persistent Perfluorooctanesulfonate and Related Fluorochemicals Using Zerovalent Iron in Subcritical Water. Env. Sci Technol 2006, 40, 1049-1054.

Hori, H.; Nagaoka, Y.; Sano, T.; Kutsuna, S. Iron-induced decomposition of perfluorohexanesulfonate in sub- and supercritical water. Chemosphere 2008, 70 (5), 800-806.

Hu, X. C.; Andrews, D. Q.; Lindstrom, A. B.; Bruton, T. A.; Schaider, L. A.; Grandjean, P.; Lohmann, R.; Carignan, C. C.; Blum, A.; Balan, S. A.; et al. Detection of Poly- and Perfluoroalkyl Substances (PFASs) in U.S. Drinking Water Linked to Industrial Sites, Military Fire Training Areas, and Wastewater Treatment Plants. Environ. Sci. Technol. Lett. 2016.

K. Barzen-Hanson; J. Field; S. Roberts; S. Choyke; P. L. Ferguson; C. P. Higgins. Closing the mass balance on per- and polyfluorinated alkyl substances in groundwater at aqueous film-forming foam (AFFF) impacted sites. Manuscr. Prep.

Moody, C. A.; Field, J. A. Determination of Perfluorocarboxylates in Groundwater Impacted by Fire-Fighting Activity. Env. Sci Technol 1999, 33, 2800-2806.

Backe, W. J.; Day, T. C.; Field, J. A. Zwitterionic, Cationic, and Anionic Fluorinated Chemicals in Aqueous Film Forming Foam Formulations and Groundwater from U.S. Military Bases by Nonaqueous Large-Volume Injection HPLC-MS/MS. Environ. Sci. Technol. 2013, 47, 5226-5234.

Barzen-Hanson, K. A.; Field, J. A. Discovery and Implications of C2 and C3 Perfluoroalkyl Sulfonates in Aqueous Film-Forming Foams and Groundwater. Environ. Sci. Technol. Lett. 2015, 2 (4), 95-99.

Barzen-Hanson, K. A.; Roberts, S. C.; Choyke, S.; Oetjen, K.; McAlees, A.; Riddell, N.; McCrindle, R.; Ferguson, P. L.; Higgins, C. P.; Field, J. A. Discovery of 40 Classes of Per- and Polyfluoroalkyl Substances in Historical Aqueous Film-Forming Foams (AFFFs) and AFFF-Impacted Groundwater. Environ. Sci. Technol. 2017, 51 (4), 2047-2057.

Wang, Z.; DeWitt, J. C.; Higgins, C. P.; Cousins, I. T. A Never-Ending Story of Per- and Polyfluoroalkyl Substances (PFASs)? Environ. Sci. Technol. 2017.

Parsons, J. R.; Saez, M.; Dolfing, J.; Voogt, P. Biodegradation of Perfluorinated Compounds. Rev Env. Contam Toxicol 2008, 196, 53-71.

Schultz, C. A.; Gundl, T. J. pH Dependence on Reduction Rate of 4-Cl-Nitrobenzene by Fe(II)/Montmorillonite Systems. Env. Sci Technol 2000, 34, 3641-3648.

Houtz, E. F.; Higgins, C. P.; Field, J. A.; Sedlak, D. L. Persistence of Perfluoroalkyl Acid Precursors in AFFF-Impacted Groundwater and Soil. Environ. Sci. Technol. 2013, 47 (15), 8187-8195.

Arvaniti, O. S.; Stasinakis, A. S. Review on the occurrence, fate and removal of perfluorinated compounds during wastewater treatment. Sci. Total Environ. 2015, 524-525, 81-92.

Merino, N.; Qu, Y.; Deeb, R. A.; Hawley, E. L.; Hoffmann, M. R.;

Mahendra, S. Degradation and Removal Methods for Perfluoroalkyl and Polyfluoroalkyl Substances in Water. Environ. Eng. Sci. 2016, 33 (9), 615-649

Remde, A.; Debus, R. Biodegradability of Fluorinated Surfactants under Aerobic and Anaerobic Conditions. Chemosphere 1996, 32, 1563-1574.

Parsons, J. R.; Saez, M.; Dolfing, J.; Voogt, P. Biodegradation of Perfluorinated Compounds. Rev Env. Contam Toxicol 2008, 196, 53-71.

Houde, M.; Martin, J. W.; Letcher, R. J.; Solomon, K. R.; Muir, D. C. G. Biological Monitoring of Polyfluoroalkyl Substances. Env. Sci Technol 2006, 40, 3463-3473.

Prevedouros, K.; Cousins, I. T.; Buck, R. C.; Korzeniowski, H. Sources, Fate and Transport of Perfluorocarboxylates. Env. Sci Technol 2006, 40, 32-44.

Butt, C. M.; Muir, D. C. G.; Mabury, S. A. Biotransformation pathways of fluorotelomer-based polyfluoroalkyl substances: A review. Environ. Toxicol. Chem. 2014, 33 (2), 243-267.

Tsitonaki, A.; Petri, B.; Crimi, M.; Mosbaek, H.; Siegrest, R.; Bjerg, P. L. lin Situ Chemical Oxidation of Contaminated Soil and Groundwater using Persulfate: A Review. Rev EnvironSci Technol 2010, 40, 55-91.

Lee, Y.; Lo, S.; Kuo, J.; Hsieh, C. Decomposition of perfluorooctanoic acid by microwaveactivated persulfate: Effects of temperature, pH, and chloride ions. Front. Environ. Sci. Eng. 2011, 6 (1), 17-25.

Lee, Y.-C.; Lo, S.-L.; Chiueh, P.-T.; Chang, D.-G. Efficient Decomposition of Perfluorocarboxylic Acids in Aqueous Solution using Microwave-Induced Persulfate. Wat Res 2009, 43, 2811-2816.

Yang, S.; Cheng, J.; Sun, J.; Hu, Y.; Liang, X. Defluorination of Aqueous Perfluorooctanesulfonate by Activated Persulfate Oxidation. PLOS ONE 2013, 8 (10), e74877.

Park, H.; Vecitis, C. D.; Cheng, J.; Dalleska, N. F.; Mader, B. T.; Hoffmann, M. R. Reductive degradation of perfluoroalkyl compounds with aquated electrons generated from iodide photolysis at 254 nm. Photochem. Photobiol. Sci. 2011, 10 (12), 1945-1953.

Miehr, R.; Tratnyek, P. G.; Bandstra, J. Z.; Scherer, M. M.; Alowitz, M. J.; Bylaska, E. J. Diversity of contaminant reduction reactions by zerovalent iron: Role of the reductate. Environ. Sci. Technol. 2004, 38 (1), 139-147.

Su, C. M.; Puls, R. W. Kinetics of trichloroethene reduction by zerovalent iron and tin: Pretreatment effect, apparent activation energy, and intermediate products. Environ. Sci. Technol. 1999, 33 (1), 163-168.

Gu, Y.; Dong, W.; Luo, C.; Liu, T. Efficient Reductive Decomposition of Perfluorooctanesulfonate in a High Photon Flux UV/Sulfite System. Environ. Sci. Technol. 2016, 50 (19), 10554-10561.

Song, Z.; Tang, H.; Wang, N.; Zhu, L. Reductive defluorination of perfluorooctanoic acid by hydrated electrons in a sulfite-mediated UV photochemical system. J. Hazard. Mater. 2013, 262, 332-338.

Siefermann, K. R.; Abel, B. The Hydrated Electron: A Seemingly Familiar Chemical and Biological Transient. Angew. Chem. Int. Ed. 2011, 50 (23), 5264-5272.

Park, H.; Vecitis, C. D.; Cheng, J.; Choi, W.; Mader, B. T.; Hoffmann, M.

R. Reductive Defluorination of Aqueous Perfluorinated Alkyl Surfactants: Effects of Ionic Headgroup and Chain Length. J Phys Chem A 2009, 113, 690-696.

Schaefer, C. E.; Andaya, C.; Urtiaga, A.; McKenzie, E. R.; Higgins, C. P. Electrochemical treatment of perfluorooctanoic acid (PFOA) and perfluorooctane sulfonic acid (PFOS) in groundwater impacted by aqueous film forming foams (AFFFs). J. Hazard. Mater. 2015, 295, 170-175.

Lin, H.; Niu, J.; Ding, S.; Zhang, L. Electrochemical degradation of perfluorooctanoic acid (PFOA) by $Ti/SnO_2$—Sb, $Ti/SnO_2$—$Sb/PbO_2$ and $Ti/SnO_2$—$Sb/MnO_2$ anodes. Water Res. 2012, 46 (7), 2281-2289.

Ochiai, T.; Iizuka, Y.; Nakata, K.; Murakami, T.; Tryk, D. A.; Fujishima, A.; Koide, Y.; Morito, Y. Efficient electrochemical decomposition of perfluorocarboxylic acids by the use of a boron-doped diamond electrode. Diam. Relat. Mater. 2011, 20 (2), 64-67.

Zhuo, Q.; Luo, M.; Guo, Q.; Yu, G.; Deng, S.; Xu, Z.; Yang, B.; Liang, X. Electrochemical Oxidation of Environmentally Persistent Perfluorooctane Sulfonate by a Novel Lead Dioxide Anode. Electrochimica Acta 2016, 213, 358-367.

Eddy, I. M. &; Tchobanoglous, G.; Stensel, H. D.; Tsuchihashi, R.; Burton, F. Wastewater Engineering: Treatment and Resource Recovery, 5 edition.; McGraw-Hill Education: New York, N.Y., 2013.

Atkins, P. & J. de P. Atkins' Physical Chemistry, 10th Revised edition edition.; Oxford University Press: Oxford; New York, 2014.

Vardon, D. R.; Sharma, B. K.; Scott, J.; Yu, G.; Wang, Z.; Schideman, L.; Zhang, Y.; Strathmann, T. J. Chemical properties of biocrude oil from the hydrothermal liquefaction of Spirulina algae, swine manure, and digested anaerobic sludge. Bioresour. Technol. 2011, 102, 8295-8303.

Vardon, D. R.; Sharma, B. K.; Blazina, G. V.; Rajagopalan, K.; Strathmann, T. J. Thermochemical conversion of raw and defatted algal biomass via hydrothermal liquefaction and slow pyrolysis. Bioresour. Technol. 2012, 109, 178-187.

Leow, S.; Witter, J. R.; Vardon, D. R.; Sharma, B. K.; Guest, J. S.; Strathmann, T. J. Prediction of microalgae hydrothermal liquefaction products from feedstock biochemical composition. Green Chem. 2015, 17 (6), 3584-3599.

Vardon, D. R.; Sharma, B. K.; Humberto Jarmillo; Kim, Dongwook; Choe, Jong Kwon; Ciesielski, Peter; Strathmann, Timothy J. Hydrothermal catalytic processing of saturated and unsaturated fatty acids to hydrocarbons with glycerol for in situ hydrogen production. Green Chem. 2014, 16, 1507-1520.

Kim, D.; Vardon, D. R.; Murali, D.; Sharma, B. K.; Strathmann, T. J. Valorization of Waste Lipids through Hydrothermal Catalytic Conversion to Liquid Hydrocarbon Fuels with in Situ Hydrogen Production. ACS Sustain. Chem. Eng. 2016, 4 (3), 1775-1784.

McGuire, M. E.; Schaefer, C.; Richards, T.; Backe, W. J.; Field, J. A.; Houtz, E.; Sedlak, D. L.; Guelfo, J. L.; Wunsch, A.; Higgins, C. P. Evidence of Remediation- Induced Alteration of Subsurface Poly- and Perfluoroalkyl Substance Distribution at a Former Firefighter Training Area. Environ. Sci. Technol. 2014, 48 (12), 6644-6652.

Blaine, A. C.; Rich, C. D.; Sedlacko, E. M.; Hundal, L. S.; Kumar, K.; Lau, C.; Mills, M. A.; Harris, K. M.; Higgins, C. P. Perfluoroalkyl Acid Distribution in Various Plant Compartments of Edible Crops Grown in Biosolids-Amended soils. Environ. Sci. Technol. 2014, 48 (14), 7858-7865.

McGuire, M. E.; Schaefer, C.; Richards, T.; Backe, W. J.; Field, J. A.; Houtz, E.; Sedlak, D. L.; Guelfo, J. L.; Wunsch, A.; Higgins, C. P. Evidence of Remediation-Induced Alteration of Subsurface Poly- and Perfluoroalkyl Substance Distribution at a Former Firefighter Training Area. Environ. Sci. Technol. 2014, 48 (12), 6644-6652.

X. Xiao; B. A. Ulrich; B. Chen; C. P. Higgins. Sorption of Poly- and Perfluoroalkyl substances (PFASs) relevant to Aqueous Film Forming Foam (AFFF)-impacted Groundwater by Biochars and Activated Carbon. Env. Sci Technol 2017, In Review (February 2017).

Eaton, A. D.; Franson, M. A. H.; Association, A. W. W.; Federation, W. E. Standard methods for the examination of water & wastewater; American Public Health Association, 2005.

Appleman, T. D.; Higgins, C. P.; Quiñones, O.; Vanderford, B. J.; Kolstad, C.; Zeigler-Holady, J. C.; Dickenson, E. R. V. Treatment of poly- and perfluoroalkyl substances in U.S. full-scale water treatment systems. Water Res. 2014, 51, 246-255.

Appleman, T. D.; Dickenson, E. R. V.; Bellona, C.; Higgins, C. P. Nanofiltration and granular activated carbon treatment of perfluoroalkyl acids. J. Hazard. Mater. 2013, 260, 740-746.

Higgins, C. P.; Field, J. A.; Criddle, C. S.; Luthy, R. G. Quantitative Determination of Perfluorochemicals in Sediments and Domestic Sludge. Environ. Sci. Technol. 2005, 39 (11), 3946-3956.

Setokuchi O, Kutsuna S, Sato M. A theoretical study of thermal decomposition of CF3CO, C2F5CO and C3F7CO [J]. Chemical physics letters, 2006, 429(4-6): 360-364.

Wang F, Lu X, Li X, et al. Effectiveness and mechanisms of defluorination of perfluorinated alkyl substances by calcium compounds during waste thermal treatment[J]. Environmental science & technology, 2015, 49(9): 5672-5680.

Hori H, Nagaoka Y, Murayama M, et al. Efficient decomposition of perfluorocarboxylic acids and alternative fluorochemical surfactants in hot water[J]. Environmental Science & Technology, 2008, 42(19): 7438-7443.

Lee Y C, Lo S L, Chiueh P T, et al. Efficient decomposition of perfluorocarboxylic acids in aqueous solution using microwave-induced persulfate[J]. Water research, 2009, 43(11): 2811-2816.

Hori H, Nagano Y, Murayama M, et al. Efficient decomposition of perfluoroether carboxylic acids in water with a combination of persulfate oxidant and ultrasonic irradiation [J]. Journal of Fluorine Chemistry, 2012, 141: 5-10.

Hori H, Murayama M, Inoue N, et al. Efficient mineralization of hydroperfluorocarboxylic acids with persulfate in hot water[J]. Catalysis Today, 2010, 151(1-2): 131-136.

Wang F, Lu X, Shih K, et al. Influence of calcium hydroxide on the fate of perfluorooctanesulfonate under thermal conditions[J]. Journal of hazardous materials, 2011, 192(3): 1067-1071.

Wang F, Shih K, Lu X, et al. Mineralization behavior of fluorine in perfluorooctanesulfonate (PFOS) during thermal treatment of lime-conditioned sludge[J]. Environmental science & technology, 2013, 47(6): 2621-2627.

Watanabe N, Takemine S, Yamamoto K, et al. Residual organic fluorinated compounds from thermal treatment of PFOA, PFHxA and PFOS adsorbed onto granular activated carbon (GAC)[J]. Journal of Material Cycles and Waste Management, 2016, 18(4): 625-630.

Liu J, Qu R, Wang Z, et al. Thermal- and photo-induced degradation of perfluorinated carboxylic acids: Kinetics and mechanism[J]. Water research, 2017, 126: 12-18.

Yamada T, Taylor P H, Buck R C, et al. Thermal degradation of fluorotelomer treated articles and related materials [J]. Chemosphere, 2005, 61(7): 974-984.

Watanabe N, Takata M, Takemine S, et al. Thermal mineralization behavior of PFOA, PFHxA, and PFOS during reactivation of granular activated carbon (GAC) in nitrogen atmosphere[J]. Environmental Science and Pollution Research, 2018, 25(8): 7200-7205. Vom Eyser C. Behavior of Micropollutants During Hydrothermal Carbonization of Sewage Sludge[D]. Universitätsbibliothek Duisburg-Essen, 2016.

Hori H, Noda Y, Takahashi A, et al. Decomposition of perfluorinated ionic liquid anions to fluoride ions in subcritical and supercritical water with iron-based reducing agents[J]. Industrial & Engineering Chemistry Research, 2013, 52(38): 13622-13628.

Hori H, Saito H, Sakai H, et al. Efficient decomposition of a new fluorochemical surfactant: Perfluoroalkane disulfonate to fluoride ions in subcritical and supercritical water[J]. Chemosphere, 2015, 129: 27-32.

Hori H, Nagaoka Y, Yamamoto A, et al. Efficient decomposition of environmentally persistent perfluorooctanesulfonate and related fluorochemicals using zerovalent iron in subcritical water[J]. Environmental science & technology, 2006, 40(3): 1049-1054.

Hori H, Nagaoka Y, Sano T, et al. Iron-induced decomposition of perfluorohexanesulfonate in sub- and supercritical water[J]. Chemosphere, 2008, 70(5): 800-806.

Hori H, Sakamoto T, Kimura Y, et al. Iron-induced efficient mineralization of a cyclic perfluoroalkyl surfactant in subcritical and supercritical water[J]. Catalysis today, 2012, 196(1): 132-136.

Lee Y C, Lo S L, Chiueh P T, et al. Microwave-hydrothermal decomposition of perfluorooctanoic acid in water by iron-activated persulfate oxidation[J]. Water research, 2010, 44(3): 886-892.

Wang, C.; Zhang, W., Synthesizing nanoscale iron particles for rapid and complete dechlorination of TCE and PCBs. *Environ. Sci. Technol.* 1997, 31, 2154-2156.

Cheng, R.; Zhou, W.; Wang, J.-L.; Qi, D.; Guo, L.; Zhang, W.-X.; Qian, Y., Dechlorination of pentachlorophenol using nanoscale Fe/Ni particles: role of nano-Ni and its size effect. *J. Hazard. Mater.* 2010, 180, 79-85.

Arnold, W. A.; Roberts, A. L., Pathways of chlorinated ethylene and chlorinated acetylene reaction with Zn (0). *Environ. Sci. Technol.* 1998, 32, 3017-3025.

Giesy, J. P.; Kannan, K. Perfluorochemical surfactants in the environment. *Environ. Sci. Technol.* 2002, 36, 146A-152A.

Higgins, C. P.; Field, J. A.; Criddle, C. S.; Luthy, R. G. Quantitative determination of perfluorochemicals in sediments and domestic sludge. *Environ. Sci. Technol.* 2005, 39, 3946-3956.

Kim, S.-K.; Kannan, K. Perfluorinated acids in air, rain, snow, surface runoff, and lakes: relative importance of pathways to contamination of urban lakes. *Environ. Sci. Technol.* 2007, 41, 8328-8334.

Sun, H.; Li, F.; Zhang, T.; Zhang, X.; He, N.; Song, Q.; Zhao, L.; Sun, L.; Sun, T. Perfluorinated compounds in surface waters and WWTPs in Shenyang, China: mass flows and source analysis. *Water Res.* 2011, 45, 4483-4490.

Houtz, E. F.; Higgins, C. P.; Field, J. A.; Sedlak, D. L. Persistence of perfluoroalkyl acid precursors in AFFF-impacted groundwater and soil. *Environ. Sci. Technol.* 2013, 47, 8187-8195.

Kotthoff, M.; Müller, J.; Jürling, H.; Schlummer, M.; Fiedler, D. Perfluoroalkyl and polyfluoroalkyl substances in consumer products. *Environ. Sci. Pollut. Res.* 2015, 22, 14546-14559.

Wang, Z.; DeWitt, J. C.; Higgins, C. P.; Cousins, I. T. A neverending story of per- and polyfluoroalkyl substances (PFASs)? *Environ. Sci. Technol.* 2017, 51, 2508-2518.

Schaefer, C. E.; Choyke, S.; Ferguson, P. L.; Andaya, C.; Burant, A.; Maizel, A.; Strathmann, T. J.; Higgins, C. P. Electrochemical transformations of perfluoroalkyl acid (PFAA) precursors and PFAAs in groundwater impacted with aqueous film forming foams. *Environ. Sci. Technol.* 2018, 52, 10689-10697.

Bentel, M. J.; Yu, Y.; Xu, L.; Li, Z.; Wong, B. M.; Men, Y.; Liu, J. Defluorination of per- and polyfluoroalkyl substances (PFASs) with hydrated electrons: structural dependence and implications to PFAS remediation and management. *Environ. Sci. Technol.* 2019, 53, 3718-3728.

Sahu, S. P.; Qanbarzadeh, M.; Ateia, M.; Torkzadeh, H.; Maroli, A. S.; Cates, E. L. Rapid degradation and mineralization of perfluorooctanoic acid by a new petitjeanite Bi3O(OH)(PO4) 2 microparticle ultraviolet photocatalyst. *Environ. Sci. Technol. Lett.* 2018, 5, 533-538.

Shende, T.; Andaluri, G.; Suri, R. P. Kinetic model for sonolytic degradation of non-volatile surfactants: Perfluoroalkyl substances. *Ultrason. Sonochem.* 2019, 51, 359-368.

Stratton, G. R.; Dai, F.; Bellona, C. L.; Holsen, T. M.; Dickenson, E. R.; Mededovic Thagard, S. Plasma-based water treatment: efficient transformation of perfluoroalkyl substances in prepared solutions and contaminated groundwater. *Environ. Sci. Technol.* 2017, 51, 1643-1648.

Singh, R. K.; Fernando, S.; Baygi, S. F.; Multari, N.; Thagard, S. M.; Holsen, T. M. Breakdown Products from Perfluorinated Alkyl Substances (PFAS) Degradation in a Plasma-Based Water Treatment Process. *Environ. Sci. Technol.* 2019, 53, 2731-2738.

Zhang, K.; Huang, J.; Yu, G.; Zhang, Q.; Deng, S.; Wang, B. Destruction of perfluorooctane sulfonate (PFOS) and perfluorooctanoic acid (PFOA) by ball milling. *Environ. Sci. Technol.* 2013, 47, 6471-6477.

Park, H.; Vecitis, C. D.; Cheng, J.; Choi, W.; Mader, B. T.; Hoffmann, M. R. Reductive defluorination of aqueous perfluorinated alkyl surfactants: effects of ionic headgroup and chain length. *J. Phys. Chem. A* 2009, 113, 690-696.

Moriwaki, H.; Takagi, Y.; Tanaka, M.; Tsuruho, K.; Okitsu, K.; Maeda, Y. Sonochemical decomposition of perfluorooctane sulfonate and perfluorooctanoic acid. *Environ. Sci. Technol.* 2005, 39, 3388-3392.

Ochoa-Herrera, V.; Field, J. A.; Luna-Velasco, A.; Sierra-Alvarez, R. Microbial toxicity and biodegradability of perfluorooctane sulfonate (PFOS) and shorter chain perfluoroalkyl and polyfluoroalkyl substances (PFASs). *Environ. Sci.: Processes Impacts* 2016, 18, 1236-1246.

Brendel, S.; Fetter, É.; Staude, C.; Vierke, L.; Biegel-Engler, A. Short-chain perfluoroalkyl acids: environmental concerns and a regulatory strategy under REACH. *Environ. Sci. Eur.* 2018, 30, 9.

Burdeniuc, J.; Jedicka, B.; Crabtree, R. H. Recent advances in C—F bond activation. *Chem. Ber.* 1997, 130, 145-154.

Watanabe, N.; Takata, M.; Takemine, S.; Yamamoto, K. Thermal mineralization behavior of PFOA, PFHxA, and PFOS during reactivation of granular activated carbon (GAC) in nitrogen atmosphere. *Environ. Sci. Pollut. Res.* 2018, 25, 7200-7205.

Wang, F.; Lu, X.; Li, X.-y.; Shih, K. Effectiveness and mechanisms of defluorination of perfluorinated alkyl substances by calcium compounds during waste thermal treatment. *Environ. Sci. Technol.* 2015, 49, 5672-5680.

González-Martínez, A.; de Simón-Martín, M.; López, R.; Táboas-Fernández, R.; Bernardo-Sánchez, A. Remediation of Potential Toxic Elements from Wastes and Soils: Analysis and Energy Prospects. *Sustainability* 2019, 11, 3307.

Toor, S. S.; Rosendahl, L.; Rudolf, A. Hydrothermal liquefaction of biomass: a review of subcritical water technologies. *Energy* 2011, 36, 2328-2342.

López Barreiro, D.; Prins, W.; Ronsse, F.; Brilman, W. Hydrothermal liquefaction (HTL) of microalgae for biofuel production: state of the art review and future prospects. *Biomass Bioenergy* 2013, 53, 113-127.

Akhtar, J.; Amin, N. A. S. A review on process conditions for optimum bio-oil yield in hydrothermal liquefaction of biomass. *Renewable Sustainable Energy Rev.* 2011, 15, 1615-1624.

Hori, H.; Nagaoka, Y.; Murayama, M.; Kutsuna, S. Efficient decomposition of perfluorocarboxylic acids and alternative fluorochemical surfactants in hot water. *Environ. Sci. Technol.* 2008, 42, 7438-7443.

Hori, H.; Nagaoka, Y.; Yamamoto, A.; Sano, T.; Yamashita, N.; Taniyasu, S.; Kutsuna, S.; Osaka, I.; Arakawa, R. Efficient decomposition of environmentally persistent perfluorooctanesulfonate and related fluorochemicals using zerovalent iron in subcritical water. *Environ. Sci. Technol.* 2006, 40, 1049-1054.

Mckenzie, E. R.; Siegrist, R. L.; Mccray, J. E.; Higgins, C. P. Effects of chemical oxidants on perfluoroalkyl acid transport in onedimensional porous media columns. *Environ. Sci. Technol.* 2015, 49, 1681-1689.

Arsenault, G.; Chittim, B.; Gu, J.; McAlees, A.; McCrindle, R.; Robertson, V. Separation and fluorine nuclear magnetic resonance spectroscopic (19F NMR) analysis of individual branched isomers present in technical perfluorooctanesulfonic acid (PFOS). *Chemosphere* 2008, 73, S53-S59.

Bruton, T. A.; Sedlak, D. L. Treatment of aqueous film-forming foam by heat-activated persulfate under conditions representative of in situ chemical oxidation. *Environ. Sci. Technol.* 2017, 51, 13878-13885.

Bruton, T. A.; Sedlak, D. L. Treatment of perfluoroalkyl acids by heat-activated persulfate under conditions representative of in situ chemical oxidation. *Chemosphere* 2018, 206, 457-464.

Lee, Y.-C.; Lo, S.-L.; Chiueh, P.-T.; Chang, D.-G. Efficient decomposition of perfluorocarboxylic acids in aqueous solution using microwave-induced persulfate. *Water Res.* 2009, 43, 2811-2816.

Sharma, V. K. Potassium ferrate (VI): an environmentally friendly oxidant. *Adv. Environ. Res.* 2002, 6, 143-156.

Liu, B.; Li, Z. A review: hydrogen generation from borohydride hydrolysis reaction. *J. Power Sources* 2009, 187, 527-534.

Prout, E.; Tompkins, F. C. The thermal decomposition of potassium permanganate. *Trans. Faraday Soc.* 1944, 40, 488-498.

Aylmore, M. G.; Muir, D. M. Thiosulfate leaching of gold-a review. *Miner. Eng.* 2001, 14, 135-174.

Houston, P. L. *Chemical kinetics and reaction dynamics*; Courier Corporation, 2012; Chapter 1, pp 7-8.

Wang, F.; Shih, K.; Lu, X.; Liu, C. Mineralization behavior of fluorine in perfluorooctanesulfonate (PFOS) during thermal treatment of lime-conditioned sludge. *Environ. Sci. Technol.* 2013, 47, 2621-2627.

Niu, J.; Lin, H.; Gong, C.; Sun, X. Theoretical and experimental insights into the electrochemical mineralization mechanism of perfluorooctanoic acid. *Environ. Sci. Technol.* 2013, 47, 14341-14349.

Li, J.; Brill, T. B. Spectroscopy of hydrothermal reactions 23: the effect of OH substitution on the rates and mechanisms of decarboxylation of benzoic acid. *J. Phys. Chem. A* 2003, 107, 2667-2673.

Nohara, K.; Toma, M.; Kutsuna, S.; Takeuchi, K.; Ibusuki, T. Cl atom-initiated oxidation of three homologous methyl perfluoroalkyl ethers. *Environ. Sci. Technol.* 2001, 35, 114-120.

Ellis, D. A.; Martin, J. W.; De Silva, A. O.; Mabury, S. A.; Hurley, M. D.; Sulbaek Andersen, M. P.; Wallington, T. J. Degradation of fluorotelomer alcohols: a likely atmospheric source of perfluorinated carboxylic acids. *Environ. Sci. Technol.* 2004, 38, 3316-3321.

de Bruyn, W. J.; Shorter, J. A.; Davidovits, P.; Worsnop, D. R.; Zahniser, M. S.; Kolb, C. E. Uptake of haloacetyl and carbonyl halides by water surfaces. *Environ. Sci. Technol.* 1995, 29, 1179-1185.

Yamasaki, N.; Yasui, T.; Matsuoka, K. Hydrothermal decomposition of polychlorinated biphenyls. *Environ. Sci. Technol.* 1980, 14, 550-552.

Yamasaki, Y.; Enomoto, H.; Yamasaki, N.; Nakahara, M. NMR Study of Hydrothermal Reactions of Dichloromethane with and without Alkali. *Bull. Chem. Soc. Jpn.* 2000, 73, 2687-2693.

Onwudili, J. A.; Williams, P. T. Hydrothermal reactions of sodium formate and sodium acetate as model intermediate products of the sodium hydroxide-promoted hydrothermal gasification of biomass. *Green Chem.* 2010, 12, 2214-2224.

Guo, Y.; Wang, S.; Xu, D.; Gong, Y.; Ma, H.; Tang, X. Review of catalytic supercritical water gasification for hydrogen production from biomass. *Renewable Sustainable Energy Rev.* 2010, 14, 334-343.

Peterson, A. A.; Vogel, F.; Lachance, R. P.; Froling, M.; Antal, M. J., Jr; Tester, J. W. Thermochemical biofuel production in hydrothermal media: a review of sub- and supercritical water technologies. *Energy Environ. Sci.* 2008, 1, 32-65.

Belsky, A.; Maiella, P.; Brill, T. Spectroscopy of hydrothermal reactions 13. Kinetics and mechanisms of decarboxylation of acetic acid derivatives at 100-260° C. under 275 bar. *J. Phys. Chem. A* 1999, 103, 4253-4260.

Watanabe, M.; Inomata, H.; Smith, R. L., Jr; Arai, K. Catalytic decarboxylation of acetic acid with zirconia catalyst in supercritical water. *Appl. Catal., A* 2001, 219, 149-156.

Watanabe, M.; Iida, T.; Inomata, H. Decomposition of a long chain saturated fatty acid with some additives in hot compressed water. *Energy Conyers. Manage.* 2006, 47, 3344-3350.

Onwudili, J. A.; Williams, P. T. Role of sodium hydroxide in the production of hydrogen gas from the hydrothermal gasification of biomass. *Int. J. Hydrogen Energy* 2009, 34, 5645-5656.

Fu, J.; Lu, X.; Savage, P. E. Catalytic hydrothermal deoxygenation of palmitic acid. *Energy Environ. Sci.* 2010, 3, 311-317.

Zaggia, A.; Conte, L.; Falletti, L.; Fant, M.; Chiorboli, A. Use of strong anion exchange resins for the removal of perfluoroalkylated substances from contaminated drinking water in batch and continuous pilot plants. *Water Res.* 2016, 91, 137-146.

Tang, C. Y.; Fu, Q. S.; Criddle, C. S.; Leckie, J. O. Effect of flux (transmembrane pressure) and membrane properties on fouling and rejection of reverse osmosis and nanofiltration membranes treating perfluorooctane sulfonate containing wastewater. *Environ. Sci. Technol.* 2007, 41, 2008-2014.

Bulk chemicals in Alibaba. https://www.alibaba.com/Chemicals_p8?spm=a2700.7724857.galleryFilter.53.406c7-5e54UTDa5 (accessed Aug. 8, 2019).

Yang, M.; Hashimoto, T.; Hoshi, N.; Myoga, H. Fluoride removal in a fixed bed packed with granular calcite. *Water Res.* 1999, 33, 3395-3402.

Hori, H.; Yamamoto, A.; Hayakawa, E.; Taniyasu, S.; Yamashita, N.; Kutsuna, S.; Kiatagawa, H.; Arakawa, R. Efficient decomposition of environmentally persistent perfluorocarboxylic acids by use of persulfate as a photochemical oxidant. *Environ. Sci. Technol.* 2005, 39, 2383-2388.

Hori, H.; Hayakawa, E.; Einaga, H.; Kutsuna, S.; Koike, K.; Ibusuki, T.; Kiatagawa, H.; Arakawa, R. Decomposition of environmentally persistent perfluorooctanoic acid in water by photochemical approaches. *Environ. Sci. Technol.* 2004, 38, 6118-6124.

We claim:

1. A method for treating a waste substance containing PFAS, the method comprising:

combining the PFAS with a first amendment, wherein the first amendment is a base selected from one or more of NaOH, Ca(OH)$_2$, Na$_2$CO$_3$, KOH, NH$_4$OH, and Mg(OH)$_2$, in a reactor to create a combination having a moisture content of at least 10%;

heating and pressurizing the combination in the reactor to a hydrothermal condition wherein the hydrothermal condition comprises a temperature between 200° C. and 700° C. and a pressure between 2 MPa and 50 MPa; and holding the combination in the hydrothermal condition for a holding time sufficient to at least partially mineralize the PFAS to create a treated combination.

2. The method of claim 1, wherein the temperature is about 200° C. to about 374° C.; and the pressure is about 2 MPa to about 22 MPa.

3. The method of claim 1, further comprising bringing the combination to a moisture content greater than about 60%.

4. The method of claim 1, further comprising adjusting the pH of the treated combination.

5. The method of claim 4, further comprising reducing the pH of the treated combination.

6. The method of claim 1, wherein the first amendment includes NaOH.

7. The method of claim 1, wherein the first amendment includes $Ca(OH)_2$.

8. The method of claim 1, wherein the first amendment includes $Na_2CO_3$.

9. The method of claim 1, wherein the first amendment includes KOH.

10. The method of claim 3, wherein the moisture content is at least 75% water.

11. The method of claim 1, wherein the PFAS is combined with a solvent prior to creating the combination.

12. The method of claim 11, wherein the solvent is methanol and the moisture content is at least 25% water.

13. The method of claim 1, wherein the first amendment includes $NH_4OH$.

14. The method of claim 1, wherein the first amendment includes $Mg(OH)_2$.

15. The method of claim 1, wherein the waste substance further contains an organic compound.

16. The method of claim 1, wherein the method is continuous.

17. The method of claim 1, wherein the method is batched.

18. The method of claim 1, where in the pressurizing is autogenous.

19. A system for treating a waste substance containing PFAS substances, the system comprising a vessel adapted to:
    combine the PFAS with a first amendment in the vessel to create a combination, wherein the first amendment is a base selected from one or more of NaOH, $Ca(OH)_2$, $Na_2CO_3$, KOH, $NH_4OH$, and $Mg(OH)_2$, and the combination having a moisture content of at least 10%;
    heat the combination in the vessel to a temperature of about 200° C. to about 700° C.;
    pressurize the combination in the vessel to a pressure of about 2 MPa to about 50 MPa; and
    hold the combination in a heated and pressurized state for a holding time sufficient to at least partially mineralize the PFAS to create a treated combination.

20. The method of claim 1, wherein the first amendment is NaOH.

* * * * *